March 23, 1954     I. MOLNAR     2,673,256

TESTING APPARATUS FOR CARRIER SYSTEMS

Original Filed July 10, 1947     12 Sheets-Sheet 1

*INVENTOR.*
IMRE MOLNAR
BY
*Smith, Olsen + Baird*
ATTYS

INVENTOR.
IMRE MOLNAR
BY
Smith, Olsen + Baird
ATTYS.

INVENTOR.
IMRE MOLNAR
BY
Smith, Olsen & Baird
ATTYS

ALARM SENDER 680

INVENTOR.
IMRE MOLNAR
BY
Smith, Olsen + Baird
ATTYS

Patented Mar. 23, 1954

2,673,256

UNITED STATES PATENT OFFICE 2,673,256

TESTING APPARATUS FOR CARRIER SYSTEMS

Imre Molnar, Chicago, Ill., assignor to Automatic Electric Laboratories, Inc., Chicago, Ill., a corporation of Delaware Original application July 10, 1947, Serial No. 760,136. Divided and this application March 30, 1951, Serial No. 218,389

12 Claims. (Cl. 179—175.3)

The present invention relates to telephone systems and more particularly to such systems of the intertoll dialing type employing carrier links. This application is a division of the copending application of Imre Molnar, Serial No. 760,136, filed July 10, 1947, now Patent No. 2,603,717, granted July 15, 1952.

It is a general object of the invention to provide an intertoll dialing system involving a network of automatic exchanges and offices, provided with subscriber substations, paystations, manual dial switchboards and automatic dial switchboards, whereby the usual trunk and toll connections may be set up and supervised employing the carrier links.

Another object of the invention is to provide in a telephone system including a remote exchange of the automatic type, a tandem exchange of the automatic type, and a main office provided with a switchboard, an improved arrangement for setting up connections involving the stations in the exchanges and the switchboard in the office.

A further object of the invention is to provide in a telephone system including an exchange connected to an unattended way station and an office connected to the way station by a carrier link, an improved arrangement for automatically checking the operating condition of the carrier link and for operating a signal in the office in the event of a faulty condition of the carrier link.

Further features of the invention pertain to the particular arrangement of the circuit elements of the system, whereby the above-outlined and additional operating features thereof are attained.

Figure 1:
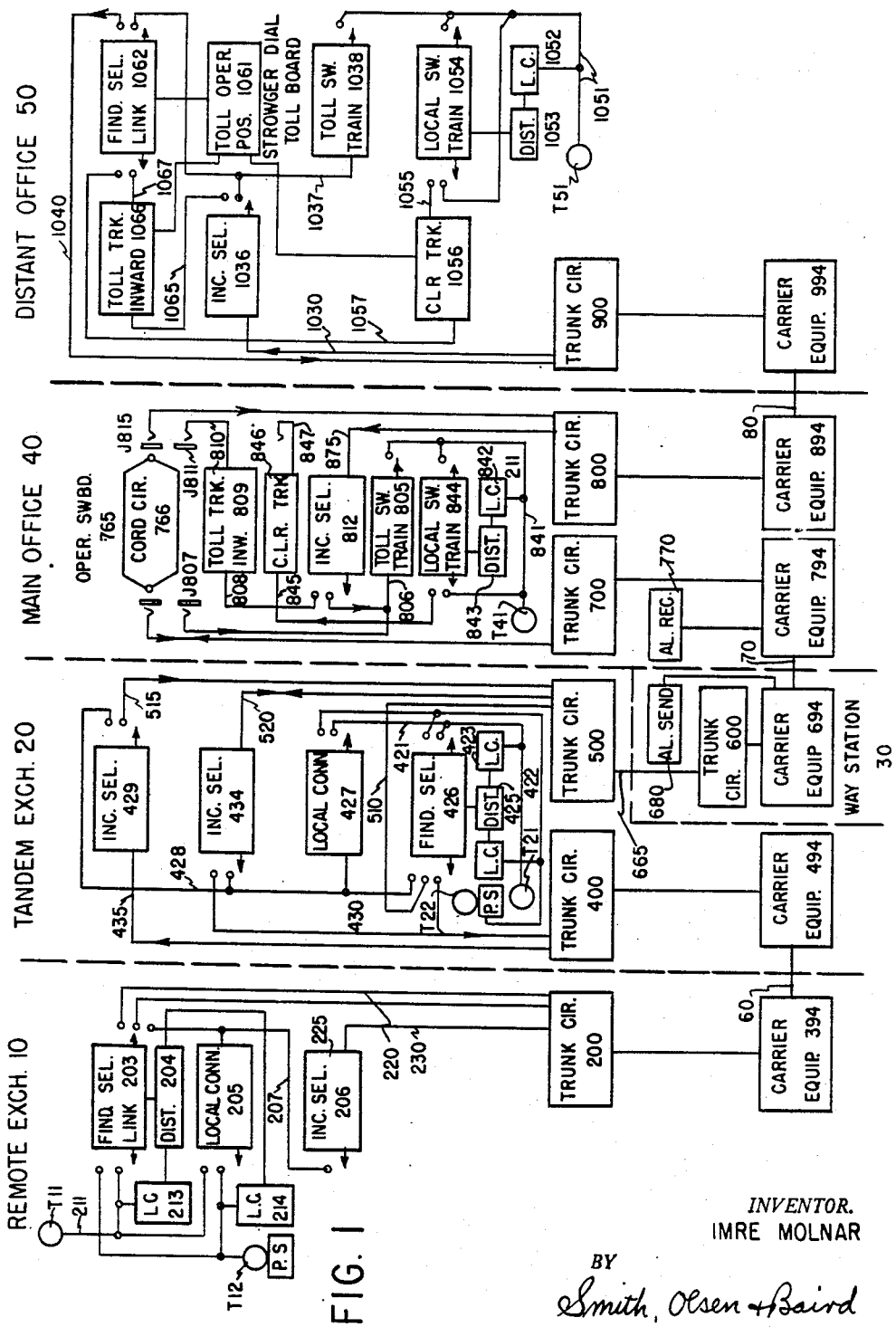
Figure 9:
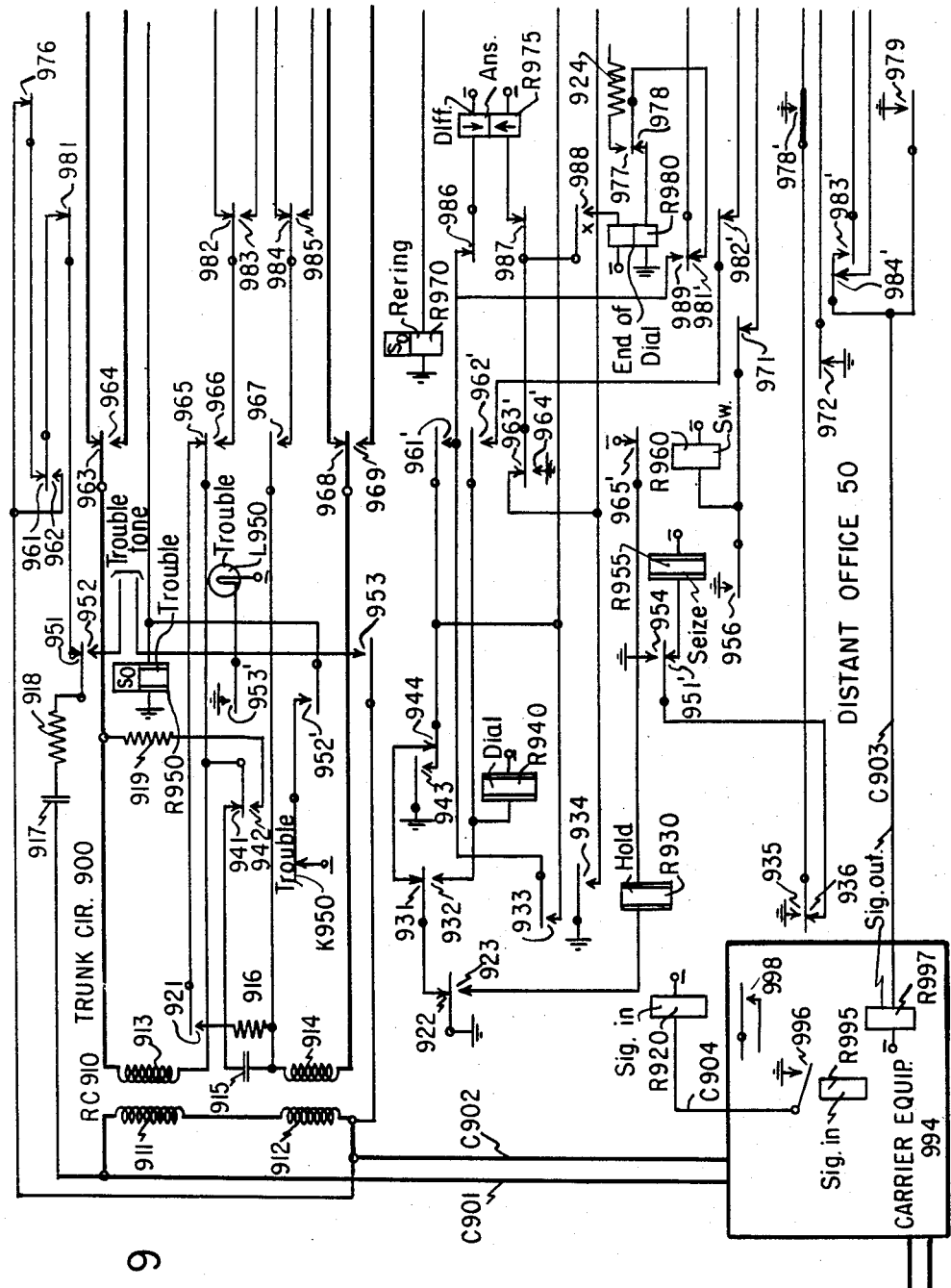
Figure 10:
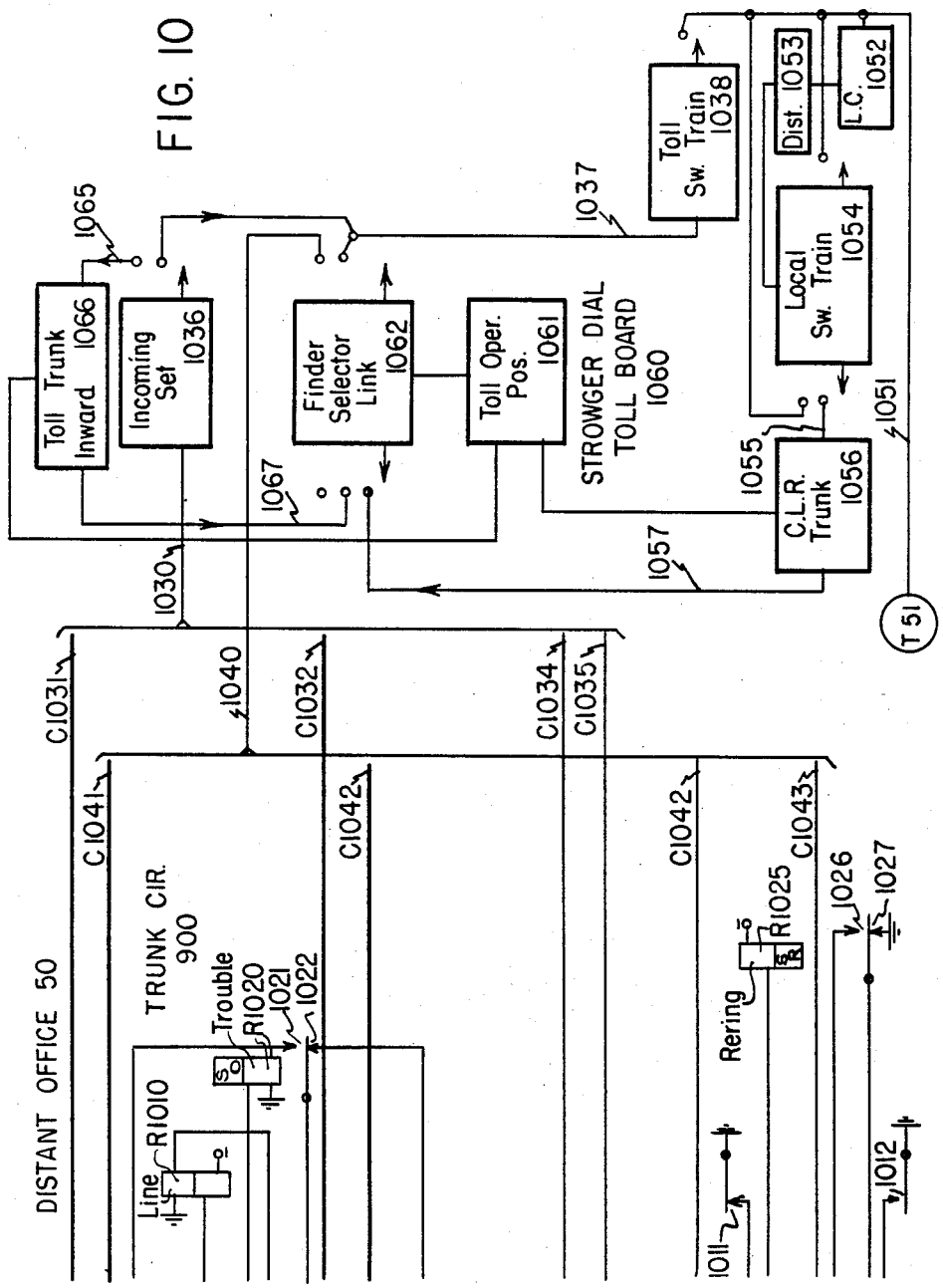
Figure 11:
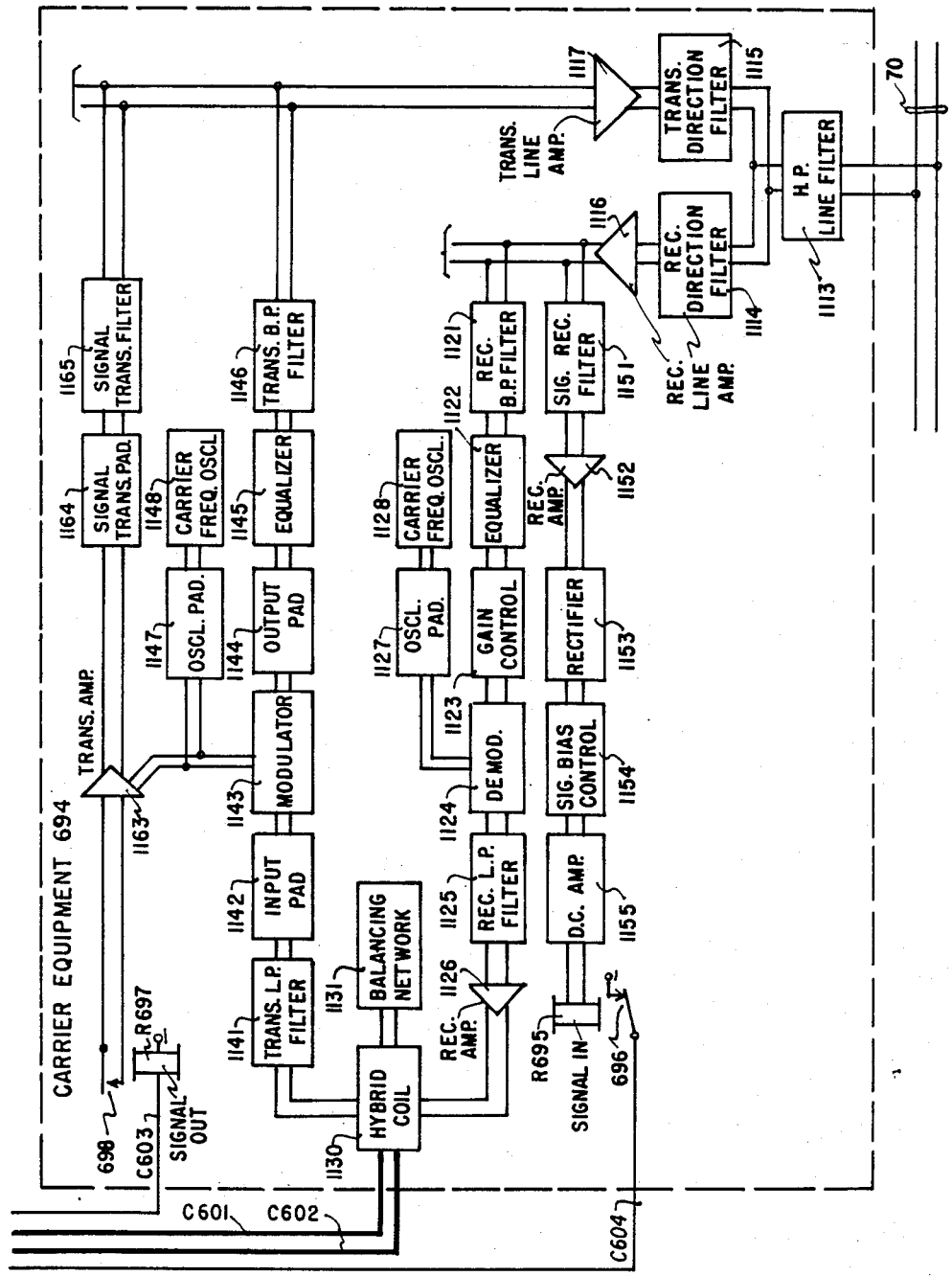
Figure 12:
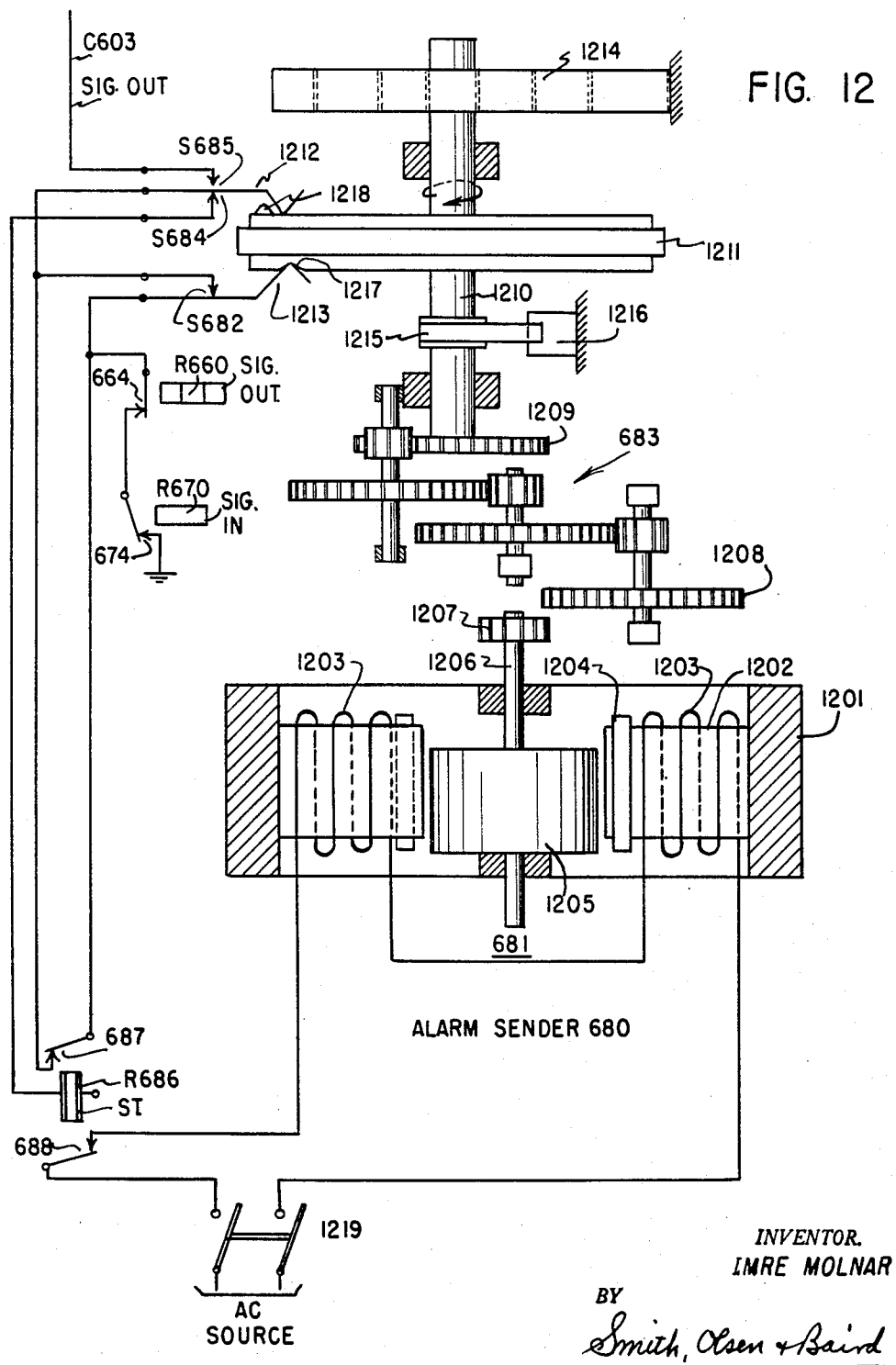

The invention, both as to its organization and method of operation, together with further objects and advantages thereof, will best be understood by reference to the following specification taken in connection with the accompanying drawings in which Figure 1 is a diagrammatic illustration of an automatic telephone system embodying the present invention and comprising a remote exchange 10, a tandem exchange 20, a way station 30, a main office 40 and a distant office 50; Figs. 2 to 10, inclusive, taken together, illustrate the details of the apparatus incorporated in the automatic telephone system illustrated in Fig. 1 and embodying the features of the invention as briefly outlined above; Fig. 11 illustrates the carrier equipment provided at the way station 30; and Fig. 12 illustrates the alarm sender provided at the way station 30. Figs. 2 to 10, inclusive, should be arranged from left to right in end-to-end relation in order to form a unified diagram.

Figure 2:
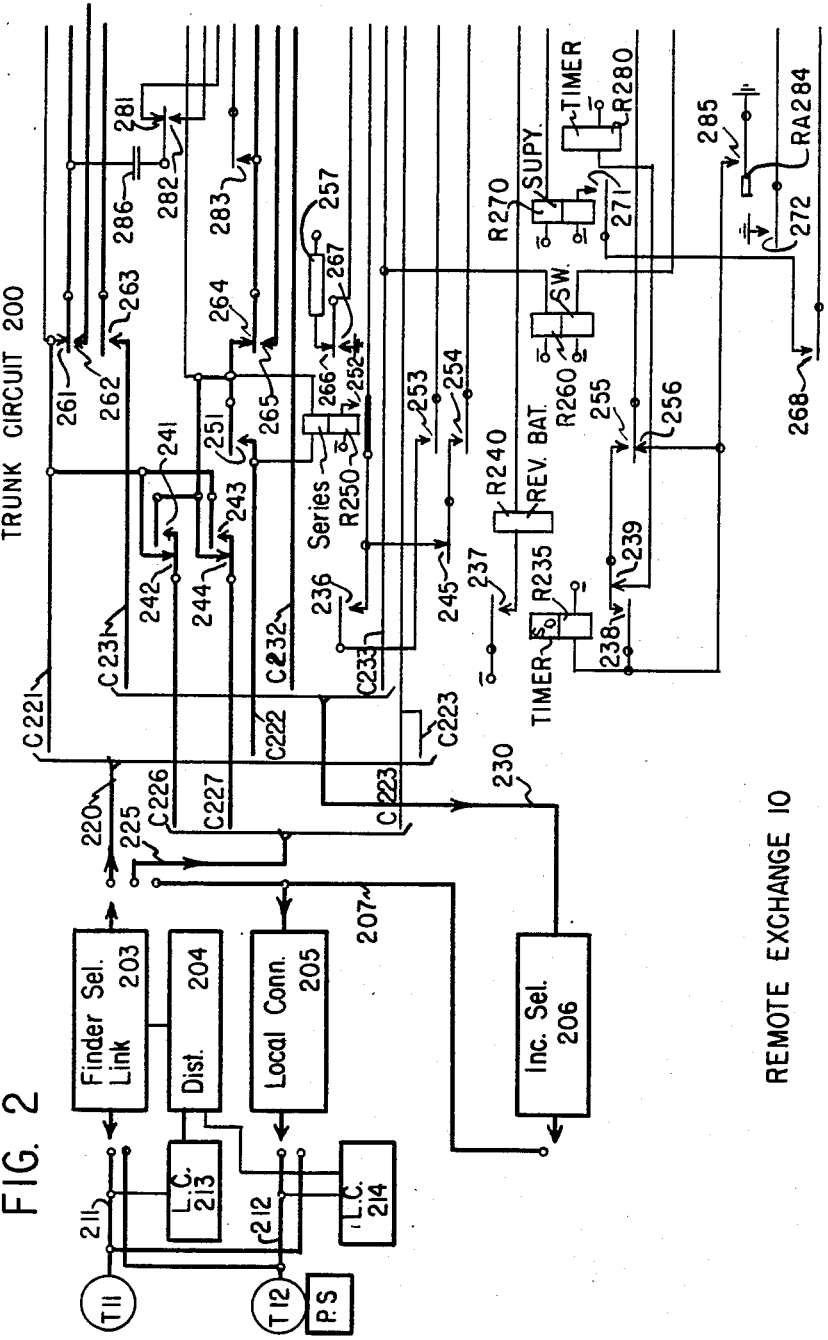
Figure 3:
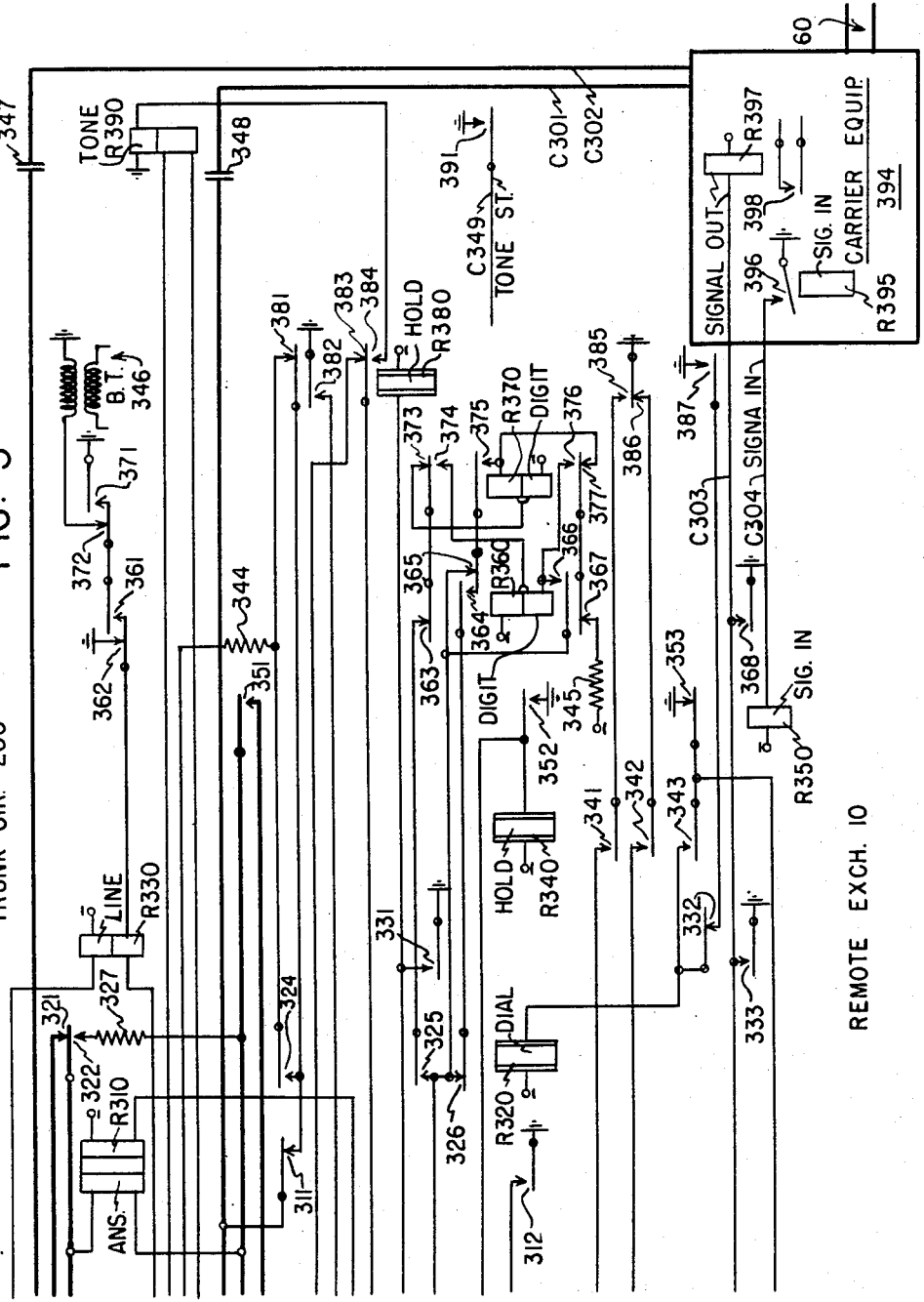
Figure 4:
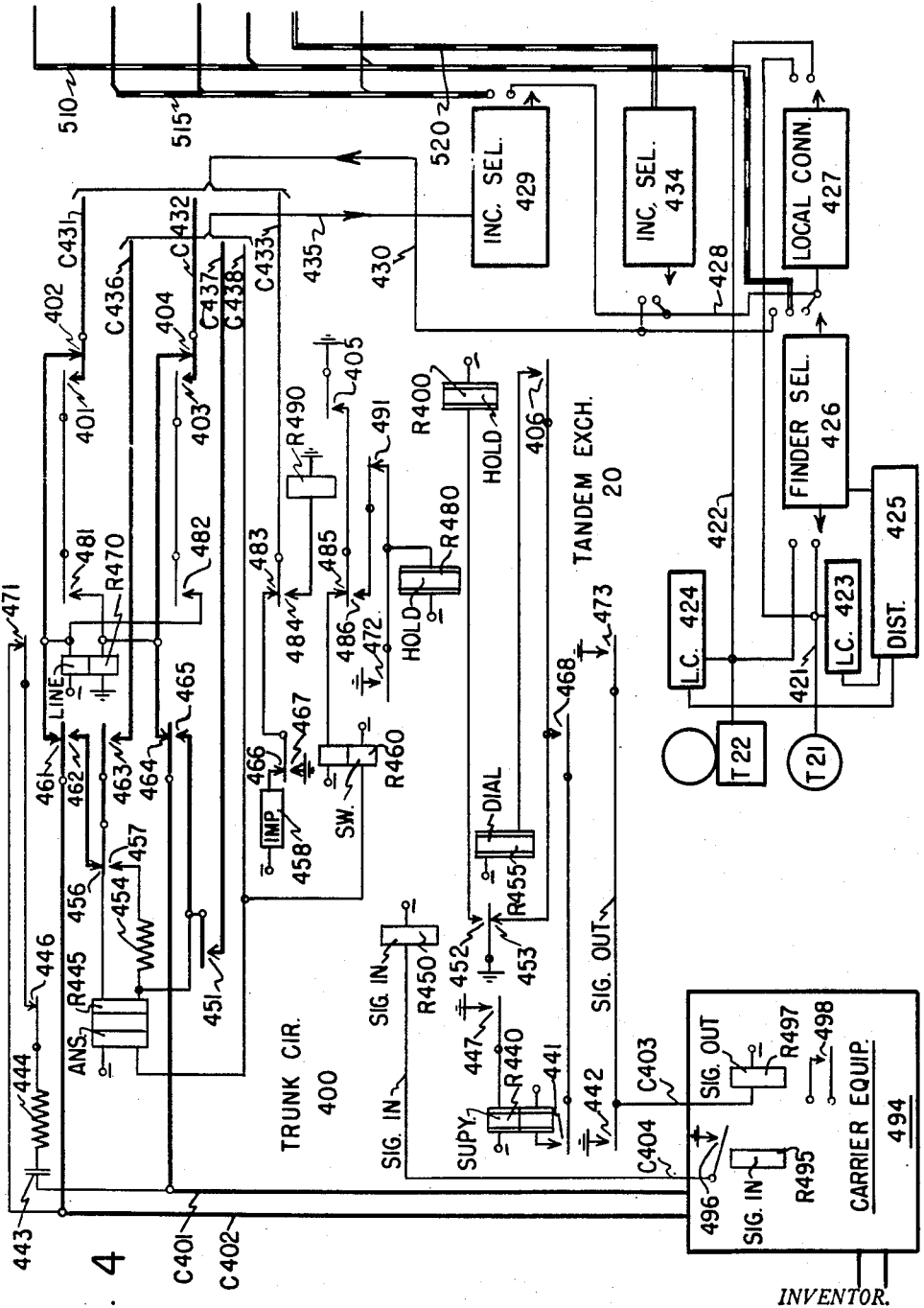
Figure 5:
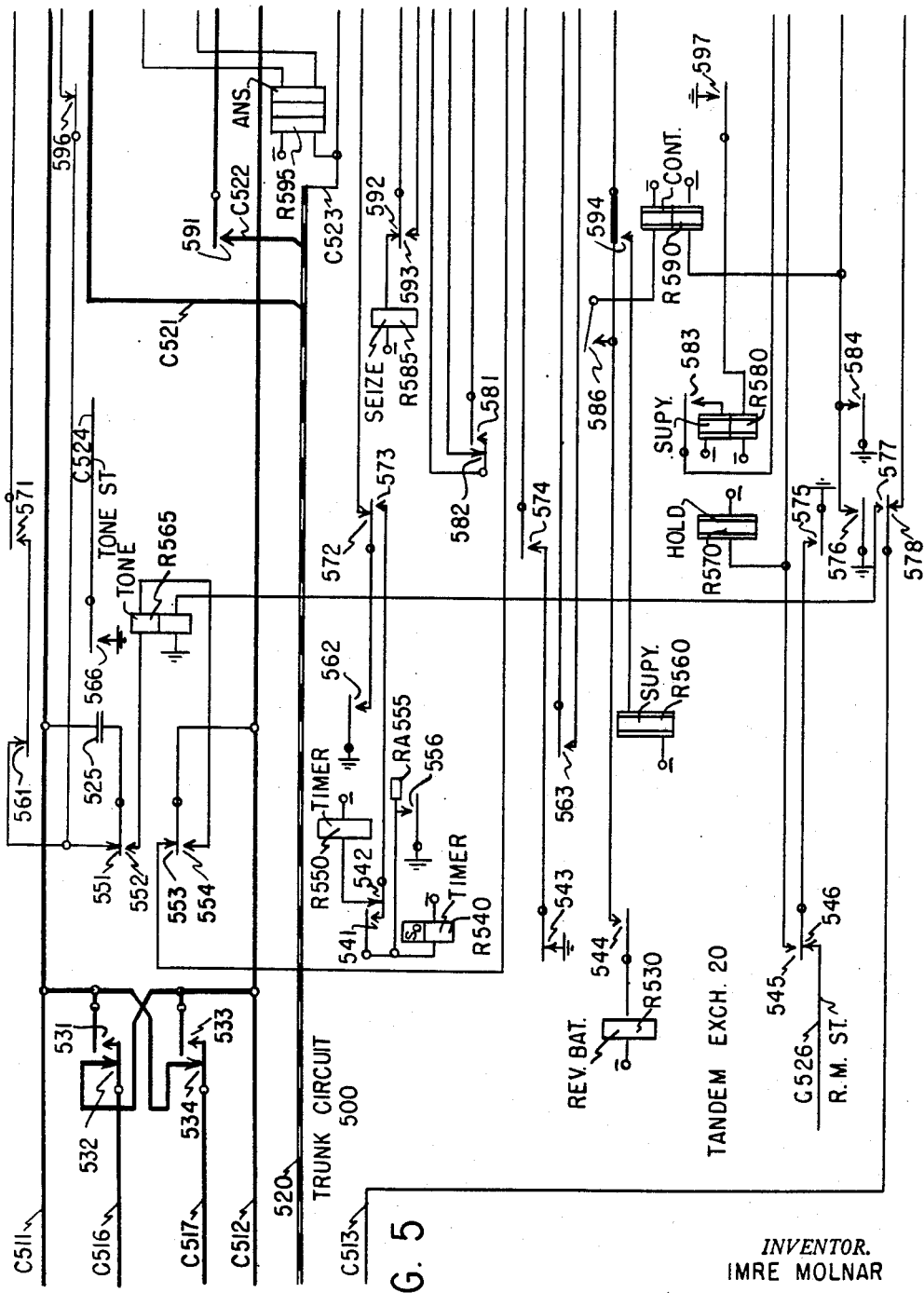
Figure 6:
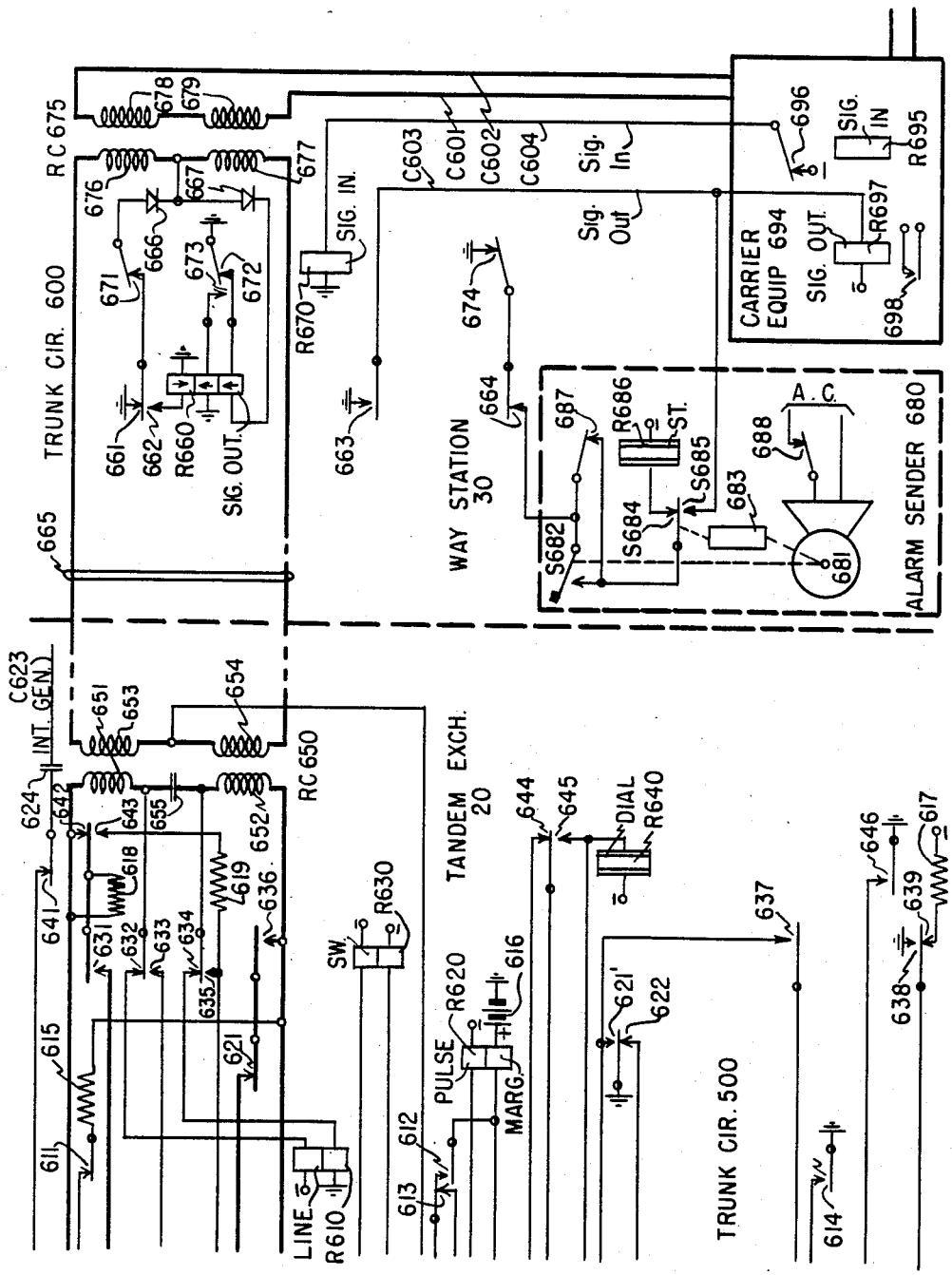
Figure 7:
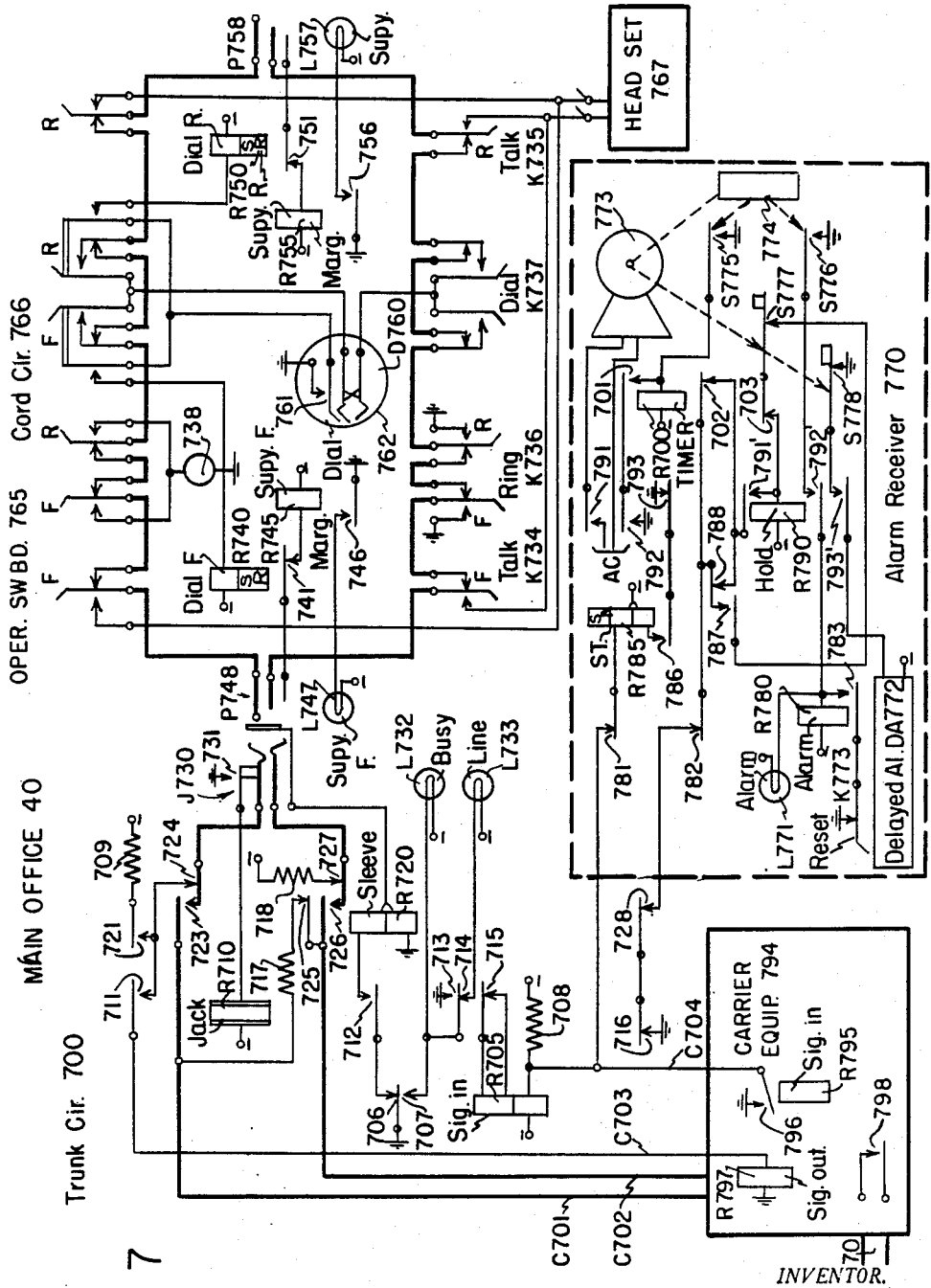
Figure 8:
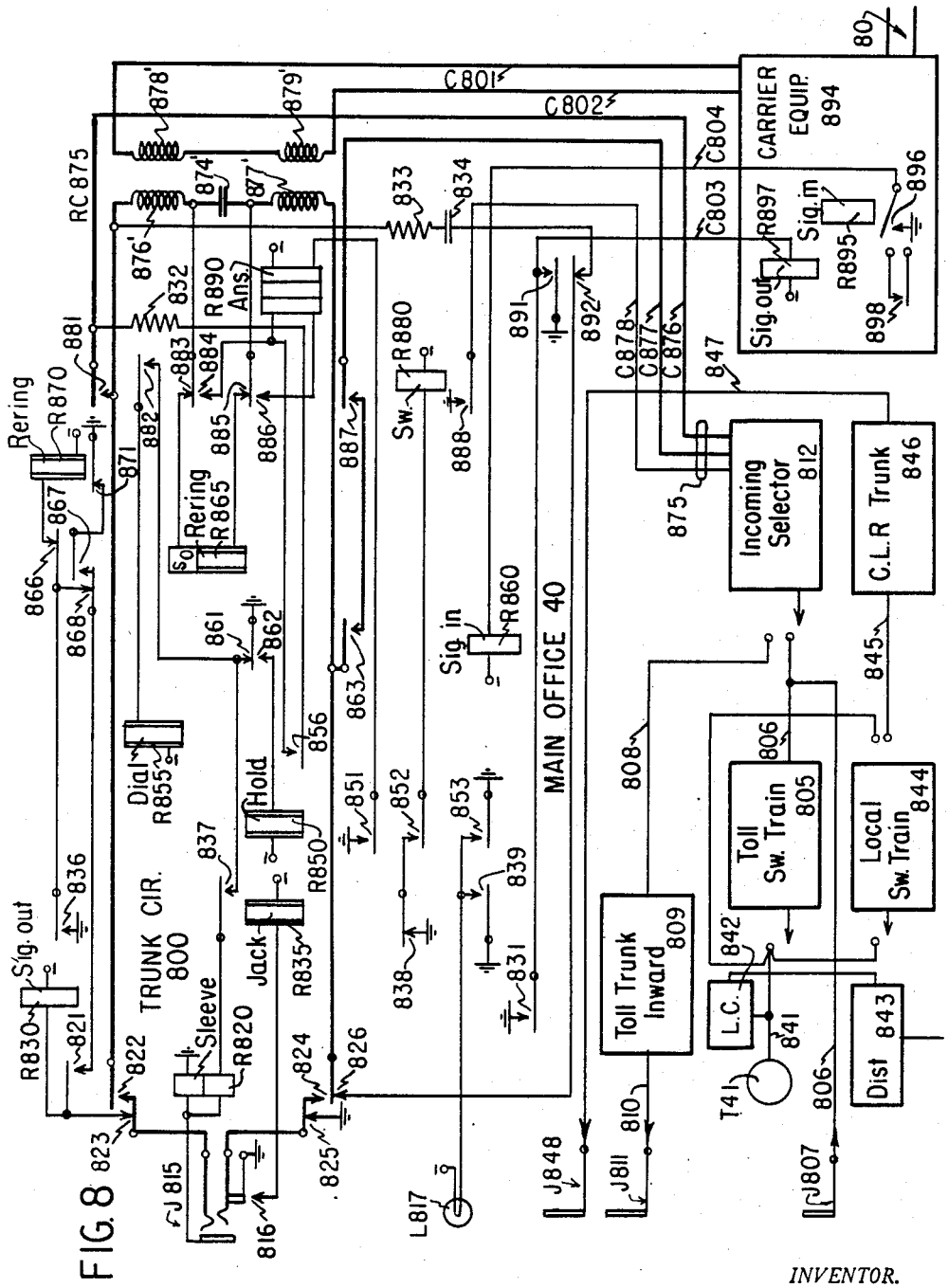

More particularly, Figs. 2 and 3 illustrate diagrammatically the automatic switching apparatus and one of the pieces of carrier equipment disposed in the remote exchange 10, as well as the details of one of the trunk circuits disposed therein; Figs. 4, 5 and 6 illustrate diagrammatically the automatic switching apparatus and one of the pieces of carrier equipment disposed in the tandem exchange 20, as well as the details of two different trunk circuits disposed therein; Fig. 6 also illustrates diagrammatically one of the pieces of carrier current equipment disposed at the way station 30, as well as the details of one of the trunk circuits and one of the alarm senders disposed thereat; Fig. 7 illustrates diagrammatically one of the pieces of carrier equipment disposed at the main office 40, as well as the details of one of the trunk circuits, one of the alarm receivers, and one of the cord circuits disposed therein; Fig. 8 illustrates diagrammatically the automatic switching apparatus and one of the pieces of carrier equipment disposed in the main office 40, as well as the details of a different one of the trunk circuits disposed therein; Figs. 9 and 10 illustrate diagrammatically the automatic switching apparatus and one of the pieces of carrier equipment disposed in the distant office 50, as well as the details of one of the trunk circuits disposed therein; Fig. 11 illustrates diagrammatically the elements incorporated in the carrier equipment provided at the way station 30; and Fig. 12 illustrates diagrammatically the elements incorporated in the alarm sender provided at the way station 30.

The automatic telephone system

Referring now more particularly to Fig. 1, the automatic telephone system there illustrated comprises the remote exchange 10 serving a number of ordinary subscriber substations, including the subscriber substation T11, and a number of paystations, including the paystation T12. The subscriber substation T11 is provided with a subscriber line 211 extending thereto and having a line circuit 213 individually associated therewith; and the paystation T12 is provided with a line 212 extending thereto and having a line circuit 214 individually associated therewith. Also the remote exchange 10 comprises a plurality of groups of finder-selector links, the first group including the finder-selector link 203 and provided with a distributor 204; as well as a plurality of groups of local connectors, the first group of local connectors including the local connector 205. Preferably, the subscriber line 211 extending to the subscriber substation T11 and the line 212 extending to the paystation T12 are arranged in the first group of lines and are accordingly accessible both to the finders of the first group of finder-selector links 203, etc., and to the first group of local connectors 205, etc. Further, the remote exchange 10 comprises a group of incoming selectors, including the incoming selector 206, having access to the different groups of local connectors; the local connector 205 in the first group being accessible to the incoming selector 206 via the trunk 207 extending thereto.

The remote exchange 10 and the tandem exchange 20 are interconnected by a plurality of channels of carrier equipment; the first channel illustrated including the line 60 extending between the remote exchange 10 and the tandem exchange 20 and respectively terminating in the carrier equipment 394 provided in the remote exchange 10 and in the carrier equipment 494 provided in the tandem exchange 20. The carrier equipment 394 is connected to a trunk circuit 200 individual thereto provided in the remote exchange 10; which trunk circuit 200 is connected by a trunk 230 to the incoming selector 206 individual thereto. Also the trunk circuit 200 comprises two additional trunks 220 and 225; both accessible to the selectors of the different groups of finder-selector links. Finally, the selectors of the different groups of finder-selector links in the remote exchange 10 also have access to the different groups of local connectors therein. Specifically, the selector of the finder-selector link 203 has access to the local connector 205 via the trunk 207 extending thereto.

The tandem exchange 20 serves a number of ordinary subscriber substations, including the subscriber substation T21, and a number of paystations, including the paystation T22. The subscriber substation T21 is provided with a subscriber line 421 extending thereto and having a line circuit 423 individually associated therewith; and the paystation T22 is provided with a line 422 extending thereto and having a line circuit 424 individually associated therewith. Also the tandem exchange 20 comprises a plurality of groups of finder-selector links, the first group including the finder-selector link 426 and provided with a distributor 425; as well as a plurality of groups of local connectors, the first group of local connectors including the local connector 427. Preferably, the subscriber line 421 extending to the subscriber substation T21 and the line 422 extending to the paystation T22 and arranged in the first group of lines and are accordingly accessible both to the finders of the first group of finder-selector links 426, etc., and to the first group of local connectors 427, etc. Further, the tandem exchange 20 comprises a first group of incoming selectors, including the incoming selector 429, having access to the different groups of local connectors; and a second group of incoming selectors, including the incoming selector 434, having access to the different groups of local connectors; the local connector 427 in the first group being accessible to the incoming selectors 429, etc., and 434, etc., via the trunk 428 extending thereto. The carrier equipment 494 in the tandem exchange 20 is connected to a trunk circuit 400 individual thereto; which trunk circuit 400 is connected by a trunk 435 to the incoming selector 429 individual thereto. Also the trunk circuit 400 comprises an additional trunk 430 accessible to the selectors of the different groups of finder-selector links and to the group of incoming selectors 434, etc.

The tandem exchange 20 and the way station 30 are interconnected by a group of trunk lines, including the trunk line 665. Each of the trunk lines terminates in a trunk circuit provided in the tandem exchange 20 and in a trunk circuit provided at the way station 30; the trunk line 665 terminating in the trunk circuits 500 and 600 respectively provided in the tandem exchange 20 and at the way station 30. The trunk circuit 500 is connected by a trunk 520 to the incoming selector 434 individual thereto. Also the trunk circuit 500 comprises two additional trunks 510 and 515 respectively accessible to the selectors of the different groups of finder-selector links and to the incoming selectors 429, etc. Finally, the selectors of the different groups of finder-selector links in the tandem exchange 20 also have access to the different groups of local connectors therein. Specifically, the selector of the finder-selector link 426 has access to the local connector 427 via the trunk 428 extending thereto.

The way station 30 and the main office 40 are interconnected by a plurality of channels of carrier equipment; the first channel illustrated including the line 70 extending between the way station 30 and the main office 40 and respectively terminating in the carrier equipment 649 provided at the way station 30 and in the carrier equipment 794 provided in the main office 40. The carrier equipment 694 is connected to the trunk circuit 600 individual thereto at the way station 30; which trunk circuit terminates one end of the trunk line 665 extending between the tandem exchange 20 and the way station 30, as previously noted. Also a plurality of alarm senders 680, etc. are provided at the way station 30 and respectively connected to the carrier equipment 694, etc., thereat.

The carrier equipment 794 provided in the main office 40 is connected to a trunk circuit 700 individual thereto; which trunk circuit 700 terminates in a jack J730 appearing before an operator switchboard 765 in the main office 40; which operator switchboard 765 comprises a plurality of cord circuits, including the cord circuit 766. Also a plurality of alarm receivers 770, etc., are provided in the main office 40 and respectively connected to the carrier equipment 794, etc.

The main office 40 serves a number of ordinary subscriber substations including the subscriber substation T41. The subscriber substation T41 is provided with a subscriber line 841 extending thereto and having a line circuit 842 individually associated therewith. Also the main office 40 comprises a local switch train 844 provided with a distributor 843. The subscriber line 841 extending to the subscriber substation T41 has access to and is accessible to the local switch train 844. Also the main office 40 comprises a group of C. L. R. trunks including the C. L. R. trunk 846. The C. L. R. trunk 846 is accessible to the local switch train 844 via a trunk 845 extending thereto and is also provided with a trunk 847 extending therefrom which terminates in a jack J848 appearing before the operator switchboard 765. Moreover the main office 40 comprises a toll switch train 805 having access to the lines 841, etc., respectively extending to the subscriber substations T41, etc.; which toll switch train 805 has a trunk 806 extending thereto and terminating in a jack J807 appearing before the operator switchboard 765. Further, the main office 40 comprises a group of incoming selectors, including the incoming selector 812, having access to the toll switch train 805 via the trunk 806 extending thereto. Also the main office 40 comprises a group of toll trunks inward 809, etc. The toll trunk inward 809 is accessible to the incoming selector 812 via the trunk 808 extending thereto and is provided with a trunk 810 extending therefrom and terminating in a jack J811 appearing before the operator switchboard 765.

The main office 40 and the distant office 50 are interconnected by a plurality of channels of carrier equipment, the first channel illustrated including the line 80 extending between the main office 40 and the distant office 50 and respectively terminating in the carrier equipment 894 provided in the main office 40 and in the carrier equipment 994 provided in the distant office 50. The carrier equipment 894 is connected to a trunk circuit 800 individual thereto in the main office 40; which trunk circuit 800 is connected by a trunk 875 to the incoming selector 812 individual thereto. Also the trunk circuit 800 terminates in a jack J815 appearing before the operator switchboard 765.

The distant office 50 serves a number of ordinary subscriber substations, including the subscriber substation T51. The subscriber substation T51 is provided with a subscriber line 1051 extending thereto and having a line circuit 1052 individually associated therewith. Also the distant office 50 comprises a local switch train 1054 provided with a distributor 1053. The subscriber line 1051 extending to the subscriber substation T51 has access to and is accessible to the local switch train 1054. Also the distant office 50 comprises a Strowger dial toll board 1060 provided with a plurality of toll operator positions, one of which is indicated at 1061. Each toll operator position is provided with a group of finder-selector links individual thereto; the group of finder-selector links individual to the toll operator position 1061 including the finder-selector link 1062. Further, the distant office 50 comprises a group of C. L. R. trunks, including the C. L. R. trunk 1056; the C. L. R. trunk 1056 is accessible to the local switch train 1054 via a trunk 1055 extending thereto; which C. L. R. trunk circuit 1056 is also provided with a trunk 1057 extending therefrom that is accessible to the finders of the finder-selector links associated with the various toll operator positions at the Strowger dial toll board 1060. Moreover, the distant office 50 comprises a toll switch train 1038 having access to the lines 1051, etc., respectively extending to the subscriber substations T51, etc.; which toll switch train 1038 has a trunk 1037 extending thereto that is accessible to the selectors of the finder-selector links associated with the various toll operator positions at the Strowger dial toll board 1060. Further, the distant office 50 comprises a group of incoming selectors, including the incoming selector 1036, having access to the toll switch train 1038 via the trunk 1037 extending thereto. Also the distant office 50 comprises a group of toll trunks inward 1066, etc. The toll trunks inward 1066 are accessible to the incoming selector 1036 via a trunk 1065 extending thereto and is provided with a trunk 1067 extending therefrom and accessible to the finders of the finder-selector links associated with the various toll operator positions at the Strowger dial toll board 1060.

A carrier equipment 994 provided in the distant office 50 is connected to the trunk circuit 900 individual thereto; which trunk circuit 900 is connected via a trunk 1030 to the incoming selector 1036 individual thereto. Also the trunk circuit 900 is provided with a trunk 1040 incoming thereto that is accessible to the selectors of the finder-selector links associated with the various toll operator positions at the Strowger dial toll board 1060.

*The apparatus incorporated in the automatic telephone system*

Preferably, the carrier system interconnecting the remote exchange 10 and the tandem exchange 20, the carrier system interconnecting the way station 30 and the main office 40 and the carrier system interconnecting the main office 40 and the distant office 50 are identical and each comprises a type 32 Lenkurt unit of the character disclosed in the copending application of Imre Molnar, Serial No. 728,422, filed February 14, 1947, now Patent No. 2,559,165, granted July 3, 1951. Alternatively, the carrier equipment interconnecting the various exchanges, offices and way stations mentioned may be of the radio-link type disclosed in the copending application of Imre Molnar, Serial No. 746,929, filed May 9, 1947, now Patent No. 2,525,914, granted September 26, 1950. Thus the carrier equipment 494, 794 and 994 respectively disposed at the east termini of the lines 60, 70 and 80, and respectively comprising portions of the first channels in the three carrier current systems mentioned, transmit at a carrier frequency of 15.95 kc. for signalling purposes, transmit the lower side band of the carrier frequency 15.95 kc. (13.1 to 15.7 kc.) for communication purposes, receive a carrier frequency of 24.55 kc. for signalling purposes, and receive the lower side band of the carrier frequency 24.55 kc. (21.7 to 24.3 kc.) for communication purposes. Similarly, the carrier equipment 394, 694 and 894 respectively disposed at the west termini of the lines 60, 70 and 80, and respectively comprising portions of the first channels in the three carrier current systems mentioned, transmit at a carrier frequency of 24.55 kc. for signalling purposes, transmit the lower side band of the carrier frequency 24.55 kc. (21.7 to 24.3 kc.) for communication purposes, receive a carrier frequency of 15.95 kc. for signalling purposes, and receive the lower side band of the carrier frequency 15.95 kc. (13.1 to 15.7 kc.) for communication purposes.

Also, each carrier equipment 394, etc., comprises an outgoing signal transmitting channel including a first carrier frequency oscillator and a transmitting amplifier provided with a plate circuit controlled by an associated signal-out relay; as well as an outgoing communication channel including a balanced modulator connected to the first carrier frequency oscillator and an associated transmitting band pass filter. Also, each carrier equipment mentioned comprises an incoming signal channel including a rectifier and a signal-in relay; as well as an incoming communication channel including a balanced demodulator connected to a second carrier frequency oscillator and an associated receiving band pass filter. Also each carrier equipment mentioned comprises a transmitting direction filter connected to the associated outgoing signal transmitting channel and to the associated outgoing communication channel; as well as a receiving direction filter connected to the associated incoming signal channel and to the associated incoming communication channel. Further, each carrier equipment mentioned comprises a high pass line filter connected between the associated line terminus and the transmitting direction filter and the receiving direction filter. Finally, each line terminus is connected by a low pass filter to other voice frequency equipment. This conventional equipment described above and disclosed in the previously mentioned copending Molnar application, permits utilization of the lines 60, 70 and 80 in other voice frequency equipment in a manner well under stood.

Specifically, as illustrated in Fig. 11, the carrier equipment 694 provided at the way station 30 comprises a high pass line filter 1113 directly connected to the west portion of the line 70, a receiving direction filter 1114, and a transmitting direction filter 1115, both connected to the high pass line filter 1113, a receiving line amplifier 1116 connected to the receiving direction filter 1114, and a transmitting line amplifier 1117 connected to the transmitting direction filter 1115. The high pass line filter 1113 is arranged to pass high frequency carrier signals in the overall range 6.5 to 28.45 kc., and to block the passage of audio frequency signals in order to prevent interference with the carrier system. The receiving direction filter 1114 is arranged to pass carrier frequency signals toward the lower end of the overall carrier frequency range, and particularly the carrier frequencies between 6.5 and 15.95 kc., and to block carrier frequency signals toward the upper end of the overall carrier frequency range, and particularly the carrier frequencies between 18.0 and 28.45 kc. On the other hand, the transmitting direction filter 1115 is arranged to pass carrier frequency signals toward the upper end of the overall carrier frequency range, and particularly the carrier fequencies between 18.0 and 28.45 kc., and to block carrier frequency signals toward the lower end of the overall carrier frequency range, and particularly the carrier frequencies between 6.5 and 15.95 kc.

Further the carrier equipment 694 comprises a receiving communication channel including a receiving band pass filter 1121 connected to the receiving line amplifier 1116 and arranged to pass the lower side band of the carrier frequency 15.95 kc. (13.1 to 15.7 kc.), an attenuation equalizer 1122 connected to the receiving band pass filter 1121, a gain control 1123 connected to the attenuation equalizer 1122, and a demodulator 1124 connected to the gain control 1123. Further, a carrier frequency oscillator 1128 having an output frequency of 15.95 kc. is connected by an oscillator pad 1127 to the demodulator 1124; and the demodulator 1124 is connected to a receiving low pass filter 1125 arranged to pass audio frequency signals; which, in turn, is connected by a receiving amplifier 1126 to a hybrid coil 1130 provided with a balancing network 1131. Further, the hybrid coil 1130 is connected to the line conductors 601 and 602.

Further the carrier equipment 694 comprises a signal receiving filter 1151 connected to the receiving line amplifier 1116 and arranged to pass the carrier frequency 15.95 kc.; which, in turn, is connected by way of a receiving amplifier 1152 to a rectifier 1153. The output of the rectifier 1153 is connected by way of a signal bias control 1154 to a D. C. amplifier 1155, the output of which is connected to the signal-in relay R695. The D. C. amplifier 1155 normally supplies sufficient current to the winding of the signal-in relay R695 to maintain the latter relay in its operated position, whereby the operated signal-in relay R695 maintains completed, at the contacts 696, the path for applying battery potential to the signal-in conductor C604. However, when the receiving signal channel receives the carrier frequency 15.95 kc., the rectifier 1153 is controlled by the receiving amplifier 1152 to produce a current that is supplied to the signal bias control 1154, whereby the bias applied to the D. C. amplifier 1155 is increased in order to cause the output current thereof to be reduced sufficiently to bring about the restoration of the signal-in relay R695. Upon restoring the signal-in relay R695 interrupts, at the contacts 696, the previously-mentioned path for applying battery potential to the signal-in conductor C604. Accordingly, as signal pulses of 15.95 kc. carrier frequency are received by the receiving signal channel, the signal-in relay R695 follows, repeating at the contacts 696, corresponding battery impulses over the signal-in conductor C604.

Further, the carrier equipment 694 comprises a transmitting communication channel, including a transmission low pass filter 1141 connected to the hybrid coil 1130 and arranged to pass audio frequencies; which, in turn, is connected by way of an input pad 1142 to a modulator 1143. A carrier frequency oscillator 1148 having an output frequency of 24.55 kc. is connected by an oscillator pad 1147 to the modulator 1143; and the modulator 1143 is connected by an output pad 1144 to an attenuation equalizer 1145. The attenuation equalizer 1145 is connected to a transmission band pass filter 1146, arranged to pass the lower side band of the carrier frequency 24.55 kc. (21.7 to 24.3 kc.) and to block the upper side band of the carrier frequency 24.55 kc.; which, in turn, is connected to the transmission line amplifier 1117.

Further the carrier equipment 694 comprises a transmission signal channel including the normally restored signal-out relay R697 connected to the signal-out conductor 603; which signal-out relay R697 is adapted to be operated in order to close its contacts 698 included in the plate circuit of a transmission amplifier 1163; which, in turn, is connected to the carrier frequency oscillator 1148 by way of the oscillator pad 1147. Also the transmission amplifier 1163 is connected by way of a signal transmission pad 1164 to a signal transmission filter 1165 arranged to transmit the carrier frequency 24.55 kc. Finally, the signal transmission filter 1165 is connected to the transmission line amplifier 1117. Accordingly, as the signal-out relay R697 is controlled over the signal-out conductor C603, it is operated and then restored; whereby the signal-out relay R697 completes, and then interrupts, at the contacts 698, the plate circuit extending to the transmission amplifier 1163; whereby corresponding pulses of 24.55 kc. carrier frequency are transmitted from the transmission amplifier 1163 via the signal transmission pad 1164 and thence through the signal transmission filter 1165 into the transmission line amplifier 1117.

In view of the foregoing description of the connection and arrangement and the mode of operation of the carrier equipment 694 provided at the way station 30, the arrangement of the carrier equipment 794, etc., in the central office 40, etc., will be apparent.

As shown in Fig. 2, preferably each of the finder-selector links 203, etc., each of the local connectors 205, etc., and each of the incoming selectors 206, etc., are of the conventional Strowger types; while the distributor 204 and the line circuits 213, 214, etc., are of any suitable types. Finally, each of the subscriber substations T11, etc., is provided with conventional substation apparatus; each subscriber line 211, etc., is provided with a meter, not shown, individual thereto; and each of the paystations T12, etc., is of the character of that disclosed in Fig. 3 of United States Patent No. 2,137,409, granted November 22, 1938, to Talbot G. Martin and Clarence E. Lomax. Specifically, a paystation of this type comprises, among other elements, a transmitter bridged by an asymmetrical current conducting device in the form of a copper oxide rectifier; whereby a person at the paystation may control the extension of a connection therefrom and converse with an operator without depositing a coin thereat. Also, the person at the paystation can normally extend a connection therefrom to a subscriber substation, but cannot talk to the subscriber thereat until a coin has been deposited at the paystation, as a consequence of the blocking action of the copper oxide rectifier with respect to the transmitter when the polarity of the line is reversed in a local connection.

Preferably, each of the trunk circuits in the remote exchange 10 is identical to the trunk circuit 200 that comprises, as shown in Figs. 2 and 3, a relay group including a timer relay R235, a reverse battery relay R240, a series relay R250, a switch relay R260, a supervisory relay R270, a timer relay R280, an answer relay R310, a dial relay R320, a line relay R330, a hold relay R340, a signal-in relay R350, two digit relays R360 and R370, a hold relay R380 and a tone relay R390. Also, the trunk circuit 200 comprises an impedance 257 and a busy tone transformer 346. At this point it is noted that the trunk circuit 200 is connected to the carrier equipment 394 by a pair of line conductors C301 and C302, a signal-out conductor C303 and a signal-in conductor C304; and that the apparatus provided in the carrier equipment 394, as previously explained, comprises a signal-in relay R395 and a signal-out relay R397.

In the tandem exchange 20, as shown in Fig. 4, each of the finder-selector links 426, etc., each of the local connectors 427, etc., and each of the incoming selectors 429, etc., and 434, etc., are of the conventional Strowger types; while the distributor 425 and the line circuits 423, 424, etc., are of any suitably types. Finally, each of the subscriber substations T21, etc., is provided with conventional substation apparatus; each of the subscriber lines 421, etc., is provided with a meter, not shown, individual thereto; and each of the paystations T22, etc., is of the character of that disclosed in Fig. 3 of the previously mentioned Martin et al. patent.

In the tandem exchange 20, preferably each of the trunk circuits in the group, including the trunk circuit 400, is identical thereto; which trunk circuit 400 comprises, as shown in Fig. 4, a relay group including a supervisory relay R440, an answer relay R445, a signal-in relay R450, a dial relay R455, a switch relay R460, a line relay R470, a hold relay R480, a control relay R490, and a hold relay R400, as well as an impedance 458. At this point it is noted that the trunk circuit 400 is connected to the carrier equipment 494 by a pair of line conductors C401 and C402, a signal-out conductor C403 and a signal-in conductor C404; and that the apparatus provided in the carrier equipment 494, as previously explained, comprises a signal-in relay R495 and a signal-out relay R497.

Also, in the tandem exchange 20, preferably, each of the trunk circuits in the group, including the trunk circuit 500, is identical thereto; which trunk circuit 500 comprises, as shown in Figs. 5 and 6, a relay group including a reverse battery relay R530, two timer relays R540 and R550, a supervisory relay R560, a tone relay R565, a hold relay R570, a supervisory relay R580, a seize relay R585, a control relay R590, an answer relay R595, a line relay R610, a pulse relay R620, a switch relay R630, and a dial relay R640. Also, the trunk circuit 500 comprises an ordinary battery indicated, a booster battery 616 and a repeating coil RC650.

Preferably, each of the trunk circuits at the way station 30 is identical to the trunk circuit 600 that comprises, as shown in Fig. 6, a relay group including a signal-out relay R660, and a signal-in relay R670. Also, the trunk circuit 600 comprises two asymmetrical current conducting devices 666 and 667, in the form of copper oxide rectifiers, and a repeating coil RC675. At this point it is noted that the trunk circuit 600 is connected to the carrier equipment 694 by a pair of line conductors C601 and C602, a signal-out conductor C603 and a signal-in conductor C604; and that the apparatus provided in the carrier equipment 694, as previously explained, comprises a signal-in relay R695 and a signal-out relay R697.

Preferably, in the way station 30, each of the alarm senders is identical to the alarm sender 680 which comprises, as shown in Fig. 6, a motor 681 operative from a commercial source of single phase A. C. power and operatively associated with a set of switch springs S682 and with a gearbox 683. The gearbox 683 is adapted to time operation of the motor 681 and at the expiration of ten minutes to open the associated contacts S684 and to close the associated contacts S685. Further, the alarm sender 680 comprises a start relay R686.

The alarm sender 680 provided at the way station 30 may be of any well-known type, but is preferably of the type disclosed in U. S. Patent No. 2,425,620, granted on August 12, 1947, to Leslie A. Kempton. Specifically, as shown in Fig. 12, the alarm sender 680 comprises a timer motor 681 of a well-known type including a field element 1201 carrying a plurality of poles 1202 provided with windings 1203 and cooperating shading coils 1204, as well as a rotatable armature 1205 carried by an operating shaft 1206 mounted for both rotation and longitudinal sliding movements. The timer motor 681 is mounted in the vertical direction, and the operating shaft 1206 carries a drive gear 1207 that normally disengages an associated driven gear 1208 forming a part of the gear train 683. However, when the windings 1203 of the timer motor 681 are energized, the field flux lifts the armature 1205 from its normal lower position into its upper position so as to engage the drive gear 1207 with the driven gear 1208 in an obvious manner. Subsequently when the windings 1203 are deenergized, the weight of the armature 1205 causes it to be returned to its lower position disengaging the drive gear 1207 and the driven gear 1208.

Further the alarm sender 680 comprises a series of reduction gears, including the driven gear 1209, in the gear train 683; which driven gear 1209 is fixed on the lower end of a camshaft 1210 mounted for rotation and carrying an operating cam 1211. The operating cam 1211 cooperates with upper and lower cam followers 1212 and 1213; and the upper end of the camshaft 1210 has one end of a spirally wound ribbon spring 1214 fixed thereto, the other end of the spring 1214 being fixed to an exterior support. The spring 1214 biases the camshaft 1210 in the counterclockwise direction, as viewed from the top thereof into a normal position wherein a stop 1215 fixed to the camshaft 1210 engages an exteriorly mounted stop 1216. In the normal position of the camshaft 1210, the cam follower 1213 rides into a notch 1217 provided in the lower surface of the cam 1211 so as to operate the set of switch springs S682 into its closed position. On the other hand, the cam follower 1212 disengages a projection 1218 provided on the upper surface of the cam 1211 so that the cam follower 1212 is operated to close the set of switch springs S684 and to open the set of switch springs S685. Finally the alarm sender 680 comprises the start relay R686 that is governed by the signal-in relay R670 and the signal-out relay R660, and that governs the signal-out conductor C603, as well as a control switch 1219.

Considering now the operation of the alarm sender 680 and assuming that the signal-in relay R670 occupies its operated position and the signal-out relay R660 occupies its restored position, a circuit, including the contacts 674 and 664 and the sets of switch springs S682 and S684, is completed for operating the start relay R686. Upon operating, the start relay R686 completes, at its contacts 687, a holding circuit, including the set of switch springs S684, for energizing the winding thereof; and completes, at the contacts 688, a circuit for energizing the windings 1203 of the timer motor 681, further assuming that the control switch 1219 has just been closed. When the windings 1203 of the timer motor 681 are thus energized, the armature 1205 is lifted from its lower position into its upper position and rotated at the synchronous speed established by the A. C. source of current supply, the timer motor 681 being of the shaded pole synchronous type, whereby the drive gear 1207 engages the driven gear 1208 effecting rotation of the driven gear 1209 in the gear train 683 so that the camshaft 1210 is rotated at the timed rate in the clockwise direction, as viewed from the upper end thereof. As the camshaft 1210 is rotated out of its normal position, the stop 1215 moves away from the stop 1216, and the cam 1211 rides the cam follower 1213 out of the notch 1217 so as to interrupt the pick-up circuit for the start relay R686; whereby, at this time, the start relay R686 is retained operated only via its holding circuit, including the contacts 674, 664 and 687 and the set of switch springs S684. Operation of the timer motor 681 continues and ultimately upon the expiration of ten minutes the projection 1218 is rotated around and under the cam follower 1212 so that the set of switch springs S684 is opened and the set of switch springs S685 is closed. Opening of the set of switch springs S684 interrupts the holding circuit for retaining operated the start relay R686, whereby the latter relay restores shortly thereafter, it being of the slow-to-release type. Closing of the set of switch springs S685 applies ground potential via the contacts 687, 664, and 674 to the signal-out conductor C603.

After the expiration of a short time interval, the start relay R686 restores interrupting, at the contacts 687, a further point in the holding circuit for energizing the winding thereof, as well as a point in the previously traced path for applying ground potential to the signal-out conductor C603, whereby the ground potential mentioned is applied to the signal-out conductor C603 only during the short time interval or restoration time of the start relay R686. Also upon restoring the start relay R686 interrupts, at the contacts 688, the circuit for energizing the windings 1203 of the start motor 681 so that the armature 1205 is returned to its normal lower position causing the drive gear 1207 to disengage the driven gear 1208. At this time, the energy that was stored in the spring 1214 is released, whereby the cam 1211 is rotated in the counterclockwise direction, as viewed from the top of the camshaft 1210, from its limit position back into its normal position, the normal position being re-established by the cooperation between the stops 1215 and 1216. When the cam 1211 is thus moved out of its limit position, the cam follower 1212 disengages the projection 1218 so that the set of switch springs S685 is opened and the set of switch springs S684 is closed. When the cam 1211 is returned back into its normal position, the cam follower 1213 again engages the notch 1217 closing the set of switch springs S682. When the sets of switch springs S682 and S684 are thus reclosed, the pickup circuit for the start relay R686 is again completed so that another cycle of operation of the timer motor 681 may be initiated in the manner described above. Accordingly, the alarm sender 680 is operative cyclically to transmit a pulse of ground potential for a short time interval over the signal-out conductor C603 each ten minute interval of time, as long as the signal-in relay R670 is retained in its operated position and the signal-out relay R660 is retained in its restored position.

In view of the above description of the alarm sender 680 provided at the way station 30, it is believed that the mode of operation of the alarm receiver 770 provided in the main office 40 will be apparent.

In the main office 40, preferably each of the trunk circuits in the group, including the trunk circuit 700, is identical thereto; which trunk circuit 700, as shown in Fig. 7, terminates in the jack J730 before the operator switchboard 765, as previously noted, and comprises a relay group including a signal-in relay R705, a jack relay R710, and a sleeve relay R720. Also, the trunk circuit 700 comprises a busy lamp L732 and a line lamp L733 disposed at the operator switchboard 765. At this point it is noted that the trunk circuit 700 is connected to the carrier equipment 794 by a pair of line conductors C701 and C702, a signal-out conductor C703 and a signal-in conductor C704; and that the apparatus provided in the carrier equipment 794, as previously explained, comprises a signal-in relay R795 and a signal-out relay R797.

Preferably, each of the cord circuits disposed at the operator switchboard 765 is identical to the cord circuit 766 which, as shown in Fig. 7, terminates into front and rear plugs P748 and P758, respectively, and comprises a dial D760, a dial key K737, a ring key K736, a talk front key K734 and a talk rear key K735. Also, the cord circuit 766 comprises a front supervisory lamp L747, a rear supervisory lamp L757 and a relay group including a dial front relay R740, a supervisory front relay R745, a dial rear relay R750 and a supervisory rear relay R755. Finally, it is noted that the cord circuit 766 is associated with a headset 767 disposed at the operator switchboard 765 and with an interrupted generator 738.

Preferably, in the main office 40, each of the alarm receivers is identical to the alarm receiver 770 which comprises, as shown in Fig. 7, a motor 773 operative from a commercial source of single phase A. C. power and operatively associated with two sets of switch springs S777 and S778 and with a gearbox 774. The gearbox 774 is adapted to time operation of the motor 773 and at the expiration of 9½ minutes to close the associated contacts S775 and at the expiration of 10½ minutes to close the associated contacts S776. Further, the alarm receiver 770 comprises a relay group including an alarm relay R780, a start relay R785, a hold relay R790 and a timer relay R700. Finally, the alarm sender 700 comprises an alarm lamp L771, a delayed alarm DA772 and a reset key K773.

In the main office 40, preferably each of the trunk circuits in the group, including the trunk circuit 800, is identical thereto; which trunk circut 800 terminates in the jack J815 before the operator switchboard 765, as previously noted and comprises a relay group including a sleeve relay R820, a signal-out relay R830, a jack relay R835, a hold relay R850, a dial relay R855, a signal-in relay R860, two re-ring relays R865 and R870, a switch relay R880 and an answer relay R890. Also, the trunk circuit 800 comprises a repeating coil RC875, as well as a busy lamp L817 disposed at the operator switchboard 765. At this point it is noted that the trunk circuit 800 is connected to the carrier equipment 894 by a pair of line conductors C801 and C802, a signal-out conductor C803 and a signal-in conductor C804; and that the apparatus provided in the carrier equipment 894, as previously explained, comprises a signal-in relay R895 and a signal-out relay R897.

In the main office 40, as shown in Fig. 8, preferably the local switch train 844, the toll switch train 805 and the incoming selectors 812, etc., are of the conventional Strowger types; while the distributor 843, the line circuits 842, etc., the CLR trunks 846, etc., and the toll trunks inward 809, etc., are of any suitable types. Finally, each of the subscriber substations T41, etc., is provided with conventional substation apparatus.

In the distant office 50, preferably each of the trunk circuits is identical to the trunk circuit 900 which comprises, as shown in Figs. 9 and 10, a relay group including a signal-in relay R920, a hold relay R930, a dial relay R940, a trouble relay R950, a seize relay R955, a switch relay R960, a re-ring relay R970 and an end-of-dial relay R980, an answer relay R975, a line relay R1010, a trouble relay R1020 and a re-ring relay R1025. Also, the trunk circuit 900 comprises a repeating coil RC910. At this point, it is noted that the trunk circuit 900 is connected to the carrier equipment 994 by a pair of line conductors C901 and C902, a signal-out conductor C903 and a signal-in conductor C904; and that the apparatus provided in the carrier equipment 994, as previously explained, comprises a signal-in relay R995 and a signal-out relay R997.

In the distant office 50, as shown in Fig. 10, preferably the local switch train 1054, the toll switch train 1038, the incoming selectors 1036, etc., and the finder-selector links 1062, etc., are of the conventional Strowger types; while the distributor 1053, the line circuits 1052, etc., the C. L. R. trunks 1056, etc., and the toll trunks inward 1066, etc., are of any suitable types. Further the Strowger dial toll board 1060 is of the connection and arrangement of that disclosed in U. S. Patent No. 2,353,212, granted July 11, 1944, to Harvey W. Balzer. Finally, each of the subscriber substations T51, etc., is provided with conventional substation apparatus.

A better understanding of the connection and arrangement of the apparatus incorporated in the automatic telephone system illustrated in Fig. 1 and briefly described above will be facilitated from a consideration of the extension of connections involving the different exchanges and offices as will appear hereinafter.

*Local calls in the remote exchange 10*

First assume that a call initiated at a subscriber substation such, for example, as the subscriber substation T11 in the remote exchange 10 is to be extended to a paystation such, for example, as the paystation T12 therein. When the call is initiated at the calling subscriber substation T11, the line circuit 213, associated with the subscriber line 211, operates to mark the subscriber line 211 as busy to the local connectors 205, etc., having access thereto, and to initiate operation of the distributor 204. The distributor 204 assigns an idle one of the finder-selector links such, for example, as the finder-selector link 203 in the first group for use at this time; whereby the finder of the finder-selector links 203 operates to seize the subscriber line 211. The subscriber at the calling subscriber substation T11 then dials the directory number of the called paystation T12, which may be 112. The selector of the finder-selector link 203 responds to the first digit 1 to select the first group of local connectors, including the local connector 205, and then an idle local connector therein. For example, the selector of the finder-selector link 203 may select the trunk 207 extending to the particular local connector 205; whereupon the local connector 205 is rendered responsive to the next two digits dialed at the calling subscriber substation T11. The subscriber at the calling subscriber substation T11 then proceeds to dial the next two digits 1 and 2; whereby the local connector 205 is operated to seize the line 212 extending to the called paystation T12; whereupon the idle or busy condition of the line 212 is tested by the local connector 205 at this time.

First assuming that the called paystation T12 is busy at this time, the local connector 205 tests the line 212 extending thereto as busy returning busy tone current over the trunk 207, the finder-selector link 203 and the subscriber line 211 to the calling subscriber substation T11 in order to indicate to the subscriber thereat that the desired connection may not be had at this time due to the busy condition of the called paystation T12. The subscriber at the calling subscriber substation T11 then proceeds to release the apparatus in a manner more fully explained hereinafter.

Now assuming that the called paystation T12 is idle at this time, the local connector 205 operates to project ringing current over the line 212 to the called paystation T12 and to return ring-back tone current over the trunk 207 and, consequently, to the calling subscriber substation T11 in order to indicate to the subscriber thereat that the called paystation T12 is being rung. When a person at the called paystation T12 answers the call, the local connector 205 operates in order to reverse the polarity of the trunk 207; whereby the finder-selector link 203 opertes the meter, not shown, associated with the subscriber line 211 in order to meter the call in a conventional manner. At this time, an established connection is completed between the calling subscriber substation T11 and the called paystation T12 and conversation therebetween then proceeds in the usual manner.

At the conclusion of the established connection, when the person at the paystation T12 disconnects, the local connector 205 again operates to reverse the polarity of the trunk 207; however, without effect at this time. Subsequently, when the subscriber at the calling subscriber substation T11 disconnects, the loop circuit extending to the local connector 205 is interrupted in order to cause the local connector 205 and the finder-selector link 203 to be released. When the local connector 205 is thus released, the line 212 extending to the paystation T12 is again marked as idle by the associated line circuit 214 to the local connectors 205, etc., having access thereto. Similarly, when the finder-selector link 203 is thus released, the line 211 extending to the subscriber substation T11 is marked as idle by the associated line circuit 213 to the local connectors 205, etc., having access thereto. Also, when the finder-selector link 203 is thus released, the trunk 207 extending to the local connector 205 is marked as idle to the finder-selector links 203, etc., having access thereto. At this time the established connection between the calling subscriber substation T11 and the called paystation T12 is released and all of the apparatus involved therein is completely released and available for further use.

In view of the foregoing, it will be understood that a connection may be extended from a calling subscriber substation T11, etc., in the remote exchange 10 to another called subscriber substation therein in an identical manner. Also, it will be understood that a connection from a calling paystation T12, etc., in the remote exchange 10 may be extended to a called subscriber substation T11, etc. or to another called paystation therein in a substantially identical manner. In this conjunction, it is noted incident to extending a connection from the calling paystation T12 in the remote exchange 10 to a called subscriber substation or to another called paystation therein, that when the call is answered, the local connector 205 operates to reverse the polarity of the trunk 207 and over the finder-selector link employed and the line 212 to the calling paystation T12. This reversal of polarity to the calling paystation T12 brings about blocking of the transmitter at the calling paystation T12 by the associated copper oxide rectifier unless the person at the paystation T12 has deposited a coin at this time. More particularly, in the event the person at the calling paystation T12 has not deposited a coin at this time, he may hear the person at the called subscriber substation or at the called paystation in the remote exchange 10, but he may not talk to the person mentioned by virtue of the circumstance that the copper oxide rectifier blocks the associated transmitter as a consequence of the reversal of polarity to the calling paystation T12. However, when the person at the calling paystation T12 deposits a coin, the copper oxide rectifier is removed from blocking the transmitter thereat; whereby the connection is completed in the manner previously explained.

*A call from a subscriber substation or paystation in the remote exchange 10 to a subscriber substation or paystation in the tandem exchange 20*

First assume that a call initiated at a subscriber substation such, for example, as the subscriber substation T11 in the remote exchange 10 is to be extended to a subscriber substation such, for example, as the subscriber substation T21 in the tandem exchange 20. When the call is initiated at the calling subscriber substation T11, the line circuit 213 associated with the subscriber line 211 operates to mark the subscriber line 211 as busy to the local connectors 205, etc., having access thereto, and to initiate operation of the distributor 204. The distributor 204 assigns an idle one of the finder-selector links such, for example, as the finder-selector link 203 in the first group for use at this time; whereby the finder of the finder-selector link 203 operates to seize the subscriber line 211.

The subscriber at the calling subscriber substation T11 in the remote exchange 10 then dials a prefix digit such, for example, as the prefix digit 9, indicating that the call is to be extended to the tandem exchange 20, followed by the directory number of the called subscriber substation T21 in the tandem exchange 20, which number may be 121. Thus the subscriber at the calling subscriber substation T11 first dials the prefix digit 9; whereby the selector of the finder-selector link 203 responds to the first digit 9 in order to select the corresponding group of trunks, including the trunk 225, and then an idle trunk therein. For example, the selector of the finder-selector link 203 may select the particular trunk 225, assuming that the trunk circuit 200 is idle at this time; the trunk 225 being marked as idle to the selector of the finder-selector link 203 by the application of battery potential to the control conductor C223 thereof. More particularly, battery potential is normally applied by way of the impedance 257, the contacts 266 and 383 to the control conductor C223 of the trunk 225.

Also, when the selector of the finder-selector link 203 seizes the trunk 225, a loop circuit is completed for energizing the upper and lower windings of the line relay R330 in the trunk circuit 200. This loop circuit extends from ground by way of the contacts 362, the lower winding of the line relay R330 and the contacts 244 to the line conductor C227 of the trunk 225; and from battery potential by way of the upper winding of the line relay R330 and the contacts 242 to the line conductor C226 of the trunk 225. When this loop circuit is thus completed, the line relay R330 operates to complete, at the contacts 331, an obvious circuit for operating the hold relay R380. Upon operating the hold relay R380 interrupts, at the contacts 383, a point in the previously traced path for applying battery potential to the control conductor C223 of the trunk 225; and completes, at the contacts 384, a path including the upper winding of the tone relay R390 for applying ground potential to the control conductor C223 of the trunk 225. When battery potential is thus removed from the control conductor C223 and ground potential is applied thereto, the trunk 225 and, consequently, the trunk circuit 200 is marked as busy to the selectors of the other finder-selector links having access thereto. Also the upper winding of the tone relay R390 is energized causing this relay to operate and complete, at the contacts 391, an obvious path for applying ground potential to the tone start conductor C349, thereby to initiate operation of the associated tone apparatus. Also, the hold relay R380 interrupts, at the contacts 381, a normally completed termination circuit also including the contacts 311, the resistor 344, the contacts 281, the condenser 286 and the condensers 347 and 348 across the line conductors C301 and C302 extending to the carrier equipment 394. Also upon operating the line relay R330 completes, at the contacts 333, an obvious path for applying ground potential to the signal-out conductor C303 extending to the carrier equipment 394 in order to effect operation of the signal-out relay R397 therein. Upon operating the signal-out relay R397 in the carrier equipment 394 closes the contacts 398 included in the plate circuit of the associated transmission amplifier; whereby the 24.55 kc. carrier signal from the associated carrier frequency oscillator is transmitted for signalling purposes over the associated line 60 extending between the remote exchange 10 and the tandem exchange 20.

When the 24.55 kc. carrier signal is received in the carrier equipment 494 disposed in the tandem exchange 20, the carrier equipment 494 brings about restoration of the normally operated signal-in relay R495 therein; whereby the latter relay upon restoring closes the contacts 496 applying ground potential to the signal-in conductor C404 in order to effect operation of the signal-in relay R450 in the trunk circuit 400. Upon operating the signal-in relay R450 completes, at the contacts 452, an obvious circuit for operating the hold relay R400; which latter relay upon operating, completes, at the contacts 405, a circuit, including the contacts 485 for energizing the upper winding of the switch relay R460 in order to cause the latter relay to operate. Upon operating, the switch relay R460 interrupts, at the contacts 466, a normally completed path including the impedance 458 and the contacts 483 for applying battery potential to the control conductor C433 of the trunk 430; and completes, at the contacts 467, a path including the contacts 483, for applying ground potential to the control conductor C433. When battery potential is thus removed from the control conductor C433 and ground potential is applied thereto, the trunk 430 is marked as busy to the incoming selectors 434, etc., and to the selectors of the finder-selector links 426, etc., having access thereto; whereby the trunk circuit 400 is marked as busy to the switches mentioned.

Also, upon operating the switch relay R460 completes, at the contacts 463, a path including the contacts 451, for bridging the right-hand winding of the answer relay R445 across the line conductors C436 and C437 of the trunk 435 extending to the incoming selector 429; whereby the incoming selector 429 operates to return ground potential over the control conductor C438 of the trunk 435 in order to energize in multiple the left-hand winding of the answer relay R445 and the lower winding of the switch relay R460. Accordingly, a holding circuit is thus completed for energizing the lower winding of the switch relay R460; and the left-hand winding of the answer relay R445 is not poled to operate. At this time the incoming selector 429 is conditioned to be responsive to the first digit transmitted thereto over the trunk 435.

The subscriber at the calling subscriber substation T11 in the remote exchange 10 then dials the first digit 1 of the directory number of the called subscriber substation T21 in the tandem exchange 20; whereby the line relay R330 in the trunk circuit 200 follows the single impulse of the first digit 1 restoring and then reoperating. Upon restoring and then reoperating, the line relay R330 interrupts and then recompletes, at the contacts 331, the previously mentioned circuit for maintaining operated the hold relay R380; whereby the latter relay being of the slow-to-release type, remains operated during impulsing.

Also, upon restoring and then reoperating, the line relay R330 completes and then interrupts, at the contacts 332, a circuit, including the contacts 381, for operating the dial relay R320 in order to cause the latter relay to operate and remain operated during impulsing as it is of the slow-to-release type. Upon operating, the dial relay R320 completes, at the contacts 324, an alternative termination circuit including the contacts 311, the resistor 344, the contacts 281, the condenser 286, and the condensers 347 and 348 across the line conductors C301 and C302 extending to the carrier equipment 394. Also, upon restoring and then reoperating, the line relay R330 interrupts and then recompletes, at the contacts 333, the previously mentioned path for applying ground potential to the signal-out conductor C303, thereby to cause the signal-out relay R397 to restore and then to reoperate. When the signal-out relay R397 in the carrier equipment 394 restores and then reoperates, it interrupts and then recompletes, at the contacts 398, the plate circuit of the associated transmitting amplifier; whereby the 24.55 kc. carrier signal is removed from and then reapplied to the line 60 extending between the remote exchange 10 and the tandem exchange 20.

When the 24.55 kc. carrier signal is removed from and then reapplied to the line 60, the signal-in relay R495 in the carrier equipment 494 disposed in the tandem exchange 20 reoperates and then restores, interrupting and then recompleting, at the contacts 496, the previously mentioned path for applying ground potential to the signal-in conductor C404, thereby to cause the signal-in relay R450 in the trunk circuit 400 to restore and then reoperate. Upon restoring and then reoperating, the signal-in relay R450 interrupts and then recompletes, at the contacts 452, the previously mentioned circuit for maintaining operated the hold relay R400; whereby the latter relay being of the slow-to-release type, remains operated during impulsing. Also, upon restoring and then reoperating, the signal-in relay R450 completes and then interrupts, at the contacts 453, a circuit including the contacts 406 for operating the dial relay R455, thereby to cause the latter relay to operate and remain operated during impulsing as it is of the slow-to-release type. Upon operating the dial relay R455 completes, at the contacts 457, an obvious path, including the resistor 454, for short-circuiting the right-hand winding of the answer relay R445. Finally, upon restoring and then upon reoperating, the signal-in relay R450 interrupts and then recompletes, at the contacts 451, the previously traced loop circuit including the line conductors C436 and C437 of the trunk 435 extending to the incoming selector 429; whereby the single impulse of the first digit 1 of the directory number of the called subscriber substation T21 is repeated over the trunk 435 to the incoming selector 429. The incoming selector 429 responds to the digit 1 to select the group of trunks extending to the first group of local connectors, including the local connector 427, and then to select an idle trunk in the group mentioned. For example, the incoming selector 429 may select the trunk 428 extending to the particular local connector 427; whereby the local connector 427 is conditioned to be responsive to the next two digits transmitted over the trunk 435.

At the conclusion of the dialing of the first digit 1 at the calling subscriber substation T11 in the remote exchange 10, the line relay R330 in the trunk circuit 200 is retained in its operated position as previously noted; and shortly thereafter the dial relay R320 restores, as it is of the slow-to-release type. Upon restoring the dial relay R320 interrupts, at the contacts 324, the alternative termination circuit, previously traced, across the line conductors C301 and C302 extending to the carrier equipment 394. Also, at the conclusion of the dialing of the first digit 1 at the calling subscriber substation T11 in the remote exchange 10, the signal-in relay R450 in the trunk circuit 400 is retained in its operated position and shortly thereafter the dial relay R455 restores to interrupt at the contacts 457, the previously traced path, including the resistor 454, for short-circuiting the right-hand winding of the answer relay R445; whereby the right-hand winding of the answer relay R455 is again energized in the previously traced loop circuit including the trunk 435 extending to the incoming selector 429. However, the answer relay R445 is not poled to operate at this time.

At this time the subscriber at the calling subscriber substation T11 in the remote exchange 10 has dialed the first digit 1 of the directory number of the called subscriber substation T21 in the tandem exchange 20; whereby the line relay R330 in the trunk circuit 200 followed the digit mentioned repeating the same to the carrier equipment 394; the signal-out relay R397 in the carrier equipment 394 repeated the digit mentioned over the line 60 to the carrier equipment 494; the signal-in relay R495 in the carrier equipment 494 repeated the digit mentioned to the signal-in relay R450 in the trunk circuit 400; the signal-in relay R450 repeated the digit mentioned over the trunk 435 to the incoming selector 429; and the incoming selector 429 followed the digit mentioned in order to select the idle local connector 427 in the corresponding group. In a similar manner, the subscriber at the calling subscriber substation T11 in the remote exchange 10 dials the second and third digits 2 and 1 of the directory number of the called subscriber substation T21 in the tandem exchange 20; whereby the two digits are repeated in the manner previously explained to the local connector 427. The local connector 427 responds to the second digit 2 of the directory number of the called subscriber substation T21 in the tandem exchange 20 to select the corresponding group of subscriber lines; and then responds to the third digit 1 of the directory number of the called subscriber substation T21 to select the subscriber line 421 extending thereto. At this time the local connector 427 operates to test the idle or busy condition of the called subscriber substation T21 in accordance with conventional practice.

In the event the called subscriber substation T21 is busy at this time, the line circuit 423 individual to the subscriber line 421 extending thereto has marked the condition noted to the local connector 427; whereby the local connector 427 operates to cause busy tone current to be returned over the trunk 428 and the incoming selector 429 and over the line conductors C436 and C437 of the trunk 435. At this time, the line conductor C436 of the trunk 435 is connected by way of the contacts 463, 456 and 462 to the line conductor C402 extending to the carrier equipment 494; and the line conductor C437 of the trunk 435 is connected by way of the contacts 451 and 465 to the line conductor C401 extending to the carrier equipment 494. Accordingly, busy tone current is returned over the above traced path including the line conductors C401 and C402 to the carrier equipment 494; whereby the balanced modulator therein operates to transmit the lower side band of the 15.95 kc. carrier signal modulated by the audio busy signal over the line 60 extending between the tandem exchange 20 and the remote exchange 10. When the lower side band of the 15.95 kc. carrier signal modulated by the audio busy signal is received by the carrier equipment 394 in the remote exchange 10, the balanced demodulator therein demodulates the received signal transmitting the modulating audio busy signal component thereof over the line conductors C301 and C302 that are coupled by way of the previously traced circuit to the line conductors C226 and C227 of the trunk 225. The audio busy signal returned over the line conductors C226 and C227 of the trunk 225 is returned over the finder-selector link 203 and the subscriber line 211 to the calling subscriber substation T11 in the remote exchange 10, thereby to indicate to the subscriber thereat that the desired connection may not be had at this time by virtue of the busy condition of the called subscriber substation T21 in the tandem exchange 20. The subscriber at the calling subscriber substation T11 in the remote exchange 10 then proceeds to release the apparatus in a manner more fully explained hereinafter.

Now assuming that the called subscriber substation T21 in the tandem exchange 20 is dialed when the local connector 427 operates to select the subscriber line 421 extending thereto, the local connector 427 operates to project ringing current over the subscriber line 421 extending to the called subscriber substation T21 and to effect operation of the line circuit 423 associated with the subscriber line 421 in order to mark the subscriber line 421 as busy to the other local connectors in the associated group. Also, the local connector 427 returns ring-back tone current over the trunk 428, the incoming selector 429 and the line conductors C436 and C437 of the trunk 435; which audio ring-back tone current effects operation of the carrier equipment 494 in the tandem exchange 20 and the carrier equipment 394 in the remote exchange 10 in the manner previously explained; whereby the audio ring-back tone current is returned over the trunk circuit 200, the trunk 225, the finder-selector link 203 and the subscriber line 211 to the calling subscriber substation T11 in the remote exchange 10 in order to indicate to the subscriber thereat that the subscriber at the called subscriber substation T21 in the tandem exchange 20 is being rung.

When the subscriber at the called subscriber substation T21 in the tandem exchange 20 answers the call, the local connector 427 operates to reverse the polarity of the trunk 428 and, consequently, the polarity of the line conductors C436 and C437 of the trunk 435 over the incoming selector 429; whereby the right-hand winding of the answer relay R445 in the trunk circuit 400 is poled to operate. Upon operating the answer relay R445 interrupts, at the contacts 446, a normally completed termination circuit including the condenser 443, the resistor 444 and the contacts 471 across the line conductors C401 and C402 extending to the carrier equipment 494 and completes, at the contacts 447, an obvious circuit for energizing the upper winding of the supervisory relay R440 in order to cause the latter relay to operate. Upon operating, the supervisory relay R440 completes, at the contacts 442, an obvious path for applying ground potential to the signal-out conductor C403 in order to effect operation of the signal-out relay R497 in the carrier equipment 494. Upon operating the signal-out relay R497 in the carrier equipment 494 closes the contacts 498 included in the plate circuit of the associated transmitting amplifier; whereby the associated carrier frequency oscillator transmits the 15.95 kc. carrier signal over the line 60 extending between the tandem exchange 20 and the remote exchange 10.

When the 15.95 kc. carrier signal is received by the carrier equipment 394 in the remote exchange 10, the apparatus incorporated therein effects the restoration of the signal-in relay R395 therein. Upon restoring the signal-in relay R395 in the carrier equipment 394 completes, at the contacts 396, a path for applying ground potential to the signal-in conductor C304 in order to effect operation of the signal-in relay R350 in the trunk circuit 200. Upon operating the signal-in relay R350 completes, at the contacts 352, an obvious circuit for operating the hold relay R340. Upon operating, the hold relay R340 completes, at the contacts 341, a circuit including the contacts 385 and 256 for operating shortly thereafter the timer relay R235, the latter relay being of the slow-to-operate type. Upon operating the timer relay R235 completes, at the contacts 237, a circuit, including the contacts 352, for operating the reverse battery relay R240. Upon operating the reverse battery relay R240 reverses, at the contacts 241, 242, 243 and 244, the polarity of the line conductors C226 and C227 of the trunk 225 with respect to the upper and lower windings of the line relay R330 in the trunk circuit 200. When the polarity of the trunk 225 is thus reversed, the meter, not shown, associated with the calling subscriber line 211 is operated in order to meter the call from the calling subscriber substation T11 in the remote exchange 10 to the called subscriber substation T21 in the tandem exchange 20.

At this time a connection is established between the calling subscriber substation T11 in the remote exchange 10 and the called subscriber substation T21 in the tandem exchange 20. When an audio signal originates at the calling subscriber substation T11, it is transmitted over the previously traced path including the line conductors C301 and C302 to the carrier equipment 394 in the remote exchange 10; whereby the carrier equipment 394 operates to transmit the lower side band of the 24.55 kc. carrier signal (21.7 to 24.3 kc.) over the line 60. When the carrier equipment 494 in the tandem exchange 20 receives the lower side band of the 24.55 kc. carrier signal (21.7 to 24.3 kc.) it operates to transmit the audio component thereof over the previously traced path including the line conductors C401 and C402 to the called subscriber substation T21. Similarly, when an audio signal originates at the called subscriber substation T21, it is transmitted over the previously traced path including the line conductors C401 and C402 to the carrier equipment 494 in the tandem exchange 20; whereby the carrier equipment 494 operates to transmit the lower side band of the 15.95 kc. carrier signal (13.1 to 15.7 kc.) over the line 60. When the carrier equipment 493 in the remote exchange 10 receives the lower side band of the 15.95 kc. carrier signal (13.1 to 15.7 kc.) it operates to transmit the audio component thereof over the previously traced path including the line conductors C301 and C302 to the calling subscriber substation T11.

At the conclusion of the established connection, when the subscriber at the called subscriber substation T21 in the tandem exchange 20 disconnects, the local connector 427 again operates to reverse the polarity over the trunk 428 and the incoming selector 429 to the line conductors C436 and C437 of the trunk 435; whereby the right-hand winding of the answer relay R445 in the trunk circuit 400 is poled to restore. Upon restoring, the answer relay R445 recompletes, at the contacts 446, the previously traced termination circuit across the line conductors C401 and C402 extending to the carrier equipment 494; and interrupts, at the contacts 447, the previously mentioned circuit for energizing the upper winding of the supervisory relay R440 in order to cause the latter relay to restore shortly thereafter, it being of the slow-to-release type. Upon restoring, the supervisory relay R440 interrupts, at the contacts 442, the previously mentioned path for applying ground potential to the signal-out conductor C403, thereby to effect the restoration of the signal-out relay R497 in the carrier equipment 494. Upon restoring the signal-out relay R497 interrupts, at the contacts 498, the plate circuit of the associated transmitting amplifier; whereby the 15.95 kc. carrier signal is removed from the line 60. When the 15.95 kc. carrier signal is thus removed from the line 60, the carrier equipment 394 responds effecting reoperation of the signal-in relay R395 therein. Upon reoperating the signal-in relay R395 in the carrier equipment 394 interrupts, at the contacts 396, the previously mentioned path for applying ground potential to the signal-in conductor C304; thereby to effect the restoration of the signal-in relay R350 in the trunk circuit 200. Upon restoring, the signal-in relay R350 interrupts, at the contacts 352, the previously traced multiple circuits for maintaining operated the hold relay R340 and the reverse battery relay R240; whereby the hold relay R340 being of the slow-to-release type, restores shortly thereafter and the reverse battery relay R240 restores immediately. Upon restoring the reverse battery relay R240 again reverses, at the contacts 241, 242, 243 and 244, the polarity of the trunk 225 with respect to the upper and lower windings of the line relay R330; however, without effect at this time. Upon restoring the hold relay R340 interrupts, at the contacts 341, the previously traced circuit for maintaining operated the timer relay R235.

When the subscriber at the calling subscriber substation T11 in the remote exchange 10 then disconnects, the previously traced loop circuit for maintaining operated the line relay R330 in the trunk circuit 200 is interrupted. Upon restoring, the line relay R330 interrupts, at the contacts 331, the previously traced circuit for maintaining operated the hold relay R380 in order to cause the latter relay to restore shortly thereafter, it being of the slow-to-release type. Also, upon restoring the line relay R330 interrupts, at the contacts 333, the previously mentioned path for applying ground potential to the signal-out conductor C303, thereby to effect the restoration of the signal-out relay R397 in the carrier equipment 394. Upon restoring, the hold relay R380 recompletes at the contacts 381, the previously traced termination circuit including the resistor 344 and the condenser 286 as well as the condensers 347 and 348 across the line conductors C301 and C302 extending to the carrier equipment 394; and interrupts, at the contacts 384, the previously traced path for applying ground potential by way of the upper winding of the tone relay R390 to the control conductor C223 of the trunk 225; and recompletes, at the contacts 383, the previously traced path for applying battery potential by way of the impedance 257 to the control conductor C223 of the trunk 225 in order to cause the tone relay R390 to restore. When ground potential is thus removed from the control conductor C223 of the trunk 225 and battery potential is reconnected thereto, the finder-selector link 203 is released and the trunk 225 is marked as idle to the selectors of the finder-selector links 203, etc., having access thereto. When the finder-selector link 203 is thus released, the line circuit 213 operates in order to mark the subscriber line 211 extending to the subscriber substation T11 as idle to the local connectors 205, etc., having access thereto.

When the signal-out relay R397 in the carrier equipment 394 restores, it interrupts, at the contacts 398, the plate circuit of the associated transmitting amplifier; whereby the 24.55 kc. carrier signal is thus removed from the line 60. When the 24.55 kc. carrier signal is thus removed from the line 60, the carrier equipment 494 responds, effecting reoperation of the signal-in relay R495 therein. Upon reoperating, the signal-in relay R495 in the carrier equipment 494 interrupts, at the contacts 496, the previously mentioned path for applying ground potential to the signal-in conductor C404; thereby to effect restoration of the signal-in relay R450 in the trunk circuit 400. Upon restoring the signal-in relay R450 interrupts, at the contacts 451, the previously traced loop circuit extending between the right-hand winding of the answer relay R445 and the trunk 435; whereby the local connector 427 and the incoming selector 429 included in this loop circuit are released. When the local connector 427 is thus released the line circuit 423 is operated in order to mark the subscriber line 421 extending to the subscriber substation T21 as idle to the local connectors 427, etc., having access thereto. When the incoming selector 429 is thus released, the trunk 428 extending to the local connector 427 is marked as idle to the incoming selectors 429, etc. having access thereto. Also, when the incoming selector 429 is thus released, ground potential therein is removed from the control conductor C438 of the trunk 435, thereby to interrupt the previously traced multiple circuits for energizing the left-hand winding of the answer relay R445 and the lower winding of the switch relay R460. Also, upon restoring, the signal-in relay R450 interrupts, at the contacts 452, the previously traced circuit for maintaining operated the hold relay R400; whereby the latter relay restores shortly thereafter, it being of the slow-to-release type. Upon restoring the hold relay R400 interrupts, at the contacts 405, the previously traced circuit for energizing the upper winding of the switch relay R460 in order to cause the latter relay to restore. Upon restoring the switch relay R460 interrupts, at the contacts 467, the previously traced path for applying ground potential to the control conductor C433 of the trunk 430 and recompletes, at the contacts 466, the previously traced path for applying battery potential by way of the impedance 458 to the control conductor C433; whereby the trunk 430 is marked as idle to the incoming selectors 434, etc., and to the selectors of the finder-selector links 426, etc., having access thereto.

At this time, the established connection between the calling subscriber substation T11 in the remote exchange 10 and the called subscriber substation T21 in the tandem exchange 20 is released and all of the apparatus involved therein is completely released and available for further use.

In view of the foregoing, it will be understood that a connection may be extended from a calling subscriber substation T11, etc., in the remote exchange 10 to a called paystation T22, etc., in the tandem exchange 20 in an identical manner. Also, it will be understood that a connection from a calling paystation T12, etc., in the remote exchange 10 may be extended to a called subscriber substation T21, etc., or to a called paystation T22, etc., in the tandem exchange 20 in a substantially identical manner. In this conjunction, it is noted incident to extending a connection from the calling paystation T12 in the remote exchange 10 to a called subscriber substation or to a called paystation in the tandem exchange 20, that when the call is answered, the apparatus operates in order to effect operation of the reverse battery relay R240 in the trunk circuit 200; whereby the polarity of the trunk 225 is reversed with respect to the upper and lower windings of the line relay R330 in the trunk circuit 200; all in the manner previously explained. This reversal of polarity over the trunk 225 and over a finder-selector link such, for example, as the finder-selector link 203 and the line 212 extending to the paystation T12 brings about blocking of the transmitter at the paystation T12 by the associated copper oxide rectifier, unless the person at the paystation T12 has deposited a coin at this time. More particularly, in the event the person at the calling paystation T12 has not deposited a coin at this time, he may hear the person at the called subscriber substation or at the called paystation in the tandem exchange 20, but he may not talk to the person mentioned by virtue of the circumstance that the copper oxide rectifier blocks the associated transmitter as a consequence of the reversal of the polarity to the calling paystation T12. However, when the person at the calling paystation T12 deposits a coin, the copper oxide rectifier is removed from blocking the transmitter thereat; whereby the connection is completed in the manner previously explained.

*A call from a subscriber substation or paystation in the remote exchange 10 to the operator switchboard in the main office 40*

First assume that a call initiated at a subscriber substation, such, for example, as the subscriber substation T11 in the remote exchange 10 is to be extended to the operator switchboard 765 in the main office 40. Now assume that the finder of the finder-selector link 203 has operated to seize the subscriber line 211 extending to the calling subscriber substation T11 and that the selector of the finder-selector link 203 is conditioned to respond to the first digit dialed. The subscriber at the calling subscriber substation T11 in the remote exchange 10 then dials the two digits assigned as the directory number of the operator switchboard 765 in the main office 40; which digits may be 0 and 0. When the first digit 0 is dialed at the calling subscriber substation T11 in the remote exchange 10, the selector of the finder-selector link 203 responds to select an associated group of trunks, including the trunk 220, and then to select an idle trunk in the group mentioned. For example, the selector of the finder-selector link 203 may select the particular trunk 220 extending to the trunk circuit 200, the trunk 200 being marked as idle by the application of battery potential by way of the previously traced path, including the impedance 257, to the control conductor C223 thereof. Also, when the selector of the finder-selector link 203 seizes the trunk 220, a loop circuit is completed for energizing in series the upper and lower windings of the line relay R330 and the upper winding of the series relay R250 in the trunk circuit 200. More particularly, ground potential is connected by way of the contacts 362, the lower winding of the line relay R330 and the upper winding of the series relay R250 to the line conductor C222 of the trunk 220; and battery potential is connected by way of the upper winding of the line relay R330 to the line conductor C221 of the trunk 220. When this loop circuit is thus completed, both the line relay R330 and the series relay R250 operate. Upon operating, the line relay R330 completes, at the contacts 331, the previously mentioned circuit for operating the hold relay R380. Upon operating, the hold relay R380 interrupts, at the contacts 381, the previously traced termination circuit, including the resistor 344 and the condenser 286, as well as the condensers 347 and 348, across the line conductors C301 and C302 extending to the carrier equipment 394. Also, the hold relay R380 interrupts, at the contacts 383, the previously traced path for applying battery potential by way of the impedance 257 to the control conductor C223 of the trunk 220; and completes, at the contacts 384, the previously traced path for applying ground potential by way of the upper winding of the tone relay R390 to the control conductor C223 of the trunk 220; whereby the tone relay R390 operates and the trunk 220 is marked as busy to the selectors of the other finder-selector links having access thereto. Upon operating, the series relay R250 first completes, at the contacts 252, a holding circuit, including the contacts 382, for energizing the lower winding thereof; and then completes, at the contacts 251, an obvious path for short-circuiting the upper winding thereof; whereby a simple loop circuit is completed between the calling subscriber substation T11 and the line relay R330. Also, the line relay R330 effects operation of the signal-out relay R397 in the carrier equipment 394 and the latter relay effects restoration of the signal-in relay R495 in the carrier equipment 494; whereby the signal-in relay R450 in the trunk circuit 400 is operated; all in the manner previously explained. Upon operating, the signal-in relay R450 effects operation of the hold relay R400; upon operating the hold relay R400 effects operation of the switch relay R460; and upon operating the switch relay R460 effects seizure of the incoming selector 429 over the trunk 435; whereby the incoming selector 429 is conditioned to be responsive to the next digit dialed at the calling subscriber substation T11 in the remote exchange 10; all in the manner previously explained.

The subscriber at the calling subscriber substation T11 in the remote exchange 10 then proceeds to dial the second digit 0 of the directory number of the operator switchboard 765 in the main office 40; whereby the line relay R330 in the trunk circuit 200 follows, repeating, at the contacts 333, to the signal-out relay R397 in the carrier equipment 394; the signal-out relay R397 repeats the digit 0, at the contacts 398, over the line 60 to the signal-in relay R495 in the carrier equipment 494; the signal-in-relay R495 repeats the digit 0, at the contacts 496, to the signal-in relay R450 in the trunk circuit 400; and the signal-in relay R450 repeats the digit 0, at the contacts 451, over the trunk 435 to the incoming selector 429; all in the manner previously explained.

During impulsing, the dial relay R320 in the trunk circuit 200 is operated to complete, at the contacts 324, the alternative termination circuit, including the resistor 344 and the condenser 286, across the line conductors C301 and C302 extending to the carrier equipment 394 as previously explained. Also, upon operating the dial relay R320 completes, at the contacts 325, a circuit, including the contacts 382, 245, 254, 363 and 373, for energizing the lower winding of the digit relay R370; and a substantially identical circuit, also including the contacts 377 and 367 and the resistor 345 for energizing the upper winding of the digit relay R370; whereby the latter relay operates through its first step, it being of the two-step type. Upon operating through its first step, the digit relay R370 completes, at the contacts 375, a path, including the contacts 373, 363, 325 and 365, for short-circuiting the upper winding thereof. Also during impulsing, the dial relay R455 in the trunk circuit 400 is operated, as previously noted, to complete, at the contacts 457, the previously traced path, including the resistor 454, for short-circuiting the right-hand winding of the answer relay R445.

The incoming selector 429 responds to the digit 0 to select the group of trunks, including the trunk 515, and then to select an idle trunk in the group mentioned. For example, the incoming selector 429 may select the particular trunk 515 extending to the trunk circuit 500; the trunk 515 being marked as idle by the application of battery potential upon the control conductor C513 thereof via the contacts 578 and 639 and the resistor 617. Also there is completed a loop circuit between the right-hand winding of the answer relay R445 in the trunk circuit 400 and the upper and lower windings of the line relay R610 in the trunk circuit 500. This loop circuit extends from ground by way of the lower winding of the line relay R610, the contacts 634, the winding 652 of the repeating coil RC650 and the contacts 532 to the line conductor C516 of the trunk 515; and from battery potential by way of the upper winding of the line relay R610, the contacts 632, the winding 651 of the repeating coil RC650 and the contacts 534 to the line conductor C517 of the trunk 515. The line conductors C516 and C517 of the trunk 515 are connected by way of the incoming selector 429 to the line conductors C436 and C437 of the trunk 435; which last mentioned line conductors are connected by way of the contacts 463 and 451 to the upper and lower terminals of the right-hand winding of the answer relay R455. However, at this time, the right-hand winding of the answer relay R445 is short-circuited by way of the contacts 457 and the resistor 454; whereby only the upper and lower windings of the line relay R610 in the trunk circuit 500 are energized at this time.

Shortly following the conclusion of the second digit 0 dialed at the calling subscriber substation T11, the dial relay R320 in the trunk circuit 200 restores as it is of the slow-to-release type, as previously explained, interrupting, at the contacts 324, the previously traced alternative termination circuit, including the resistor 344 and the condenser 286, across the line conductors C301 and C302 extending to the carrier equipment 394. Also upon restoring, the dial relay R320 interrupts, at the contacts 325, the previously traced path for short-circuiting the upper winding of the digit relay R370; whereby the upper and lower windings thereof are energized in series circuit relation by way of a circuit, including the contacts 375, 365, 254, 245 and 382, causing the digit relay R370 to operate through its second step. When the digit relay R370 operates through its second step, it interrupts, at the contacts 377, a point in the previously traced circuit for energizing the upper winding thereof in multiple with the lower winding thereof; and prepares, at the contacts 376, a point in a substantially identical circuit traced hereinafter for energizing the lower winding of the digit relay R360; and prepares, at the contacts 374, a circuit traced hereinafter for energizing in multiple the upper and lower windings of the digit relay R360.

Also, shortly following the conclusion of the second digit 0 dialed at the calling subscriber substation T11, the dial relay R455 in the trunk circuit 400 restores as it is of the slow-to-release type, as previously explained, interrupting, at the contacts 457, the previously traced path for short-circuiting the right-hand winding of the answer relay R445; whereby the right-hand winding of the answer relay R445 in the trunk circuit 400 is energized in series with the upper and lower windings of the line relay R610 in the trunk circuit 500 over the previously traced loop circuit. However, the answer relay R445 is not poled to operate at this time.

When the upper and lower windings of the line relay R610 are thus energized, the latter relay operates to complete, at the contacts 614, an obvious circuit for operating the hold relay R570. Upon operating, the hold relay R570 completes, at the contacts 575, a path, including the contacts 546, for applying ground potential to the ringing machine start conductor C526 in order to initiate operation of the associated ringing machine. Also, the hold relay R570 interrupts, at the contacts 578, the previously traced path for applying battery potential by way of the resistor 617 to the control conductor C513 and completes, at the contacts 577, an obvious path for applying ground potential by way of the lower winding of the tone relay R565 to the control conductor C513 in order to cause operation of the tone relay R565. When battery potential is thus removed from the control conductor C513 of the trunk 515 and ground potential is applied thereto, the trunk 515 is marked as busy to the incoming selectors 429, etc., having access thereto. Also the hold relay R570 completes, at the contacts 576, an obvious circuit for energizing the lower winding of the control relay R590 in order to cause the latter relay to operate.

At this point it is noted that a circuit is normally completed for maintaining operated the seize relay R585 in the trunk circuit 500, which normally completed circuit extends from battery potential by way of the winding of the seize relay R585 and the contacts 592 to the simplex between the windings 653 and 654 of the repeating coil RC650 in the trunk circuit 500; and from ground potential by way of the contacts 661 and 671 and the copper oxide rectifier 666 to the simplex between the windings 676 and 677 of the repeating coil RC675 in the trunk circuit 600; the simplex of the repeating coil RC650 is connected by way of the windings 653 and 654 thereof and the line conductors of the trunk line 665 extending between the tandem exchange 20 and the way station 30 and the windings 676 and 677 of the repeating coil RC675 to the simplex thereof. The copper oxide rectifier 666 in the trunk circuit 600 is poled to pass current in the direction noted; whereby the winding of the seize relay R585 in the trunk circuit 500 is normally energized causing the latter relay to be normally operated. Upon operating, the control relay R590 interrupts, at the contacts 592, the above traced normally completed circuit for maintaining operated the seize relay R585; and completes, at the contacts 593, a path, including the contacts 612, for applying positive potential from the booster battery 616 by way of the lower winding of the pulse relay R620 to the simplex between the windings 653 and 654 of the repeating coil RC650 in the trunk circuit 500; whereby current traverses the trunk line 665 to the simplex between the windings 676 and 677 of the repeating coil RC675 in the trunk circuit 600 and is thence conducted by way of the copper oxide rectifier 667, the lower winding of the signal-out relay R660 and the contacts 672 to ground potential. At this point, it is noted that the copper oxide rectifier 667 is poled to pass current from the booster battery 616 in the trunk circuit 500 over the trunk line 665 and through the lower winding of the signal-out relay R660 in the trunk circuit 600. Accordingly, the lower winding of the pulse relay R620 in the trunk circuit 500 is energized in series with the lower winding of the signal-out relay R660 in the trunk circuit 600; whereby the relays mentioned operate, the pulse relay R620 being of the marginal type.

Also upon operating, the hold relay R570 completes, at the contacts 574, a path, including the contacts 543, 644 and 553, for connecting ground potential to the line conductor C512 of the trunk 510 and, consequently, by way of the contacts 532 to the line conductor C516 of the trunk 515. Also the hold relay R570 completes, at the contacts 571, a path including the condenser 624, the contacts 641, 561, 551 and the condenser 525, for connecting the generator conductor C623 to the line conductor C511 of the trunk 510 and, consequently, by way of the contacts 534 to the line conductor C517 of the trunk 515; whereby ring-back tone current is returned from the trunk circuit 500 over the trunk 515 and, consequently, over the incoming selector 429, the trunk 435 and the previously traced path including the line conductors C401 and C402 to the carrier equipment 494. The audio ring-back tone signal effects operation of the carrier equipment 494 in the tandem exchange 20; whereby the 15.95 kc. carrier signal is modulated thereby and projected over the line 60 to the carrier equipment 394 in the remote exchange 10. The carrier equipment 394 responds thereto and causes the audio ring-back tone signal to be returned over the previously traced path including the line conductors C301 and C302, to the calling subscriber substation T11 in order to indicate to the subscriber thereat that the operator is being rung.

Upon operating, the signal-out relay R660 in the trunk circuit 600 interrupts, at the contacts 661, the previously traced path for connecting direct ground potential by way of the contacts 671 and the copper oxide rectifier 666 to the simplex between the windings 676 and 677 of the repeating coil RC675; however without effect at this time since the positive potential from the booster battery 616 in the trunk circuit 500 cannot traverse the copper oxide rectifier 666 in the trunk circuit 600 in the direction indicated. Also, the signal-out relay R660 completes, at the contacts 662, an alternative path including the contacts 671 and the copper oxide rectifier 666 for connecting ground potential by way of the upper winding thereof to the simplex between the windings 676 and 677 of the repeating coil RC675; however without effect since the copper oxide rectifier 666 will not pass current in the direction indicated from the booster battery 616 in the trunk circuit 500. Further, the signal-out relay R660 in the trunk circuit 600 completes, at the contacts 663, a path for applying ground potential to the signal-out conductor C603, thereby to effect operation of the signal-out relay R697 in the carrier equipment 694.

Upon operating, the signal-out relay R697 completes, at the contacts 698, the plate circuit of the associated transmitting amplifier; whereby the 24.55 kc. carrier signal is transmitted from the carrier equipment 694 at the way station 30 over the line 70 to the carrier equipment 794 in the main office 40. The carrier equipment 794 responds to the 24.55 kc. carrier signal transmitted thereto in order to effect restoration of the signal-in relay R795 therein; whereby the latter relay completes, at the contacts 796, an obvious path for applying ground potential to the signal-in conductor C704 in order to energize the lower winding of the signal-in relay R705 in the trunk circuit 700. Shortly thereafter, the lower winding of the signal-in relay R705 is thus energized, the latter relay operates, it being rendered slightly slow-to-operate by virtue of the normally completed path, including the contacts 715, for short-circuiting the upper winding thereof. Upon operating, the signal-in relay R705 completes, at the contacts 707, an obvious circuit for illuminating the busy lamp L732 and an obvious multiple circuit, including the contacts 714, for illuminating the line lamp L733. The illumination of the busy lamp L732 indicates to the operator at the switchboard 765 that the trunk circuit 700 is busy at this time; while the illumination of the line lamp L733 indicates to the operator mentioned that a call is on the trunk circuit 700 waiting to be answered at this time.

Upon observing the illuminated condition of the line lamp L733, the operator at the switchboard 765 selects an idle cord circuit such, for example, as the cord circuit 766 and inserts the front plug P748 thereof into the jack J730 terminating the trunk circuit 700. When the front plug P748 is thus inserted into the jack J730, the contacts 731 thereof are closed completing an obvious circuit for operating the jack relay R710. Also, the sleeve of the front plug P748 engages the sleeve of the jack J730 completing a series circuit, including the contacts 741, for energizing the lower winding of the sleeve relay R720 in the trunk circuit 700 and the winding of the front supervisory relay R745 in the cord circuit 766. When this series circuit is completed, the sleeve relay R720 operates; however, the front supervisory relay R745 does not operate as it is of the marginal type. Also the operator at the switchboard 765 operates the talk front key K734 of the cord circuit 766 in order to bridge the headset 767 thereat across the tip and the ring of the front plug P748. Upon operating the sleeve relay R720 interrupts, at the contacts 725, a normally completed termination circuit, including the resistor 717 across the line conductors C701 and C702 extending to the carrier equipment 794; and completes, at the contacts 723 and 726, a direct connection between the tip and the ring of the jack J730 and the line conductors C701 and C702 extending to the carrier equipment 794; whereby the headset 767 at the operator switchboard 765 is operatively connected by way of the line conductors C701 and C702 to the carrier equipment 794 at this time.

Also upon operating, the sleeve relay R720 completes, at the contacts 721, a path, including the contacts 711, for applying battery potential by way of the resistor 709 to the signal-out conductor C703 in order to effect operation of the signal-out relay R797 in the carrier equipment 794; whereby the latter relay closes the contacts 798 in the plate circuit of the associated transmitting amplifier causing the 15.95 kc. carrier signal to be transmitted from the carrier equipment 794 over the line 70 to the carrier equipment 694 at the way station 30. The carrier equipment 694 at the way station 30 responds to the 15.95 kc. carrier signal effecting restoration of the signal-in relay R695 therein; whereby the latter relay interrupts, at the contacts 696, a normally completed path for applying battery potential to the signal-in conductor C604 in order to effect restoration of the signal-in relay R670 in the trunk circuit 600. Upon restoring, the signal-in relay R670 interrupts, at the contacts 672, the previously traced circuit for energizing the lower winding of the signal-out relay R660 in the trunk circuit 600 in series with the lower winding of the pulse relay R620 in the trunk circuit 500 and completes, at the contacts 673, a substantially identical alternative circuit for energizing in series the intermediate and lower windings of the signal-out relay R660 and the lower winding of the pulse relay R620. When this alternative series circuit is thus completed, the signal-out relay R660 in the trunk circuit 600 is retained in its operated position; however, the pulse relay R620 in the trunk circuit 500 restores since it is of the marginal type.

Upon restoring, the pulse relay R620 in the trunk circuit 500 completes, at the contacts 622, a holding circuit, including the contacts 586, for energizing the upper winding of the control relay R590 and a multiple circuit, including the contacts 594, for operating the supervisory relay R560. Upon operating, the supervisory relay R560 interrupts, at the contacts 561, the previously traced path for connecting the interrupter generator conductor C623 to the line conductor C517 of the trunk 515, thereby to arrest the return of ring-back tone current to the calling subscriber substation T11 in the remote exchange 10. Also, the supervisory relay R560 completes, at the contacts 532, a circuit, including the contacts 573 and 542, for operating the timer relay R550. Upon operating the timer relay R550 interrupts, at the contacts 551, a further point in the previously traced connection between the interrupter generator conductor C623 and the line conductor C517 of the trunk 515; and interrupts, at the contacts 553, the previously traced path for applying ground potential to the line conductor C516 of the trunk 515. Further, the timer relay R550 completes, at the contacts 552 and 554, a path, including the condenser 525, for bridging the upper winding of the tone relay R565 across the line conductors C511 and C512 of the trunk 510; which conductors are connected to the upper and lower terminals of the windings 651 and 652 of the repeating coil RC650, the inner terminals of the windings 651 and 652 being connected together by the condenser 655; whereby any tone current induced in the upper winding of the tone relay R565 from the lower winding thereof traverses the windings 651 and 652 of the repeating coil RC650 and is returned to the operator at the switchboard 765 for a purpose more fully explained hereinafter. Also any tone voltage appearing across the line conductors C516 and C517 of the trunk 515 is connected by way of the contacts 532 and 534 to the line conductors C512 and C511 of the trunk 510 and, consequently, will traverse the windings 651 and 652 of the repeating coil RC650 and will be returned to the operator at the switchboard 765 for a purpose more fully explained hereinafter. At this point it is noted that no tone current is returned to the operator at the switchboard 765 in the main office 40 incident to answering the present call since the call was initiated at the calling subscriber substation T11 in the remote exchange 10.

Also upon operating, the timer relay R550 sets its armature RA555 into vibration; whereby the associated contacts 556 are completed intermittently in order to effect corresponding energization of the winding of the timer relay R540; however the latter relay does not operate at this time as it is of the slow-to-operate type. After a short-time interval, the armature RA555 of the timer relay R550 settles down steadily completing, at the contacts 556, the circuit mentioned for energizing the winding of the timer relay R540 in order to cause the latter relay to operate. Upon operating, the timer relay R540 completes, at the contacts 541, a holding circuit, including the contacts 573 and 562, for energizing the winding thereof; and interrupts, at the contacts 542, the previously traced circuit for maintaining operated the timer relay R550. Upon restoring the timer relay R550 interrupts, at the contacts 552 and 554, the previously traced path for bridging the upper winding of the tone relay R565 across the line conductors S511 and C512 of the trunk 510; thereby to cut off the return of tone to the operator switchboard 765 in the main office 40 in the event a tone voltage is being induced in the upper winding of the tone relay R565 from the lower winding thereof. Also upon operating the timer relay R540 interrupts, at the contacts 546, the previously traced path for applying ground potential to the ringing machine start conductor C525 in order to arrest operation of the associated ringing machine; and completes, at the contacts 545, a holding circuit, including the contacts 575, for maintaining operated the hold relay R570. Finally, the timer relay R540 completes, at the contacts 544, a circuit, including the contacts 622, for operating the reverse battery R530; whereby the latter relay reverses, at the contacts 531, 532, 533 and 534, the polarity of the line conductors C516 and C517 with respect to the upper and lower windings of the line relay R610. When the polarity of the trunk 515 is reversed over the incoming selector 429 and the trunk 435, the right-hand winding of the answer relay R445 in the trunk circuit 400 is poled to operate.

Upon operating the answer relay R445 interrupts, at the contacts 446, the previously traced termination circuit, including the resistor 444 and the condenser 443, across the line conductors C401 and C402 extending to the carrier equipment 494; and effects operation of the supervisory relay R440; the supervisory relay R440 effects operation of the signal-out relay R497 in the carrier equipment 494 and the consequent restoration of the signal-in relay R395 in the carrier equipment 394; whereby the signal-in relay R350 in the trunk circuit 200 is operated; all in the manner previously explained. Upon operating, the signal-in relay R350 effects operation of the hold relay R340 in the manner previously explained. Upon operating, the hold relay R340 completes, at the contacts 341, a circuit, including the contacts 385, 255 and 239, for operating the timer relay R280; whereby the latter relay completes, at the contacts 282 and 283, a path, including the condenser 286, as well as the condensers 347 and 348, for bridging the lower winding of the tone relay R390 across the line conductors C301 and C302 extending to the carrier equipment 394; whereby any tone voltage induced in the lower winding of the tone relay R390 by virtue of tone current traversing the upper winding thereof is impressed across the line conductors C301 and C302 and forwarded over the connection to the called operator switchboard 765 in the main office 40 for a purpose more fully explained hereinafter. In the present example, no tone is forwarded over the connection to the called switchboard 765 in the main office 40 since the present call was originated at the calling subscriber substation T11 in the remote exchange 10.

Also upon operating, the timer relay R280 sets its armature RA284 into vibration; whereby the associated contacts 285 thereof are completed intermittently effecting intermittent energization of the winding of the timer relay R235; however, the latter relay does not operate immediately as it is of the slow-to-operate type. After a short-time interval, the armature RA284 of the timer relay R280 settled down closing steadily the contacts 285; whereby the timer relay R235 operates shortly thereafter as it is of the slow-to-operate type. Upon operating, the timer relay R235 completes, at the contacts 238, a holding circuit, including the contacts 255, 341 and 385 for energizing the winding thereof; and interrupts, at the contacts 239, the previously traced circuit for maintaining operated the timer relay R280. Upon restoring the timer relay R280 interrupts, at the contacts 285, the previously traced original circuit for operating the timer relay R235; however, the latter relay remains in its operated position by virtue of the above traced completed holding circuit therefor. Also upon restoring the timer relay R280 interrupts, at the contacts 282 and 283, the path for bridging the lower winding of the tone relay R390 across the line conductors C301 and C302 extending to the carrier equipment 394. The timer relay R235 effects operation of the reverse battery relay R240, in the manner previously explained. Operation of the reverse battery relay R240 is without effect with reference to the reversal of polarity over the trunk 220; and accordingly, the polarity between the calling subscriber substation T11 and the line relay R330 in the trunk circuit 200 is not reversed at this time. Also upon operating, the reverse battery relay R240 interrupts, at the contacts 245, the previously traced circuit for maintaining operated the digit relay R370; whereby the latter relay restores without effect at this time. Also upon operating, the timer relay R235 completes, at the contacts 236, a holding circuit, including the contacts 382 and 253, for maintaining operated the hold relay R380.

At this time an established connection is completed between the calling subscriber substation T11 in the remote exchange 10 and the called operator switchboard 765 in the main office 40. When an audio signal originates at the calling subscriber substation T11, it is transmitted over the previously traced path including the line conductors C301 and C302 to the carrier equipment 394 in the remote exchange 10; whereby the carrier equipment 394 operates to transmit the lower side band of the 24.55 kc. carrier signal (21.7 to 24.3 kc.) over the line 60. When the carrier equipment 494 in the tandem exchange 20 receives the lower side band of the 24.55 kc. carrier signal (21.7 to 24.3 kc.), it operates to transmit the audio component thereof over the trunk 435, the incoming selector 429 and the trunk 515 to the windings 651 and 652 of the repeating coil RC650 in the trunk circuit 500 in the tandem exchange 20. The audio signal traversing the windings 651 and 652 of the repeating coil RC650 induces a corresponding audio signal in the windings 653 and 654 thereof which is transmitted over the trunk line 665 to the windings 676 and 677 of the repeating coil RC675 in the trunk circuit 600 at the way station 30. The audio signal traversing the windings 676 and 677 of the repeating coil RC675 induces a corresponding audio signal in the windings 678 and 679 thereof which is conducted by way of the line conductors C601 and C602 to the carrier equipment 694 at the way station 30; whereby the carrier equipment 694 operates to transmit the lower side band of the 24.55 kc. carrier signal (21.7 to 24.3 kc.) over the line 70 to the carrier equipment 794 in the main office 40. When the carrier equipment 794 in the main office 40 receives the lower side band of the 24.55 kc. carrier signal (21.7 to 24.3 kc.), it operates to transmit the audio component thereof over the previously traced path including the line conductors C701 and C702, the jack J730 and the front plug P748 of the cord circuit 766 to the headset 767 at the operator switchboard 765. Similarly, when an audio signal originates at the headset 767 at the operator switchboard 765 in the main office 40, it is transmitted over the previously traced path including the front plug P748 of the cord circuit 766, the jack J730 and the line conductors C701 and C702 to the carrier equipment 794 in the main office 40; whereby the carrier equipment 794 operates to transmit the lower side band of the 15.95 kc. carrier signal (13.1 to 15.7 kc.) over the line 70. When the carrier equipment 694 at the way station 30 receives the lower side band of the 15.95 kc. carrier signal (13.1 to 15.7 kc.), it operates to transmit the audio component thereof over the previously traced circuit including the line conductors C601 and C602, the repeating coil RC675 in the trunk circuit 600 at the way station 30, the trunk line 665 extending between the way station 30 and the tandem exchange 20, the repeating coil RC650 in the trunk circuit 500 in the tandem exchange 20, the trunk 515, the incoming selector 429, the trunk 435 and the line conductors C401 and C402 to the carrier equipment 494 in the tandem exchange 20; whereby the carrier equipment 494 operates to transmit the lower side band of the 15.95 kc. carrier signal (13.1 to 15.7 kc.) over the line 60. When the carrier equipment 394 in the remote exchange 10 receives the lower side band of the 15.95 kc. carrier signal (13.1 to 15.7 kc.) it operates to transmit the audio component thereof over the previously traced path including the line conductors C301 and C302 to the calling subscriber substation T11.

The operator at the called switchboard 765 in the main office 40 is advised by the subscriber at the calling subscriber substation T11 in the remote exchange 10 concerning the extension of the call; and then proceeds to extend the call utilizing the rear plug P758 of the cord circuit 766 in a manner more fully explained hereinafter.

At the conclusion of the established connection, when the subscriber at the calling subscriber substation T11 in the remote exchange 10 disconnects, the previously traced loop circuit extending from the calling subscriber substation T11 to the line relay R330 in the trunk circuit 200 is interrupted causing the latter relay to restore. Upon restoring, the line relay R330 interrupts, at the contacts 331, the original circuit for operating the hold relay R380; however, the latter relay is retained in its operated position at this time by virtue of the completed holding circuit for energizing the windings thereof. Also upon restoring, the line relay R330 interrupts, at the contacts 333, the previously mentioned path for applying ground potential to the signal-out conductor C303 in order to effect restoration of the signal-out relay R397 in the carrier equipment 394 and the consequent reoperation of the signal-in relay R495 in the carrier equipment 494 and the resulting restoration of the signal-in relay R450 in the trunk circuit 400; all in the manner previously explained. Upon restoring, the signal-in relay R450 interrupts, at the contacts 452, the previously mentioned circuit for maintaining operated the hold relay R400, thereby to cause the latter relay to restore shortly thereafter, it being of the slow-to-release type. Also, the signal-in relay R450 completes, at the contacts 453, a holding circuit, including the contacts 468 and 441, for energizing the lower winding of the supervisory relay R440. Finally, the signal-in relay R450 interrupts, at the contacts 451, the previously traced loop circuit extending between the right-hand winding of the answer relay R445 in the trunk circuit 400 and the line relay R610 in the trunk circuit 500; whereby the relays mentioned restore. Upon restoring, the answer relay R445 recompletes, at the contacts 446, the previously traced termination circuit, including the resistor 444 and the condenser 443, across the line conductors C401 and C402 extending to the carrier equipment 494; and interrupts, at the contacts 447, the previously traced circuit for energizing the upper winding of the supervisory relay R440; however, the latter relay is retained in its operated position by virtue of the completed holding circuit for energizing the lower winding thereof. Upon restoring, the line relay R610 in the trunk circuit 500 interrupts, at the contacts 614, the previously traced original circuit for operating the hold relay R570; however, the latter relay is retained in its operated position at this time by virtue of the completed holding circuit therefor, including the contacts 575 and 545. Also, the line relay R610 interrupts, at the contacts 612, the previously traced circuit for energizing the lower winding of the pulse relay R620 and the intermediate and lower windings of the signal-out relay R660 in the trunk circuit 600 in series circuit relation; and completes, at the contacts 613, an alternative path, including the contacts 582 and 593, for applying battery potential by way of the upper winding of the pulse relay R620 to the simplex between the windings 653 and 654 of the repeating coil RC650. The pulse relay R620 remains restored and the signal-out relay R660 restores since the the copper oxide rectifier 667 is not poled to permit the passage of current in the direction indicated. Upon restoring, the signal-out relay R660 interrupts, at the contacts 663, the previously mentioned path for applying ground potential to the signal-out conductor C603, thereby to effect the restoration of the signal-out relay R697 in the carrier equipment 694. Upon restoring, the signal-out relay R697 opens the contacts 698 included in the plate circuit of the associated transmitting amplifier; whereby the carrier equipment 694 disconnects the 24.55 kc. carrier signal from the line 70. When the 24.55 kc. carrier signal is thus disconnected from the line 70, the carrier equipment 794 in the main office 40 responds in order to bring about reoperation of the signal-in relay R795 therein; whereby the latter relay interrupts, at the contacts 796, the previously mentioned path for applying ground potential to the signal-in conductor C704 in order to deenergize the lower winding of the signal-in relay R705 in the trunk circuit 700. The signal-in relay R705 then restores to interrupt, at the contacts 707, the previously mentioned original circuit for illuminating the busy lamp L732; however, the latter lamp is retained in its illuminated condition by the operated jack relay R710 at this time. Also, the signal-in relay R705 completes, at the contacts 706, a circuit, including the contacts 712 and 741, as well as the sleeves of the jack J730 and the front plug P748, for energizing the upper winding of the sleeve relay R720 in series with the winding of the supervisory relay R745. The sleeve relay R720 in the trunk circuit 700 already occupies its operated position and the front supervisory relay R745 in the cord circuit 766 operates as it is of the marginal type. Upon operating, the front supervisory relay R745 completes, at the contacts 746, an obvious circuit for illuminating the front supervisory lamp L747 in order to indicate to the operator at the switchboard 765 that the subscriber at the calling subscriber substation T11 in the remote exchange 10 has disconnected.

When the operator at the switchboard 765 in the main office 40 receives disconnect supervision, she withdraws the front plug P748 of the cord circuit 766 from the jack J730 terminating the trunk circuit 700, thereby to interrupt the previously traced circuit for energizing the winding of the front supervisory relay R745 in the cord circuit 766 in series with the parallel connected upper and lower windings of the sleeve relay R720 in the trunk circuit 700; whereby the relays mentioned restore. Also when the front plug P748 of the cord circuit 766 is withdrawn from the jack J730, the contacts 731 are opened, interrupting the circuit for maintaining operated the jack relay R710 in the trunk circuit 700; whereby the latter relay restores shortly thereafter, it being of the slow-to-release type. Upon restoring the front supervisory relay R745 interrupts, at the contacts 746, the previously mentioned circuit for illuminating the front supervisory lamp L747. Upon restoring the jack relay R710 interrupts, at the contacts 713, the previously mentioned circuit for illuminating the busy lamp L732, thereby to indicate that the trunk circuit 700 is idle at this time. Upon restoring, the sleeve relay R720 interrupts, at the contacts 723 and 726, the connection between the tip and the ring of the jack J730 and the line conductors C701 and C702 extending to the carrier equipment 794; and recompletes, at the contacts 725, the previously mentioned termination circuit, including the resistor 717, across the line conductors C701 and C702; and interrupts, at the contacts 721, the previously traced path for applying battery potential by way of the resistor 709 to the signal-out conductor C703 in order to effect restoration of the signal-out relay R797 in the carrier equipment 794. Upon restoring, the signal-out relay R794 opens the contacts 798 included in the plate circuit of the associated transmitting amplifier; whereby the carrier equipment 794 removes the 15.95 kc. carrier signal from the line 70 in order to cause the carrier equipment 694 at the way station 30 to effect reoperation of the signal-in relay R695 therein; whereby the latter relay recompletes, at the contacts 696, the previously mentioned path for applying battery potential to the signal-in conductor C604, effecting the reoperation of the signal-in relay R670 in the trunk circuit 600. Upon reoperating, the signal-in relay R670 recompletes, at the contacts 671, the previously traced path, including the contacts 661 and the copper oxide rectifier 666, for connecting ground potential to the simplex between the windings 676 and 677 of the repeating coil RC675; thereby to complete a circuit also including the contacts 593, 613 and 582 for energizing the upper winding of the pulse relay R620 in the trunk circuit 500. The latter circuit is completed at this time by virtue of the fact that the copper oxide rectifier 666 is poled to pass current in the direction indicated; whereby the pulse relay R620 operates. Upon operating, the pulse relay R620 interrupts, at the contacts 622, the parallel circuits for energizing the upper winding of the control relay R590 and for maintaining operated the reverse battery relay R530 and the supervisory relay R560; whereby the reverse battery relay R530 restores immediately and the supervisory relay R560 restores shortly thereafter as it is of the slow-to-release type. However, the control relay R590 does not restore immediately by virtue of the completed holding circuit, including the contacts 576 of the operated hold relay R570, for energizing the lower winding thereof. Upon restoring the supervisory relay R560 interrupts, at the contacts 562, the previously traced holding circuit for maintaining operated the timer relay R540; whereby the latter relay upon restoring, interrupts, at the contacts 545, the previously traced holding circuit for maintaining operated the hold relay R570. Shortly thereafter, the hold relay R570 restores as it is of the slow-to-release type, interrupting at the contacts 576, the previously traced holding circuit for energizing the lower winding of the control relay R590 in order to cause the latter relay to restore shortly thereafter since it is of the slow-to-release type. Also upon restoring the hold relay R570 interrupts, at the contacts 577, the previously traced circuit for energizing the lower winding of the tone relay R565 and for applying ground potential to the control conductor C513 of the trunk 515; whereby the tone relay R565 restores and the incoming selector 429 is released as a consequence of the removal of ground potential from the control conductor C513 of the trunk 515. Upon restoring the control relay R590 interrupts, at the contacts 593, the previously traced circuit for energizing the upper winding of the pulse relay R620 in order to cause the latter relay to restore; and recompletes, at the contacts 592, the previously traced original circuit for operating the seize relay R585.

When the incoming selector 429 is thus released, ground potential is removed from the control conductor C438 of the trunk 435, thereby to deenergize the left-hand winding of the answer relay R445 and the lower winding of the switch relay R460 in the trunk circuit 400; whereby the switch relay R460 restores, the answer relay R445 being already restored at this time. Upon restoring, the switch relay R460 interrupts, at the contacts 468, the previously traced holding circuit for energizing the lower winding of the supervisory relay R440 in order to cause the latter relay to restore shortly thereafter since it is of the slow-to-release type. Upon restoring the supervisory relay R440 effects the restoration of the signal-out relay R497 in the carrier equipment 494 and the consequent reoperation of the signal-in relay R395 in the carrier equipment 394 and the resulting restoration of the signal-in relay R350 in the trunk circuit 200; all in the manner previously explained. Upon restoring the signal-in relay R350 effects the restoration of the hold relay R340 shortly thereafter since the latter relay is of the slow-to-release type; and effects the restoration of the reverse battery relay R240; all in the manner previously explained. Upon restoring the hold relay R340 interrupts, at the contacts 341, the previously traced holding circuit for maintaining operated the timer relay R235; whereby the latter relay upon restoring, interrupts, at the contacts 236, the previously traced holding circuit for maintaining operated the hold relay R380 in order to cause the latter relay to restore shortly thereafter, it being of the slow-to-release type. Upon restoring, the hold relay R380 interrupts, at the contacts 382, the previously traced holding circuit for energizing the lower winding of the series relay R250 in order to cause the latter relay to restore.

At this time the established connection between the calling subscriber substation T11 in the remote exchange 10 and the called operator switchboard 765 in the main office 40 is released and all of the apparatus involved therein is completely released and available for further use.

In view of the foregoing, it will be understood that a connection may be extended from a calling paystation such, for example, as the paystation T12 in the remote exchange 10 to the called operator switchboard 765 in the main office 40 in a substantially identical manner. However, in this conjunction it is noted that when the selector of the finder-selector link in use, such, for example, as the finder-selector link 203 operates, it responds to the first digit 0 dialed at the calling paystation T12 to select an idle one of the trunks in the group including the trunk 220, such, for example, as the trunk 220 extending to the trunk circuit 200, an additional operation takes place. More particularly, since the present call originates at the paystation T12 in the remote exchange 10, tone potential is applied from the line circuit 214 associated with the line 212 extending thereto through the finder-selector link 203 to the control conductor C223 of the trunk 220; whereby the upper winding of the tone relay R390 is energized with tone current in this case. The tone current traversing the upper winding of the tone relay R390 causes a corresponding tone voltage to be induced in the lower winding thereof; however without effect at this time.

Subsequently, when the operator at the switchboard 765 answers the call on the trunk circuit 700 by inserting the front plug P748 of the cord circuit 766 into the jack J730 terminating the trunk circuit 700, assuming that the apparatus named is utilized in the present connection, the apparatus mentioned operates in the manner previously explained; whereby the timer relay R280 in the trunk circuit 200 first operates and shortly thereafter the timer relay R235 operates effecting the restoration of the timer relay R280 as previously explained. During the time interval that the timer relay R280 occupies its operated position, as noted above, the lower winding of the tone relay R390 is bridged across the line conductors C301 and C302 extending to the carrier equipment 394; whereby the audio tone mentioned is transmitted over the line conductors C301 and C302 to the carrier equipment 394. Shortly thereafter, when the timer relay R280 restores, as noted above, the transmission of the tone current over the line conductors C301 and C302 to the carrier equipment 394 is terminated. Accordingly, a splash of audio tone is transmitted from the trunk circuit 200 over the line conductors C301 and C302 to the carrier equipment 394 for a short-time interval; which audio tone identifies the calling paystation T12 in the remote exchange 10 as a paystation to the operator at the switchboard 765 in the main office 40.

More particularly, the audio tone or signal transmitted to the carrier equipment 394 effects operation of the balanced modulator therein; whereby the 24.55 kc. carrier signal is modulated in accordance with the audio tone signal and transmitted over the line 60 to the carrier equipment 494. The carrier equipment 494 responds to the modulated 24.55 kc. carrier signal transmitting the audio tone component thereof over the previously traced connection including the line conductors C401 and C402, the trunk 435, the incoming selector 429, the trunk 515, the repeating coil RC650 in the trunk circuit 500 in the tandem exchange 20, the trunk line 665 extending between the tandem exchange 20 and the way station 30, the repeating coil RC675 in the trunk circuit 600 at the way station 30 and the line conductors C601 and C602 to the carrier equipment 694. More particularly, the audio tone or signal transmitted to the carrier equipment 695 effects operation of the balanced modulator therein; whereby the 24.55 kc. carrier signal is modulated in accordance with the audio tone signal and transmitted over the line 70 to the carrier equipment 794. The carrier equipment 794 responds to the modulated 24.55 kc. carrier signal transmitting the audio tone component thereof over the previously traced connection including the line conductors C701 and C702 to the headset 767 at the operator switchboard 765 in the main office 40.

This tone signal indicates to the operator at the called switchboard 765 in the main office 40 that the call being answered originated at a paystation in the remote exchange 10, thus reminding the operator at the switchboard 765 to require the person at the calling paystation T12 in the remote exchange 10 to deposit the appropriate amount of money thereat after the connection has been completed to the desired destination.

Of course, it will be understood that when the coins are subsequently deposited at the calling paystation T12 in the remote exchange 10 that apparatus thereat operates in order to transmit identifying tones over the connection in a manner identical to that described above to the operator switchboard 765 in the main office 40.

*Attempted free call from a subscriber substation or paystation in the remote exchange 10 to a subscriber substation or paystation in the tandem exchange 20*

In automatic telephone systems in which free calls are permitted to operator switchboards, subscribers and others occasionally learn of the possibility of a free or non-metering route through the automatic switching apparatus to a distant point which is normally reached via a metering route through the automatic switching apparatus. This unauthorized extension of a connection is usually accomplished by the subscriber or other person dialing the first digit assigned as the directory number of the operator switchboard, followed by the digits comprising the directory number of the desired called subscriber substation or paystation at the remote point. For example, in the present arrangement, a connection from a calling subscriber substation T11, etc., or a calling paystation T12, etc., in the remote exchange 10 may be extended to a called subscriber substation T21, etc., or a called paystation T22, etc., in the tandem exchange 20 via a metering route through the automatic switching apparatus by dialing the prefix digit 9 followed by the director number of the called subscriber substation or paystation mentioned. Also, a connection from a calling subscriber substation T11, etc., or a calling paystation T12, etc., in the remote exchange 10 may be extended to the operator switchboard 765 in the main office 40 via a non-metering route through the automatic switching apparatus by dialing the two digits 0 and 0 assigned as the directory number of the operator switchboard 765 in the main office 40. In order to attempt an unauthorized non-metered call, the subscriber at the calling subscriber substation T11, etc., or at the calling paystation T12, etc., in the remote exchange 10, may dial the prefix digit 0 followed by the directory number of a desired called subscriber substation or paystation in the tandem exchange 20; which combination of digits would accomplish the desired end except for the improved blocking arrangement provided in the trunk circuits 200, etc., described more fully hereinafter.

Now assuming that a call has been initiated at the calling subscriber substation T11 in the remote exchange 10, that the finder of the finder-selector link 203 has seized the subscriber line 211 extending to the calling subscriber substation T11, and that the subscriber at the calling subscriber substation T11 attempts the extension of an unauthorized, unmetered connection to the called subscriber substation T21 in the tandem exchange 20 by dialing the prefix 0 followed by the directory number 121 of the called subscriber substation T21 in the tandem exchange 20. The selector of the finder-selector link 203 responds to the preliminary digit 0 to select the group of trunks, including the trunuk 220, and then an idle trunk therein. For example, the selector of the finder-selector link 203 may select the particular trunk 220 extending to the trunk circuit 200; whereby the apparatus in the trunk circuit 200 is controlled to effect operation of the carrier equipment 394 and 494 and the consequent operation of the trunk circuit 400 to seize the incoming selector 429 in the tandem exchange 20; all in the manner previously explained. However, in order to reach the called subscriber substation T21 in the tandem exchange 20, it is necessary that the switch train therein, including the incoming selector 429, receive the three digits 1, 2 and 1 dialed at the calling subscriber substation T11 in the remote exchange 10 following seizure of the trunk circuit 200 over the trunk 220 by the selector of the finder-selector link 203.

Accordingly, the subscriber at the calling subscriber substation T11 in the remote exchange 10 then proceeds to dial the three digits 1, 2 and 1 comprising the directory number of the called subscriber substation T21 in the tandem exchange 20. The line relay R330 follows the first and second digits 1 and 2 of the directory number mentioned repeating the impulses thereof at the contacts 333 to the signal-out relay R397 in the carrier equipment 394; whereby the two digits mentioned are repeated by the carrier equipment 394 over the line 60 to the carrier equipment 494; whereby the signal-in relay R495 in the carrier equipment 494 repeats, at the contacts 496, the impulses of the two digits mentioned to the signal-in relay R450 in the trunk circuit 400; and the signal-in relay R450 in the trunk circuit 400 repeats, at the contacts 451, the impulses of the two digits mentioned over the trunk 435; all in the manner previously explained. The incoming selector 429 responds to the digit 1 mentioned selecting the corresponding group of trunks, including the trunk 428, and then an idle trunk therein. For example, the incoming selector 429 may select the particular trunk 428 extending to the local connector 427. The local connector 427 then responds to the digit 2 mentioned selecting the corresponding group of subscriber lines including the subscriber line 421; however, at this time and prior to operation of the local connector 427 to select the subscriber line 421 extending to the called subscriber substation T21 in the tandem exchange 20, the trunk circuit 200 in the remote exchange 10 operates to block the connection and to prevent final operation of the local connector 427 in the tandem exchange 20, as noted above.

More particularly, in the trunk circuit 200 when the line relay R330 responds to the first digit 1 mentioned, operation and subsequent restoration of the dial relay R320 is effected in the manner previously explained. Upon operating the dial relay R320 completes, at the contacts 325, the previously traced circuit for energizing in multiple the upper and lower windings of the digit relay R370; whereby the latter relay operates through its first step, completing, at the contacts 375, the previously traced path for short-circuiting the upper winding thereof. Upon restoring the dial relay R320 interrupts, at the contacts 325, the previously traced path for short-circuiting the upper winding of the digit relay R370; whereby the latter relay operates through its second step.

When the line relay R330 then responds to the second digit 2 mentioned, operation and subsequent restoration of the dial relay R320 is effected in the manner previously explained. Upon reoperating, the dial relay R320 completes, at the contacts 325, a circuit, including the contacts 382, 245, 254, 363 and 374, for energizing the upper winding of the digit relay R360; and a substantially identical circuit, also including the contacts 376 and 367 and the resistor 345, for energizing the lower winding of the digit relay R360; whereby the latter relay operates through its first step completing, at the contacts 366, a path including the contacts 325, 363 and 374, for short-circuiting the lower winding thereof. Then upon restoring the dial relay R320 interrupts at the contacts 325, the above traced path for short-circuiting the lower winding of the digit relay R360; whereby the latter relay operates through its second step as a consequence of the energization of the upper and lower windings thereof in series over a circuit, including the contacts 366, 254, 245 and 382. Upon operating through its second step, the digit relay R360 completes, at the contacts 368, a direct path for applying ground potential to the signal-out conductor C303, thereby positively to prevent operation of the line relay R330 to repeat, at the contacts 333, the third digit 1 mentioned over the signal-out conductor C303.

Also, the digit relay F360 interrupts, at the contacts 365, the original circuit, including the contacts 375, 254, 245 and 382, for energizing in series the upper and lower windings of the digit relay R370; and completes, at the contacts 364, an alternative circuit, including the contacts 375, 326, 254, 245 and 382, for energizing in series the upper and lower windings of the digit relay R370. Also, at this time the operated digit relay R360 interrupts, at the contacts 362, a point in the previously traced original loop circuit for energizing in series the upper and lower windings of the line relay R330, and completes, at the contacts 361, a point in an alternative path, also including the contacts 371, and included in the loop circuit for energizing in series the upper and lower windings of the line relay R330.

Accordingly, when the subscriber at the calling subscriber substation T11 in the remote exchange 10 dials the third digit 1 mentioned, the line relay R330 follows effecting reoperation of the dial relay R320 in the manner previously explained. While the line relay R330 operates the contacts 333 in accordance with the single impulse of the present digit 1, this operation is without effect since the operated digit relay R360 retains steadily ground potential at the contacts 368 upon the signal-out conductor C303; whereby the carrier equipment 394 does not receive the third digit 1 mentioned. At this time, upon reoperating, the dial relay R320 interrupts, at the contacts 326, the previously traced alternative circuit for energizing in series the upper and lower windings of the digit relay R370; whereby the latter relay restores. Upon restoring, the digit relay R370 interrupts, at the contacts 371, the alternative point in the previously traced loop circuit for energizing in series the upper and lower windings of the line relay R330; and completes, at the contacts 372, a further circuit, including the contacts 361, for energizing in series the upper and lower windings of the line relay R330 via a loop circuit extending to the calling subscriber substation T11 and also including the secondary winding of the busy tone transformer 346. Accordingly, busy tone current, or alternatively unauthorized tone current traverses the last mentioned loop circuit extending back to the calling subscriber substation T11 in the remote exchange 10, indicating to the subscriber thereat the artificial busy condition or the unauthorized dialing combination that has been employed depending upon the tone utilized, as noted above. Since the subscriber at the calling subscriber substation T11 in the remote exchange 10 cannot control the final operation of the local connector 427 to seize the subscriber line 421 extending to the called subscriber substation T21 in the tandem exchange 20, the further extension of the connection is effectively blocked in the trunk circuit 200. Subsequently, when the subscriber at the calling subscriber substation T11 in the remote exchange 10 disconnects, the local connector 427, the incoming selector 429, the trunk circuit 400 and the carrier equipment 494 in the tandem exchange 20, as well as the carrier equipment 394, the trunk circuit 200 and the finder-selector link 203 in the remote exchange 10 are released in the manner previously explained.

In view of the foregoing, it will be understood that since the above described connection was blocked as a consequence of the dialing of two digits following the seizure of the trunk circuit 200 from the calling subscriber substation T11, that an identical operation takes place in the event a similar unauthorized call is attempted at a paystation T12, etc., in the remote exchange 10.

*A call from the operator switchboard in the main office 40 to a subscriber substation or paystation in the remote exchange 10*

First assume that the operator at the switchboard 765 in the main office 40 has answered a call utilizing the rear plug P758 of the cord circuit 766 thereat that requires completion to a called subscriber substation, such, for example, as the subscriber substation T11 in the remote exchange 10. The operator inserts the front plug P748 of the cord circuit 766 into a jack terminating an idle one of the trunk circuits in the group, including the trunk circuit 700. Assuming that the trunk circuit 700 is idle at this time, as indicated by the unlighted condition of the busy lamp L732, the operator at the switchboard 765 may insert the front plug P748 into the jack J730 terminating the trunk circuit 700, having operated the dial key K737 in the cord circuit 766 to its front position. When the front plug P748 is thus inserted into the jack J730, the contacts 731 thereof are closed completing an obvious circuit for operating the jack relay R710 in the trunk circuit 700. Upon operating the jack relay R710 completes, at the contacts 713, an obvious circuit for illuminating the busy lamp L732 in order to indicate the busy condition of the trunk circuit 700 at this time. Also, when the front plug P748 is inserted into the jack J730, the respective sleeves thereof are engaged, completing a circuit including the contacts 741 for energizing the winding of the front supervisory relay R745 in the cord circuit 766 in series with the lower winding of the sleeve relay R720 in the trunk circuit 700 and a multiple circuit, also including the contacts 712 and 706, for energizing the upper winding of the sleeve relay R720 in multiple with the lower winding thereof. Accordingly, the sleeve relay R720 in the trunk circuit 700 operates and the front supervisory relay R745 in the cord circuit 766 operates as it is of the marginal type. Upon operating, the front supervisory relay R745 completes, at the contacts 746, an obvious circuit for illuminating the front supervisory lamp L747 in order to indicate that the present call has not yet been extended and answered. Also upon operating, the jack relay R710 interrupts, at the contacts 715, the previously mentioned path for short-circuiting the upper winding of the signal-in relay R705 in order to render the latter fast-to-operate when the lower winding thereof is subsequently energized.

Also upon operating the sleeve relay R720 completes, at the contacts 723 and 726, an obvious connection between the line conductors C701 and C702 extending to the carrier equipment 794 and the tip and the ring of the jack J730 and consequently to the tip and the ring of the front plug P748 of the cord circuit 766. At this time, the impulsing contacts 762 of the dial D760 incorporated in the cord circuit 766 are bridged by way of the front contacts of the dial key K737, the restored contacts of the ring key K736 and the restored contacts of the front talk key K734 across the tip and the ring of the front plug P748. Also, upon operating, the sleeve relay R720 completes, at the contacts 721, a path, including the contacts 711, for applying battery potential by way of the resistor 709 to the signal-out conductor C703 in order to complete an obvious circuit for operating the signal-out relay R797 in the carrier equipment 794. Upon operating, the signal-out relay R794 closes the contacts 798 included in the plate circuit of the associated transmitting amplifier; whereby the 15.95 kc. carrier signal is transmitted by the carrier equipment 794 over the line 70 extending between the main office 40 and the way station 30. The carrier equipment 694 at the way station 30 responds to the 15.95 kc. carrier signal transmitted thereto over the line 70 in order to bring about the restoration of the signal-in relay R695 therein; whereby the latter relay interrupts, at the contacts 696, the previously mentioned path for applying battery potential to the signal-in conductor C604 in order to bring about the restoration of the signal-in relay R670 in the trunk circuit 600.

Upon restoring the signal-in relay R670 interrupts, at the contacts 671, the previously traced normally completed circuit for maintaining operated the seize relay R585 in the trunk circuit 500 in the tandem exchange 20. Upon restoring the seize relay R585 completes, at the contacts 586, a circuit, including the contacts 622, for energizing the upper winding of the control relay R590 in order to cause the latter relay to operate. Upon operating, the control relay R590 completes, at the contacts 594, a circuit, including the contacts 622, for operating the supervisory relay R560. Upon operating, the supervisory relay R560 completes, at the contacts 562, a circuit, including the contacts 572, for energizing the lower winding of the switch relay R630 in order to cause the latter relay to operate. Upon operating, the switch relay R630 completes, at the contacts 631, 633, 635 and 636, a loop circuit between the right-hand winding of the answer relay R595 and the line conductors C521 and C522 of the trunk 520 extending to the incoming selector 434; and interrupts, at the contacts 632 and 634, the normal connections between the upper and lower windings of the line relay R510 and the line conductors C511 and C512 of the trunk 510. The above mentioned loop circuit extends from the line conductor C521 of the trunk 520 by way of the contacts 631 and 642, the winding 651 of the repeating coil RC650, the contacts 633, the right-hand winding of the answer relay R595, the contacts 635, the winding 652 of the repeating coil RC650, the contacts 636, 621 and 591 to the line conductor C522 of the trunk 520. When this loop circuit is thus completed, the right-hand winding of the answer relay R595 is energized; however, the latter relay is not poled to operate at this time. Also, the incoming selector 434 is seized and operates to return ground potential over the control conductor C523 of the trunk 520; thereby to complete an obvious circuit for energizing the left-hand winding of the answer relay R595 and a multiple holding circuit for energizing the upper winding of the switch relay R630. Also upon operating, the control relay R590 completes, at the contacts 593, a path, including the contacts 613 and 582, for applying battery potential by way of the upper winding of the pulse relay R620 to the simplex between the windings 653 and 654 of the repeating coil RC650; however, the lower and intermediate windings of the signal-out relay R660 in the trunk circuit 600 are not energized over the trunk line 665 at this time by virtue of the blocking function of the copper oxide rectifier 667 to current in the direction indicated; whereby both the pulse relay R620 in the trunk circuit 500 and the signal-out relay R660 in the trunk circuit 600 remains in their restored positions. At this time the incoming selector 434 has been seized and is conditioned to respond to the first digit to be dialed at the calling operator switchboard 765 in the main office 40.

The operator at the switchboard 765 in the main office 40 then proceeds to dial the prefix digit 0 indicating that the present connection is to be extended to the remote exchange 10 followed by the directory number of the called subscriber substation T11 therein, which may be 111. Thus the number 0–111 is dialed at the operator switchboard 765 in the main office 40. When the finger wheel of the dial D760 incorporated in the cord circuit 766 is rotated away from its home position, the set of off-normal springs 761 is closed and remains closed until the finger wheel is returned back to its home position; while the set of impulsing springs 762 is actuated to transmit the impulses of the present digit only during the return of the finger wheel back to its home position. When the finger wheel of the dial D760 is rotated away from its home position closing the set of off-normal springs 761, a circuit, including the front contacts of the dial key K737, is completed for operating the dial front relay R740. Upon operating, the dial front relay R740 interrupts, at the contacts 741, the previously traced circuit for energizing the winding of the front supervisory relay R745 in series with the multiple connecting upper and lower windings of the sleeve relay R720; whereby the relays mentioned restore. Upon restoring, the front supervisory relay R745 in the cord circuit 766 interrupts, at the contacts 746, the previously mentioned circuit for illuminating the front supervisory lamp L747; and upon restoring the sleeve relay R720 in the trunk circuit 700 interrupts, at the contacts 723 and 726, the previously traced connection between the line conductors C701 and C702 extending to the carrier equipment 794 and the tip and the ring of the jack J730. Also, the sleeve relay R720 recompletes, at the contacts 725, the previously mentioned termination circuit, including the resistor 717, across the line conductors C701 and C702; and interrupts, at the contacts 721, the previously traced original path for applying battery potential by way of the resistor 709 to the signal-out conductor C703. Finally, the sleeve relay R720 completes, at the contacts 724 and 727, an alternative path, including the contacts 711, the jack J730, the plug P748 and the impulsing contacts 762 of the dial D760 incorporated in the cord circuit 766, for applying battery potential by way of the resistor 718 to the signal-out conductor C703; thereby to maintain operated the signal-out relay R797 in the carrier equipment 794. However, since the above traced path for energizing the winding of the signal-out relay R797 in the carrier equipment 794 includes the impulsing contacts 762 of the dial D760 incorporated in the cord circuit 766, the impulses of the present digit transmitted by the impulsing contacts 762 of the dial D760 incident to the return of the finger wheel thereof back into its home position are transmitted over the signal-out conductor C703 to the signal-out relay R797 in the carrier equipment 794 causing the latter relay to follow; whereby the signal-out relay R797 transmits, at the contacts 798, the impulses of the present digit over the line 70. More particularly, the carrier equipment 794 interupts the 15.95 kc. carrier signal in accordance with the impulses of the present digit; whereby the signal-in relay R695 in the carrier equipment 694 follows repeating, at the contacts 693, corresponding pulses of battery potential over the signal-in conductor C604 causing the signal-in relay R670 in the trunk circuit 600 to follow.

The finger wheel of the dial D760 incorporated in the cord circuit 766 is first operated in accordance with the prefix digit 0 as noted above and when the finger wheel is returned to its home position, the impulsing contacts 762 of the dial D760 have completed the transmission of the impulses of the digit mentioned and the off-normal springs 761 of the dial D760 are opened interrupting the previously traced circuit for maintaining operated the dial front relay R740; whereby the latter relay restores shortly thereafter, it being of the slow-to-release type. Upon restoring, the dial front relay R740 recompletes, at the contacts 741, the previously traced circuit for operating the front supervisory relay R745 in the cord circuit 766 and the sleeve relay R720 in the trunk circuit 700. Upon reoperating, the front supervisory relay R745 again illuminates the front supervisory lamp L747; and upon reoperating, the sleeve relay R720 again completes, at the contacts 721, the previously traced original path for applying battery potential by way of the resistor 709 to the signal-out conductor C703; thereby to retain operated the signal-out relay R797 in the carrier equipment 794, to retain restored the signal-in relay R695 in the carrier equipment 694 and to retain restored the signal-in relay R670 in the trunk circuit 600 as previously explained. Also upon reoperating, the sleeve relay R720 interrupts, at the contacts 725, the termination circuit, including the resistor 717 across the line conductors C701 and C702 extending to the carrier equipment 794; interrupts, at the contacts 724 and 727, the alternative path, including the impulse contacts 762 of the dial D760 incorporated in the cord circuit 766, for applying battery potential by way of the resistor 718 to the signal-out conductor C703; and recompletes, at the contacts 723 and 726, the previously traced connection between the line conductors C701 and C702 and the cord circuit 766.

In view of the foregoing, it will be understood that the dial D760 incorporated in the cord circuit 766 is operated successively in accordance with the digits 0, 1, 1 and 1; whereby the four digits mentioned are transmitted from the dial D760 to the signal-out relay R797 in the carrier equipment 794 and repeated over the line 70 to the signal-in relay R695 in the carrier equipment 694 and then repeated to the signal-in relay R670 in the trunk circuit 600. Also, at the conclusion of dialing, the operator at the switchboard 765 in the main office 40 operates the talk front key K734 in order to complete the previously mentioned connection between the headset 767 thereat and the tip and the ring of the front plug P748 of the cord circuit 766 and consequently the line conductors C701 and C702 extending to the carrier equipment 794. Also, at this time, the dial key K737 in the cord circuit 766 is restored to its normal position since all of the digits have been transmitted.

The signal-in relay R670 in the trunk circuit 600 follows the prefix digit 0, as previously noted, operating and restoring in accordance with the impulses thereof. Each time the signal-in relay R670 operates and then restores, it completes and interrupts, as the contacts 671, a path, including the contacts 661 and the copper oxide rectifier 666, for applying ground potential to the simplex between the windings 676 and 677 of the repeating coil RC675; whereby corresponding ground impulses are transmitted over the trunk line 665 since the copper oxide rectifier 666 permits the passage of current in the direction noted. The ground impulses transmitted at the contacts 671 of the signal-in relay R670 in the trunk circuit 600 over the trunk line 665 complete intermittently the previously traced circuit for energizing the upper winding of the pulse relay R620 in the trunk circuit 500; whereby the latter relay follows, operating and restoring in accordance with the impulses of the digits mentioned. Each time the pulse relay R620 operates and then restores, it interrupts and then recompletes, at the contacts 622, the previously traced multiple circuits for energizing the upper winding of the control relay R590 and the winding of the supervisory relay R560; however, the relays mentioned remain operated during impulsing as they are of the slow-to-release type. Also, each time the pulse relay R620 operates and then restores, it completes and then interrupts, at the contacts 621', a circuit, including the contacts 563, for operating the dial relay R640; whereby the latter relay operates and remains operated during the impulsing as it is of the slow-to-release type. Upon operating, the dial relay R640 completes, at the contacts 646, a holding circuit for energizing the lower winding of the control relay R590, thereby positively to prevent restoration of the latter relay during impulsing. Also, upon operating, the dial relay R640 completes, at the contacts 643, a path, including the resistor 618, the winding 651 of the repeating coil RC650, the contacts 633 and the resistor 619, for short-circuiting the right-hand winding of the answer relay R595; thereby positively to prevent operation of the latter relay during impulsing and to reduce the impedance of the loop circuit extending to the incoming selector 434 over the trunk 520.

Finally, each time the pulse relay R620 operates and then restores, it interrupts and then recompletes, at the contacts 621, the previously traced loop circuit including the line conductors C521 and C522 of the trunk 520 extending to the incoming selector 434; whereby the impulses of the prefix digit 0 are repeated by the pulse relay R620, at the contacts 621, to the incoming selector 434. The incoming selector 434 responds to the digit 0 to select the group of trunks, including the trunk 439, and then to select an idle trunk therein. For example, the incoming selector 434 may select the articular trunk 430 extending to the trunk circuit 400, the trunk 430 being marked as idle to the incoming selector 434 by the application of battery potential upon the control conductor C433 thereof by way of a path, including the contacts 483 and 466 and the impedance 458. When the incoming selector 434 seizes the trunk 430, a loop circuit is completed for energizing in series the upper and lower windings of the line relay R470 in the trunk circuit 400; the loop circuit mentioned including the contacts 402 and 404 and the line conductors C431 and C432 of the trunk 430; whereby the line relay R470 operates. Accordingly, at this time, the above-mentioned loop circuit is completed between the right-hand winding of the answer relay R595 in the trunk circuit 500 and the upper and lower windings of the line relay R470 in the trunk circuit 400.

Upon operating, the line relay R470 in the trunk circuit 400 interrupts, at the contacts 471, the previously traced termination circuit, including the condenser 443 and the resistor 444, across the line conductors C401 and C402 extending to the carrier equipment 494; and completes, at the contacts 472, an obvious circuit for operating the hold relay R480. Upon operating the hold relay R480 interrupts, at the contacts 483, the previously traced original path for applying battery by way of the impedance 458 to the control conductor C433 of the trunk 430; and completes, at the contacts 484, a path for applying ground potential by way of the winding of the control relay R490 to the control conductor C433; thereby to effect operation of the control relay R490. When battery potential is removed from the control conductor C433 of the trunk 430 and ground potential is applied thereto, the trunk 430 is marked as busy to the other incoming selectors in the group, including the incoming selector 434, and to the selectors of the finder-selector links 426, etc., having access thereto. Finally, upon operating, the line relay R470 completes, at the contacts 473, an obvious path for applying ground potential to the signal-out conductor C403 in order to effect operation of the signal-out relay R497 in the carrier equipment 494.

Upon operating, the signal-out relay R497 brings about operation of the carrier equipment 494 to transmit the 15.95 kc. carrier signal over the line 60 extending between the tandem exchange 20 and the remote exchange 10, thereby to bring about the restoration of the signal-in relay R395 in the carrier equipment 394 and the consequent application of ground potential at the contacts 396 thereof to the signal-in conductor C304; whereby the signal-in relay R350 in the trunk circuit 200 is operated. Upon operating, the signal-in relay R350 completes, at the contacts 352, an obvious circuit for operating the hold relay R340. Upon operating, the hold relay R340 completes, at the contacts 342, a circuit, including the contacts 386 for energizing the lower winding of the switch relay R260 in order to cause the latter relay to operate. Upon operating, the switch relay R260 interrupts, at the contacts 266, the previously traced path for applying battery potential by way of the impedance 257 to the control conductor C223 of the trunks 220 and 225; and completes, at the contacts 267, a path, including the contacts 383, for applying ground potential to the control conductor C223; thereby to mark the trunks mentioned as busy to the selectors of the finder-selector links 203, etc. Also, the switch relay R260 interrupts, at the contacts 261 and 264, the previously traced connection between the line conductors C221 and C222 of the trunk 220 and the line conductors C301 and C302 extending to the carrier equipment 394; and completes, at the contacts 263, a path, including the contacts 351, for bridging the left-hand winding of the answer relay R310 across the line conductors C231 and C232 of the trunk 230 extending to the incoming selector 206; whereby the left-hand winding of the answer relay R310 is energized over the loop circuit extending therefrom by way of the trunk 230 to the incoming selector 206 but is not poled to operate. However, the incoming selector 206 is seized and rendered responsive to a digit repeated thereto over the loop circuit mentioned and also operates to return ground potential over the control conductor C233 of the trunk 230; thereby to complete a circuit for energizing the right-hand winding of the answer relay R310 and a multiple holding circuit for energizing the upper winding of the switch relay R260.

When the signal-in relay R670 in the trunk circuit 600 then receives the first digit 1 of the directory number of the called subscriber substation T11 in the remote exchange 10, it repeats the impulse thereof at the contacts 671 to the pulse relay R620 in the trunk circuit 500, as previously explained. The pulse relay R620 follows the digit 1 mentioned repeating, at the contacts 621, the impulse thereof over the loop circuit including the trunk 520, the incoming selector 434 and the trunk 430 to the line relay R470 in the trunk circuit 400; whereby the latter relay follows. The line relay R470 and the trunk circuit 400 repeats, at the contacts 473, the impulse of the digit 1 mentioned to the signal-out relay R497 in the carrier equipment 494; whereby the latter relay repeats, at the contacts 498 thereof causing the carrier equipment 494 to repeat over the line 60 to the carrier equipment 394; whereby the signal-in relay R395 therein follows. The signal-in relay R395 in the carrier equipment 394 repeats, at the contacts 396 thereof the impulse of the digit 1 mentioned over the signal-in conductor C304 to the signal-in relay R350 in the trunk circuit 200. Each time the signal-in relay R350 in the trunk circuit 200 restores and then reoperates, it interrupts and then recompletes, at the contacts 352, the circuit for maintaining operated the hold relay R340; however the latter relay remains operated during impulsing as it is of the slow-to-release type. Also, each time the signal-in relay R350 restores and then reoperates, it completes and then interrupts, at the contacts 353, a circuit, including the contacts 343, for energizing the winding of the dial relay R320; whereby the latter relay operates and remains operated during impulsing as it is of the slow-to-release type. Upon operating the dial relay R320 completes, at the contacts 322, a path, including the resistor 327, for short-circuiting the left-hand winding of the answer relay R310; thereby positively to prevent operation of the latter relay during impulsing and to reduce the impedance of the loop circuit extending by way of the trunk 230 to the incoming selector 206. Finally, each time the signal-in relay R350 restores and then reoperates, it interrupts and then recompletes, at the contacts 351, the previously traced loop circuit extending by way of the trunk 230 to the incoming selector 206; whereby the incoming selector 206 operates in accordance with the present digit 1 to select the group of trunks, including the trunk 207, and then to select an idle trunk in this group. For example, the incoming selector 206 may select the particular trunk 207 extending to the local connector 205; thereby to forward the loop circuit from the left-hand winding of the answer relay R310 in the trunk circuit 200 over the trunk 230, the incoming selector 206 and the trunk 207 to the local connector 205; whereby the local connector 205 is conditioned to be responsive to the next two digits received thereby.

At the conclusion of the prefix digit 0, the signal-in relay R670 in the trunk circuit 600 remains restored effecting the restoration of the pulse relay R620 in the trunk circuit 500; whereby the dial relay R640 restores shortly thereafter to interrupt, at the contacts 643, the previously traced path, including the resistor 618, for short-circuiting the right-hand winding of the answer relay R595. Also, the line relay R470 in the trunk circuit 400 remains operated steadily to retain operated the hold relay R480 and the signal-out relay R497 in the carrier equipment 494; whereby the signal-in relay R395 in the carrier equipment 394 is retained in its restored position effecting steadily operation of the signal-in relay R350 in the trunk circuit 200. The operated signal-in relay R350 interrupts, at the contacts 353, the previously traced circuit for maintaining operated the dial relay R320 in order to cause the latter relay to restore shortly thereafter as it is of the slow-to-release type. Upon restoring, the dial relay R320 interrupts, at the contacts 322, the previously traced path, including the resistor 327, for short-circuiting the left-hand winding of the answer relay R310.

In an identical manner, the signal-in relay R670 repeats the second digit 1 and the third digit 1 of the directory number of the called subscriber substation T11 in the remote exchange 10 at the contacts 671; whereby the pulse relay R620 in the trunk circuit 500 follows the two digits mentioned repeating them at the contacts 621, to the line relay R470 in the trunk circuit 400. The line relay R470 in the trunk circuit 400 repeats the two digits mentioned, at the contacts 473, to the signal-out relay R497 in the carrier equipment 494; whereby the latter relay repeats the two digits mentioned, at the contacts 498, over the line 60; whereby the signal-in relay R395 in the carrier equipment 394 follows. The signal-in relay R395 repeats the two digits mentioned, at the contacts 396, to the signal-in relay R350 in the trunk circuit 200; whereby the latter relay repeats the two digits mentioned, at the contacts 351, over the trunk 230, the incoming selector 206 and the trunk 207 to the local connector 205. The local connector 205 responds to the two digits 1 and 1 operating to select the subscriber line 211 extending to the called subscriber substation T11 in the remote exchange 10. The subsequent operation of the local connector 205 depends upon the idle or busy condition of the called subscriber substation T11 at this time.

First assuming that the called subscriber substation T11 is busy at this time, the local connector 205 operates to return busy tone current over the trunk 207 and the incoming selector 206 to the line conductors C231 and C232 of the trunk 230. At this time, the line conductors C231 and C232 of the trunk 230 are connected by way of the contacts 263, 321, and 262 and the condenser 347, and by way of the contacts 351 and 265 and the condenser 348, respectively to the line conductors C302 and C301 extending to the carrier equipment 394; whereby the carrier equipment 394 operates to transmit the 24.55 kc. carrier signal modulated by the audio busy signal over the line 60; whereby the carrier equipment 494 responds to the modulated 24.55 kc. carrier signal transmitting the audio component thereof over the line conductors C401 and C402. The line conductors C401 and C402 are connected by way of the contacts 461, 464 and 402, 404 to the line conductors C431 and C432 of the trunk 430 and consequently by way of the incoming selector 434 to the line conductors C521 and C522 of the trunk 520. The line conductor C521 of the trunk 520 is connected by way of the contacts 631, 642, the winding 651 of the repeating coil RC 650, the condenser 655, the winding 652 of the repeating coil RC650, the contacts 636, 621 and 591 to the line conductor C522 of the trunk 520; whereby the busy tone current traversing the windings 651 and 652 of the repeating coil RC650 induces a corresponding busy tone current in the windings 653 and 654 thereof which is forwarded by way of the line conductors of the trunk line 665 through the windings 676 and 677 of the repeating coil RC675. The busy tone current traversing the windings 676 and 677 of the repeating coil RC675 induces a corresponding busy tone current in the windings 678 and 679 thereof which is transmitted over the line conductors C601 and C602 to the carrier equipment 694. The carrier equipment 694 transmits the 24.55 kc. carrier signal modulated by the audio busy signal over the line 70; whereby the carrier equipment 794 responds to the modulated 24.55 kc. carrier signal transmitting the audio component thereof over the line conductors C701 and C702, the contacts 723 and 726, the jack J730, the front plug P748 and the contacts of the operated talk front key K734 of the cord circuit 766 to the headset 767 at the operator switchboard 765; thereby to indicate to the operator thereto that the called subscriber substation T11 in the remote exchange 10 is busy at this time. The operator at the switchboard 765 then proceeds to release the apparatus by withdrawing the front plug P748 of the cord circuit 766 from the jack J730 in a manner more fully explained hereinafter.

On the other hand, in the event the called subscriber substation T11 in the remote exchange 10 is idle at this time, the local connector 205 operates to project ringing current over the subscriber line 211 extending thereto and to return ring-back tone current over the trunk 207 and the previously traced circuit to the operator switchboard 765 in the main office 40 in a manner substantially identical to that explained above. Subsequently, when the subscriber at the called subscriber substation T11 in the remote exchange 10 answers the call, the local connector 205 operates to reverse the polarity of the trunk 207 and consequently the incoming selector 206 and the line conductors C231 and C232 of the trunk 230; whereby the left-hand winding of the answer relay R310 in the trunk circuit 200 is poled to operate. Upon operating, the answer relay R310 interrupts, at the contacts 311, the previously traced termination circuit, including the resistor 344 and the condenser 286, across the line conductors C301 and C302 extending to the carrier equipment 394; and completes, at the contacts 312, an obvious circuit for energizing the upper winding of the supervisory relay R270 in order to cause the latter relay to operate. Upon operating, the supervisory relay R270 completes, at the contacts 272, an obvious path for applying ground potential to the signal-out conductor C303 in order to effect operation of the signal-out relay R397 in the carrier equipment 394 and the consequent restoration of the signal-in relay R495 in the carrier equipment 494 in the manner previously explained.

Upon restoring, the signal-in relay R495 completes, at the contacts 496, the previously mentioned path for applying ground potential to the signal-in conductor C404 in order to effect operation of the signal-in relay R450 in the trunk circuit 400. Upon operating, the signal-in relay R450 completes, at the contacts 452, the previously mentioned circuit for operating the hold relay R400; upon operating the hold relay R400 reverses, at the contacts 401, 402, 403 and 404, the polarity of the line conductors C431 and C432 of the trunk 430 with respect to the upper and lower windings of the line relay R470; whereby the polarity of the line conductors C521 and C522 of the trunk 520 are reversed over the incoming selector 434 poling the right-hand winding of the answer relay R595 in the trunk circuit 500 to operate. Upon operating, the answer relay R595 completes, at the contacts 597, an obvious circuit for energizing the lower winding of the supervisory relay R580 in order to cause the latter relay to operate. Upon operating, the supervisory relay R580 completes, at the contacts 584, an obvious holding circuit for energizing the lower winding of the control relay R590; and interrupts, at the contacts 582, the previously traced path for applying battery potential by way of the upper winding of the pulse relay R620 to the simplex between the windings 653 and 654 of the repeating coil RC650. Finally, the supervisory relay R580 completes, at the contacts 581, a path, including the contacts 613 and 593, for connecting positive potential from the booster battery 616 through the lower winding of the pulse relay R620 to the simplex between the windings 653 and 654 of the repeating coil RC650; whereby the lower and intermediate windings of the signal-out relay R660 in the trunk circuit 600 are energized in series with the lower winding of the pulse relay R620 in the trunk circuit 500 over the previously traced circuit, including the copper oxide rectifier 667. When this series circuit is completed, the signal-out relay R660 in the trunk circuit 600 operates; however, the pulse relay R620 in the trunk circuit 500 does not operate as it is of the marginal type.

Upon operating, the signal-out relay R660 in the trunk circuit 600 completes, at the contacts 663, the previously mentioned path for applying ground potential to the signal-out conductor C603 in order to effect operation of the signal-out relay R697 in the carrier equipment 694 and the consequent restoration of the signal-in relay R795 in the carrier equipment 794 in the manner previously explained. Upon restoring, the signal-in relay R795 in the carrier equipment 794 completes, at the contacts 796, the previously mentioned path for applying ground potential to the signal-in conductor C704 in order to energize the lower winding of the signal-in relay R705 in the trunk circuit 700; whereby the latter relay operates immediately at this time. Upon operating, the signal-in relay R705 interrupts, at the contacts 706, the previously traced circuit for energizing the upper winding of the sleeve relay R720 in the trunk circuit 700 in series with the winding of the front supervisory relay R745 in the cord circuit 766; whereby only the lower winding of the sleeve relay R720 is energized in series with the winding of the supervisory relay R745. The sleeve relay R720 is retained in its operated position; however, the front supervisory relay R745 restores as it is of the marginal type. Also upon operating, the signal-in relay R705 completes, at the contacts 707, a multiple circuit for illuminating the busy lamp L732. Upon restoring, the front supervisory relay R745 interrupts, at the contacts 746, the previously mentioned circuit for illuminating the front supervisory lamp L747 in order to indicate to the operator at the switchboard 765 in the main office 40 that the subscriber at the called subscriber substation T11 in the remote exchange 10 has answered the call.

The subscriber at the calling operator switchboard 765 may converse with the subscriber at the called subscriber substation T11 in the remote exchange 10; whereby the modulated carrier signals and audio signals traverse the various portions of the completed connection in the manner previously explained. At this time, the operator at the switchboard 765 may restore the talk front key K734 completing a connection between the called subscriber substation T11 in the remote exchange 10 and the original calling connection that had been previously answered at the operator switchboard 765 utilizing the rear plug P758 of the cord circuit 766 since the front plug P478 is directly connected to the rear plug P758 when the talk front key K734 in the cord circuit 766 is restored to its normal position.

At the conclusion of the established connection, when the subscriber at the called-subscriber substation T11 in the remote exchange 10 disconnects, the local connector 205 operates to reverse the polarity of the trunk 207 in order to pole the left-hand winding of the answer relay R310 in the trunk circuit 200 to restore. Upon restoring, the answer relay R310 recompletes, at the contacts 311, the previously traced termination circuit, including the resistor 344 and the condenser 286, across the line conductors C301 and C302 extending to the carrier equipment 394; and interrupts, at the contacts 312, the previously mentioned circuit for energizing the upper winding of the supervisory relay R270 in order to cause the latter relay to restore. Upon restoring, the supervisory relay R270 interrupts, at the contacts 272, the previously mentioned path for applying ground potential to the signal-out conductor C303 in order to effect the restoration of the signal-out relay R397 in the carrier equipment 394 and the consequent reoperation of the signal-in relay R495 in the carrier equipment 494; whereupon the latter relay upon operating, interrupts, at the contacts 496, the previously mentioned path for applying ground potential to the signal-in conductor C404 in order to effect the restoration of the signal-in relay R450 in the trunk circuit 400. Upon restoring, the signal-in relay R450 interrupts, at the contacts 452, the previously mentioned circuit for maintaining operated the hold relay R400 in order to cause the latter relay to restore shortly thereafter, it being of the slow-to-release type. Upon restoring, the hold relay R400 reverses, at the contacts 401, 402, 403 and 404, the polarity of the line conductors C431 and C432 of the trunk 430 with respect to the upper and lower windings of the line relay R470; whereby the right-hand winding of the answer relay R595 in the trunk circuit 500 is poled to restore.

Upon restoring, the answer relay R595 interrupts, at the contacts 597, the previously mentioned circuit for energizing the lower winding of the supervisory relay R580 in order to cause the latter relay to restore shortly thereafter, it being of the slow-to-release type. Upon restoring, the supervisory relay R580 interrupts, at the contacts 584, the holding circuit for energizing the lower winding of the control relay R590; however, the latter relay is retained in its operated position by virtue of the completed operating circuit for energizing the upper winding thereof. Also upon restoring, the supervisory relay R580 interrupts, at the contacts 581, the previously traced circuit for energizing from the booster battery 616, the lower winding of the pulse relay R620 in the trunk circuit 500 and the lower and intermediate windings of the signal-out relay R660 in the trunk circuit 600; the signal-out relay R660 restores, the pulse relay R620 occupying its restored position. Upon restoring, the signal-out relay R660 in the trunk circuit 600 interrupts, at the contacts 363, the previously mentioned path for applying round potential to the signal-out conductor C603, thereby to effect the restoration of the signal-out relay R697 in the carrier equipment 694 and the consequent reoperation of the signal-in relay R795 in the carrier equipment 794; whereby the signal-in relay R795 interrupts, at the contacts 796, the previously mentioned path for applying ground potential to the signal-in conductor C704 in order to deenergize the lower winding of the signal-in relay R705 in the trunk circuit 700 causing the latter relay to restore. Upon restoring, the signal-in relay R705 interrupts, at the contacts 707, the previously mentioned multiple circuit for illuminating the busy lamp L732 and recompletes, at the contacts 706, the previously traced circuit for energizing the upper winding of the sleeve relay R720 in multiple with the lower winding thereof, and in series with the front supervisory relay R745 in the cord circuit 766; whereby the latter relay, being of the marginal type, operates, upon operating, the front supervisory relay R745 completes, at the contacts 746, the previously mentioned circuit for illuminating the front supervisory lamp L747 in order to indicate to the operator at the switchboard 765 that the subscriber at the called subscriber substation T11 in the remote exchange 10 has disconnected.

Upon receiving the disconnect signal the operator at the switchboard 765 in the main office 40 withdraws the front plug P748 of the cord circuit 766 from the jack J730, thereby interrupting the circuit for maintaining operated the front supervisory relay R745 in the cord circuit 766 and the sleeve relay R720 in the trunk circuit 700. Also, when the front plug P748 is withdrawn from the jack J730, the contacts 731 thereof are opened, interrupting the circuit for maintaining operated the jack relay R710; whereby the latter relay restores shortly thereafter, it being of the slow-to-release type.

Upon restoring, the sleeve relay R720 interrupts, at the contacts 721, the previously traced path for applying battery potential to the signal-out conductor C703 in order to effect the restoration of the signal-out relay R797 in the carrier equipment 794 and the consequent reoperation of the signal-in relay R695 in the carrier equipment 694; whereupon the latter relay recompletes, at the contacts 696, the previously mentioned path for applying battery potential to the signal-in conductor C604 in order to effect reoperation of the signal-in relay R670 in the trunk circuit 600. Upon restoring the jack relay R710 in the trunk circuit 700 interrupts, at the contacts 713, the previously mentioned circuit for illuminating the busy lamp L732, thereby to indicate that the trunk circuit 700 is idle at this time.

Upon reoperating, the signal-in relay R670 in the trunk circuit 600 recompletes, at the contacts 671, the previously traced circuit for energizing the upper winding of the pulse relay R620 in the trunk circuit 500 in order to cause the latter relay to operate. Upon operating, the pulse relay R620 interrupts, at the contacts 622, the previously traced circuit for energizing the upper winding of the control relay R590 and the multiple circuit for energizing the winding of the supervisory relay R560; whereby the relays mentioned restore shortly thereafter as they are of the slow-to-release types. Upon restoring, the control relay R590 interrupts, at the contacts 593, the previously traced circuit for energizing the upper winding of the pulse relay R620 in order to cause the latter relay to restore; and recompletes, at the contacts 592, the previously traced original circuit for operating the seize relay R585; whereby the latter relay reoperates.

Also, when the pulse relay R620 first operates, it interrupts, at the contacts 621, the original loop circuit extending to the line relay R740 in the trunk circuit 400; and when the control relay R590 later restores, it interrupts, at the contacts 591, a further point in the loop circuit mentioned; whereby the line relay R470 in the trunk circuit 400 restores. Upon restoring the line relay R470 interrupts, at the contacts 472, the previously mentioned circuit for maintaining operated the hold relay R480 in order to cause the latter relay to restore shortly thereafter, it being of the slow-to-release type. Upon restoring, the hold relay R480 interrupts, at the contacts 484, the previously traced circuit for maintaining operated the control relay R490; whereby the latter relay restores. Also, the hold relay R480 recompletes, at the contacts 483, the previously traced original path for applying battery potential by way of the impedance 458 to the control conductor C433 of the trunk 430. When ground potential is thus removed from the control conductor C433 of the trunk 430 and battery potential is applied thereto, the incoming selector 434 is released; whereby ground potential is removed from the control conductor C523 of the trunk 520 in order to deenergize the left-hand winding of the answer relay R595 and the upper winding of the switch relay R630 in the trunk circuit 500; whereby the switch relay R630 restores, the answer relay R595 having already restored. Upon restoring, the switch relay R630 interrupts, at the contacts 638, the previously traced path for applying ground potential to the control conductor C513 of the trunks 510 and 515; and recompletes, at the contacts 639, the previously traced original path for applying battery potential by way of the resistor 617 to the control conductor C513; thereby again to mark the trunks 510 and 515 as idle to the selectors of the finder-selector links 426, etc., and to the incoming selectors 429, etc., having access thereto.

Also, when the line relay R470 in the trunk circuit 400 restores, it interrupts, at the contacts 473, the previously mentioned path for applying ground potential to the signal-out conductor C403 in order to effect restoration of the signal-out relay R497 in the carrier equipment 494 and the consequent reoperation of the signal-in relay R395 in the carrier equipment 394; whereby the latter relay interrupts, at the contacts 396, the path for applying ground potential to the signal-in conductor C304 in order to effect the restoration of the signal-in relay R350 in the trunk circuit 200. Upon restoring, the signal-in relay R350 interrupts, at the contacts 352, the previously mentioned circuit for maintaining operated the hold relay R340 in order to cause the latter relay to restore shortly thereafter. Also, the signal-in relay R350 interrupts, at the contacts 351, the loop circuit extending by way of the trunk 230, the incoming selector 206 and the trunk 207 to the local connector 205; whereby the local connector 205 is released bringing about the release of the incoming selector 206 and the consequent removal of ground potential from the control conductor C233 of the trunk 230. When ground potential is thus removed from the control conductor C233 of the trunk 230, the right-hand winding of the answer relay R310 and the upper winding of the switch relay R260 in the trunk circuit 200 are deenergized causing the switch relay R260 to restore, the answer relay R310 having already restored. Upon restoring the switch relay R260 interrupts, at the contacts 267, the previously traced path for applying ground potential to the control conductor C223 of the trunks 220 and 225; and recompletes, at the contacts 266, the previously traced original path for applying battery potential by way of the impedance 257 to the control conductor C223; whereby the trunks 220 and 225 are marked as idle to the selectors of the finder-selector links 203, etc., having access thereto. When the local connector 205 is thus released, the trunk 207 is marked as idle to the incoming selectors 206, etc., having access thereto. When the local connector 205 is thus released, the line circuit 213 operates to mark the subscriber line 211 extending to the subscriber substation T11 as idle to the local connectors 205, etc., having access thereto.

At this time the established connection between the calling operator switchboard 765 in the main office 40 and the called subscriber substation T11 in the remote exchange 10 is released and all of the apparatus involved therein is completely released and available for further use.

In view of the foregoing, it will be understood that a call from the calling operator switchboard 765 in the main office 40 may be extended to a called paystation T12, etc., in the remote exchange 10 in an identical manner.

*Local calls in the tandem exchange 20*

First assume that a call initiated at a subscriber substation, such, for example, as the subscriber substation T21 in the tandem exchange 20 is to be extended to a paystation, such, for example, as the paystation T22 therein. When the call is initiated at the calling subscriber substation T21, the line circuit 423 associated with the subscriber line 421 operates to mark the subscriber line 421 as busy to the local connectors 427, etc., having access thereto, and to initiate operation of the distributor 425. The distributor 425 assigns an idle one of the finder-selector links, such, for example, as the finder-selector link 426 in the first group for use at this time; whereby the finder of the finder-selector links 426 operates to seize the subscriber line 421. The subscriber at the calling subscriber substation T21 then dials the directory number of the called paystation T22, which may be 122. The selector of the finder-selector link 426 responds to the first digit 1 to select the first group of local connectors, including the local connector 427, and then an idle local connector therein. For example, the selector of the finder-selector link 426 may select the trunk 428 extending to the particular local connector 427; whereupon the local connector 427 is rendered responsive to the next two digits dialed at the calling subscriber substation T21. The subscriber at the calling subscriber substation T21 then proceeds to dial the next two digits 2 and 2; whereby the local connector 427 is operated to seize the line 422 extending to the called paystation T22; whereupon the idle or busy condition of the line 422 is tested by the local connector 427 at this time.

First assuming that the called paystation T22 is busy at this time, the local connector 427 tests the line 422 extending thereto as busy returning busy tone current over the trunk 428, the finder-selector link 426 and the subscriber line 421 to the calling subscriber substation T21 in order to indicate to the subscriber thereat that the desired connection may not be had at this time due to the busy condition of the called paystation T22. The subscriber at the calling subscriber substation T21 then proceeds to release the apparatus in a manner more fully explained hereinafter.

Now assuming that the called paystation T22 is idle at this time, the local connector 427 operates to project ringing current over the line 422 to the called paystation T22 and to return ring-back tone current over the trunk 428 and, consequently, to the calling subscriber substation T21 in order to indicate to the subscriber thereat that the called paystation T22 is being rung. When a person at the called paystation T22 answers the call, the local connector 427 operates in order to reverse the polarity of the trunk 428; whereby the finder-selector link 426 operates the meter, not shown, associated with the subscriber line 422 in order to meter the call in a conventional manner. At this time, an established connection is completed between the calling subscriber substation T21 and the called paystation T22 and conversation therebetween then proceeds in the usual manner.

At the conclusion of the established connection, when the person at the paystation T22 disconnects, the local connector 427 again operates to reverse the polarity of the trunk 428; however, without effect at this time. Subsequently, when the subscriber at the calling subscriber substation T21 disconnects, the loop circuit extending to the local connector 427 is interrupted in order to cause the local connector 427 and the finder-selector link 426 to be released. When the local connector 427 is thus released, the line 422 extending to the paystation T22 is again marked as idle by the associated line circuit 423 to the local connectors 427, etc., having access thereto. Similarly, when the finder-selector link 426 is thus released, the line 421 extending to the subscriber substation T21 is marked as idle by the associated line circuit 423 to the local connectors 427, etc., having access thereto. Also, when the finder-selector link 426 is thus released, the trunk 428 extending to the local connector 427 is marked as idle to the finder-selector links 426, etc., having access thereto. At this time the established connection between the calling subscriber substation T21 and the called paystation T22 is released and all of the apparatus involved therein is completely released and available for further use.

In view of the foregoing, it will be understood that a connection may be extended from a calling subscriber substation T21, etc., in the tandem exchange 20 to another called subscriber substation therein in an identical manner. Also, it will be understood that a connection from a calling paystation T22, etc., in the tandem exchange 20 may be extended to a called subscriber substation T21, etc., or to another called paystation therein in a substantially identical manner. In this conjunction, it is noted incident to the extension of a connection from the calling paystation T22 in the tandem exchange 20 to a called subscriber substation or to another called paystation therein, that when the call is answered, the local connector 427 operates to reverse the polarity of the trunk 428 over the finder-selector link employed and the line 422 to the calling paystation T22. This reversal of polarity to the calling paystation T22 brings about blocking of the transmitter at the calling paystation T22 by the associated copper oxide rectifier, unless the person at the paystation T22 has deposited a coin at this time. More particularly, in the event the person at the calling paystation T22 has not deposited a coin at this time, he may hear the person at the called subscriber substation or at the called paystation in the tandem exchange 20, but he may not talk to the person mentioned by virtue of the circumstance that the copper oxide rectifier blocks the associated transmitter as a consequence of the reversal of polarity to the calling paystation T22. However, when the person at the calling paystation T22 deposits a coin, the copper oxide rectifier is removed from blocking the transmitter thereat; whereby the connection is completed in the manner previously explained.

*A call from a subscriber substation or paystation in the tandem exchange 20 to a subscriber substation or paystation in the remote exchange 10*

First assume that a call initiated at a subscriber substation, such, for example, as the subscriber substation T21 in the tandem exchange 20 is to be extended to a subscriber substation, such, for example, as the subscriber substation T11 in the remote exchange 10. When the call is initiatd at the calling subscriber substation T21, the line circuit 423 associated with the subscriber line 421 operates to mark the subscriber line 421 as busy to the local connectors 427, etc., having access thereto, and to initiate operation of the distributor 425. The distributor 425 assigns an idle one of the finder-selector links, such, for example, as the finder-selector link 426 in the first group for use at this time; whereby the finder of the finder-selector link 426 operates to seize the subscriber line 421.

The subscriber at the calling subscriber substation T21 in the tandem exchange 20 then dials a prefix digit, such, for example, as the prefix digit 9 indicating that the call is to be extended to the remote exchange 10, followed by the directory number of the called subscriber substation T11 in the remote exchange 10, which number may be 111. Thus the subscriber at the calling subscriber substation T21 first dials the prefix digit 9; whereby the selector of the finder-selector links 426 responds to the first digit 9 in order to select the corresponding group of trunks, including the trunk 430, and then an idle trunk therein. For example, the selector of the finder-selector link 426 may select the particular trunk 430, assuming that the trunk circuit 400 is idle at this time; the trunk 430 being marked as idle to the selector of the finder-selector link 426 by the application of battery potential to the control conductor C433 thereof. More particularly, battery potential is normally applied by way of the impedance 458, the contacts 466 and 483 to the control conductor C433 of the trunk 430.

Also when the selector of the finder-selector link 426 seizes the trunk 430, the previously traced loop circuit is completed for energizing the upper and lower windings of the line relay R470 in the trunk circuit 400; whereby the latter relay operates in order to effect seizure of the trunk circuit 400 in the manner previously explained. When the trunk circuit 400 is thus seized, seizure of the carrier equipment 494 in the tandem exchange 20 is effected in order to bring about seizure over the line 60 of the carrier equipment 394 in the remote exchange 10; whereby the trunk circuit 200 is seized effecting seizure of the incoming selector 206 in the remote exchange 10; all in the manner previously explained.

The subscriber at the calling subscriber substation T21 in the tandem exchange 20 then dials the three digits 1, 1 and 1 comprising the directory number of the called subscriber substation T11 in the remote exchange 10; whereby the digits mentioned are transmitted over the previously traced loop circuit to the line relay R470 in the trunk circuit 400 and repeated individually to the carrier equipment 494; from which the digits are repeated over the line 60 to the carrier equipment 394; from which the digits are repeated to the signal-in relay R350 in the trunk circuit 200; and from which the digits are repeated over the trunk 230; all in the manner previously explained. The incoming selector 206 responds to the first digit 1 to select the first group of local connectors, including the local connector 205, and then an idle local connector therein. For example, the incoming selector 206 may select the trunk 207 extending to the particular local connector 205; whereby the local connector 205 is rendered responsive to the next two digits received over the trunk 230. The local connector 205 then responds to the next two digits 1 and 1 transmitted over the trunk 230, the incoming selector 206 and the trunk 207; whereby the local connector 205 is operated to seize the line 211 extending to the called subscriber substation T11 in the remote exchange 10; whereupon the idle or busy condition of the subscriber line 211 is tested by the local connector 205 at this time.

First assuming that the called subscriber substation T11 in the remote exchange 10 is busy at this time, the local connector 205 tests the subscriber line 211 extending thereto as busy, returning busy tone current over the trunk 207, the incoming selector 206 and the trunk 230 to the trunk circuit 200; which busy tone current is returned from the trunk circuit 200 to the carrier equipment 394 in order to cause the carrier equipment 394 to respond and transmit a corresponding carrier signal over the line 60 to the carrier equipment 494; whereupon the carrier equipment 494 returns busy tone current to the trunk circuit 400 and consequently by way of the trunk 430, the finder-selector link 426 and the subscriber line 421 to the calling subscriber substation T21 in the tandem exchange 20; all in the manner previously explained. The subscriber at the calling subscriber substation T21 in the tandem exchange 20 upon receiving the busy signal, proceeds to release the apparatus in a manner more fully explained hereinafter.

Now assuming that the called subscriber substation T21 in the remote exchange 10 is idle when the local connector 205 operates to select the subscriber line 211 extending thereto, the local connector 205 operates to project ringing current over the subscriber line 211 extending to the called subscriber substation T11 in the remote exchange 10 and to effect operation of the line circuit 213 associated with the subscriber line 211 in order to mark the subscriber line 211 as busy to the other local connectors in the associated group. Also the local connector 205 returns ring-back tone current over the trunk 207 and the previously traced circuit to the calling subscriber substation T21 in the tandem exchange 20 in order to indicate to the subscriber thereat that the subscriber at the called subscriber substation T11 in the remote exchange 10 is being rung.

When the subscriber at the called subscriber substation T11 in the remote exchange 10 answers the call, the local connector 205 operates to reverse the polarity of the trunk 207 and consequently the polarity of the trunk 230 in order to bring about operation of the answer relay R310 in the trunk circuit 200; whereby the carrier equipment 394 is controlled to return an answer signal over the line 60 to the carrier equipment 494; whereby the carrier equipment 494 effects operation of the signal-in relay R450 in the trunk circuit 400; all in the manner previously explained. The signal-in relay R450 then effects operation of the hold relay R400; whereby the polarity of the trunk 430 is reversed with respect to the upper and lower windings of the line relay R470 in the trunk circuit 400; as previously explained. This reversal of polarity of the trunk 430 and consequently to the finder-selector link 426 brings about operation of the meter, not shown, associated with the calling subscriber line 421 in order to meter the call from the calling subscriber substation T21 in the tandem exchange 20 to the called subscriber substation T11 in the remote exchange 10. At this time a connection is established between the calling subscriber substation T21 in the tandem exchange 20 and the called subscriber substation T11 in the remote exchange 10; whereby conversation therebetween takes place in the manner previously explained.

At the conclusion of the established connection, when the subscriber at the called subscriber substation T11 in the remote exchange 10 disconnects, the local connector 205 again operates to reverse the polarity over the trunk 207 and the incoming selector 206 to the line conductors C231 and C232 of the trunk 230; whereby the left-hand winding of the answer relay R310 in the trunk circuit 200 is poled to restore in order to effect restoration of the signal-out relay R397 in the carrier equipment 394 and the consequent reoperation of the signal-in relay R495 in the carrier equipment 494; whereby the signal-in relay R450 in the trunk circuit 400 is restored; all in the manner previously explained. Upon restoring the signal-in relay R450 effects restoration of the hold relay R400; whereby the latter relay again effects the reversal of polarity over the trunk 430 with respect to the upper and lower windings of the line relay R470; however, without effect at this time; all in the manner previously explained.

When the subscriber at the calling subscriber substation T21 in the tandem exchange 20 then disconnects, the previously traced loop circuit for maintaining operated the line relay R470 in the trunk circuit 400 is interrupted. Upon restoring the line relay R470 effects the release of the trunk circuit 400 and the consequent restoration of the signal-out relay R497 in the carrier equipment 494; whereby the signal-in relay R395 in the carrier equipment 394 is reoperated effecting restoration of the signal-in relay R350 in the trunk circuit 200. Upon restoring, the signal-in relay R350 effects the release of the trunk circuit 200 and the consequent release of the incoming selector 206 and the local connector 205; all in the manner previously explained. At this time the established connection between the calling subscriber substation T21 in the tandem exchange 20 and the called subscriber substation T11 in the remote exchange 10 is released and all of the apparatus involved therein is completely released and available for further use.

In view of the foregoing, it will be understood that a connection may be extended from a calling subscriber substation T21, etc., in the tandem exchange 20 to a called paystation T12, etc., in the remote exchange 10 in an identical manner. Also, it will be understood, that a connection from a calling paystation T22, etc., in the tandem exchange 20 may be extended to a called subscriber substation T11, etc., or to a called paystation T12, etc., in the remote exchange 10 in a substantially identical manner. In this conjunction, it is noted incident to the extension of a connection from the calling paystation T22 in the tandem exchange 20 to a called subscriber substation or to a called paystation in the remote exchange 10, that when the call is answered, the apparatus operates in order to effect the operation of the hold relay R400 in the trunk circuit 400; whereby the polarity of the trunk 430 is reversed with respect to the upper and lower windings of the line relay R470 in the trunk circuit 400; all in the manner previously explained. This reversal of polarity over the trunk 430 and over a finder-selector link, such, for example, as the finder-selector link 426 and the line 422 extending to the paystation T22 brings about blocking of the transmitter at the paystation T22 by the associated copper oxide rectifier, unless the person at the paystation T22 has deposited a coin at this time. More particularly, in the event the person at the calling paystation T22 has not deposited a coin at this time, he may hear the person at the called subscriber substation or at the called paystation in the remote exchange 10, but he may not talk to the person mentioned by virtue of the circumstance that the copper oxide rectifier blocks the associated transmitter as a consequence of the reversal of polarity to the calling paystation T22. However, when the person at the calling paystation T22 deposits a coin, the copper oxide rectifier is removed from blocking the transmitter thereat; whereby the connection is completed in the manner previously explained.

*A call from a subscriber substation or paystation in the tandem exchange 20 to the operator switchboard in the main office 40*

First assume that a call initiated at a subscriber substation, such, for example, as the subscriber substation T21 in the tandem exchange 20, is to be extended to the operator switchboard 765 in the main office 40. Now assume that the finder of the finder-selector link 426 has operated to seize the subscriber line 421 extending to the calling subscriber substation T21 and that the selector of the finder-selector link 426 is conditioned to respond to the first digit dialed. The subscriber at the calling subscriber substation T21 in the tandem exchange 20 then dials the single digit assigned as the directory number of the operator switchboard 765 in the main office 40; which single digit may be 0. When the digit 0 is thus dialed at the calling subscriber substation T21 in the tandem exchange 20, the selector of the finder-selector link 426 responds thereto to select the group of trunks, including the trunk 510, and then to select an idle trunk in the group mentioned. For example, the selector of the finder-selector link 426 may select the particular trunk 510 extending to the trunk circuit 500; the trunk 510 being marked as idle by the application of battery potential upon the control conductor C513 thereof via the contacts 578 and 639 and the resistor 617. Also there is completed a loop circuit between the calling subscriber substation T21 in the tandem exchange 20 and the upper and lower windings of the line relay R610 in the trunk circuit 500. This loop circuit extends from ground by way of the lower winding of the line relay R610, the contacts 634 and the winding 652 of the repeating coil RC650 to the line conductor C512 of the trunk 510; and from battery potential by way of the upper winding of the line relay R610, the contacts 632 and the winding 651 of the repeating coil RC650 to the line conductor C511 of the trunk 510. The line conductors C511 and C512 of the trunk 510 are connected by way of the finder-selector link 426 and the subscriber line 421 to the calling subscriber substation T21 in the tandem exchange 20. When the above traced loop circuit is thus completed, the line relay R610 in the trunk circuit 500 operates in order to cause the trunk circuit 500 in the tandem exchange 20 to seize over the trunk line 665, the trunk circuit 600 at the way station 30 causing operation of the signal-out relay R660 in the trunk circuit 600 and the consequent operation of the signal-out relay R697 in the carrier equipment 694 disposed at the way station 30 in order to effect over the line 70, restoration of the signal-in relay R795 in the carrier equipment 794 disposed in the main office 40; whereby operation of the signal-in relay R705 in the trunk circuit 700 is brought about; thereby to indicate the presence of a call on the trunk circuit 700 waiting to be answered at the operator switchboard 765 in the manner previously explained.

The operator at the switchboard 765 in the main office 40 may answer the call utilizing the cord circuit 766; whereby the front plug P748 thereof is inserted into the jack J730 terminating the trunk circuit 700; whereby operation of the jack relay R710 and the sleeve relay R720 in the trunk circuit 700 are brought about in the manner previously explained. The trunk circuit 700 effects operation of the signal-out relay R797 in the carrier equipment 794 and the consequent restoration of the signal-in relay R695 in the carrier equipment 694; whereby the signal-in relay R670 in the trunk circuit 600 is restored; all in the manner previously explained.

Upon restoring, the signal-in relay R670 in the trunk circuit 600 effects restoration of the pulse relay R620 in the trunk circuit 500 in order to effect operation of the supervisory relay R560 therein in the manner previously explained. Upon operating, the supervisory relay R560 effects operation of the timer relay R550 which latter relay effects operation of the timer relay R540 after a predetermined time interval; whereupon the timer relay R540 effects restoration of the timer relay R550 and operation of the reverse battery relay R530; all in the manner previously explained. Upon operating the reverse battery relay R530 reverses the polarity of the trunk 515 incoming to the trunk circuit 500 as previously explained, but does not reverse the polarity of the line conductors C511 and C512 of the trunk 510 with respect to the upper and lower windings of the line relay R610 in the trunk circuit 500. Accordingly, the polarity of the trunk 510 is not reversed and consequently the polarity of the subscriber line 421 extending to the calling subscriber substation T21 in the tandem exchange 20 is not reversed; whereby the meter, not shown, associated with the subscriber line 421 is not operated. Accordingly, the call from the calling subscriber substation T21 in the tandem exchange 20 to the operator switchboard 765 in the main office 40 is a free call.

During the time that the timer relay R550 in the trunk circuit 500 occupies its operated position, the upper winding of the tone relay R565 is bridged by way of the contacts 552 and 554 and the condenser 525 across the line conductors C511 and C512 of the trunk 510; however, without effect since tone current does not traverse the lower winding of the tone relay R565 as the present call is from the calling subscriber substation T21 in the tandem exchange 20; whereby no class tone is applied to the control conductor C513 of the trunk 510.

At this time a connection is established between the calling subscriber substation T21 in the tandem exchange 20 and the called operator switchboard 765 in the main office 40; whereby the operator at the switchboard 765 is advised concerning the extension of the call and then proceeds to extend the call utilizing the rear plug P758 of the cord circuit 766 in the manner previously explained.

At the conclusion of the established connection, when the subscriber at the calling subscriber substation T21 in the tandem exchange 20 disconnects, the previously traced loop circuit for maintaining operated the line relay R610 in the trunk circuit 500 is interrupted, causing the latter relay to restore in order to effect restoration of the signal-out relay R660 in the trunk circuit 600 in the manner previously explained. Upon restoring the signal-out relay R660 effects restoration of the signal-out relay R697 in the carrier equipment 694 and the consequent reoperation of the signal-in relay R795 in the carrier equipment 794; whereby the signal-in relay R705 in the trunk circuit 700 is restored; all in the manner previously explained. When the signal-in relay R705 is thus restored, the front supervisory relay R745 in the cord circuit 766 is reoperated in order to bring about the illumination of the front supervisory lamp L747; thereby to indicate to the operator at the switchboard 765 in the main office 40 that the subscriber at the calling subscriber substation T21 in the tandem exchange 20 has disconnected.

The operator at the switchboard 765 in the main office 40 then withdraws the front plug P748 from the jack J730 effecting restoration of the sleeve relay R720 and the jack relay R710 in the trunk circuit 700 and the consequent restoration of the signal-out relay R797 in the carrier equipment 794; whereby the signal-in relay R695 in the carrier equipment 694 is reoperated to bring about reoperation of the signal-in relay R670 in the trunk circuit 600 in order to cause reoperation of the pulse relay R620 in the trunk circuit 500; all in the manner previously explained. Upon reoperating, the pulse relay R620 effects the release of the trunk circuit 500 and the consequent release of the finder-selector link 426; whereby the line circuit 423 associated with the subscriber line 421 is operated in order again to mark the subscriber line 421 extending to the subscriber substation T21 in the tandem exchange 20 as idle to the local connectors 427, etc., having access thereto.

At this time the established connection between the calling subscriber substation T21 in the tandem exchange 20 and the called operator switchboard 765 in the main office 40 is released and all of the apparatus involved therein is completely released and available for further use.

In view of the foregoing, it will be understood that a connection may be extended from a calling paystation, such, for example, as the paystation T22 in the tandem exchange 20 to the called operator switchboard 765 in the main office 40 in an identical manner. However, in this conjunction it is noted that when the selector of the finder-selector link in use, such, for example, as the finder-selector link 426, operates in response to the single digit 0 dialed at the calling paystation T22 to select an idle one of the trunks in the group including the trunk 510, such, for example, as the trunk 510 extending to the trunk circuit 500, an additional operation takes place. More particularly, since the present call originates at the paystation T22 in the tandem exchange 20, tone potential is applied from the line circuit 424 associated with the line 422 extending thereto through the finder-selector link 426 to the control conductor C513 of the trunk 510; whereby the lower winding of the tone relay R565 is energized with tone current in this case. The tone current traversing the lower winding of the tone relay R565 causes a corresponding tone voltage to be induced in the upper winding thereof; however without effect at this time.

Subsequently, when the operator at the switchboard 765 answers the call on the trunk circuit 700 by inserting the front plug P748 of the cord circuit 766 into the jack J730 terminating the trunk circuit 700, assuming that the apparatus named is utilized in the present connection, the apparatus mentioned operates in the manner previously explained; whereby the timer relay R550 in the trunk circuit 500 first operates and shortly thereafter the timer relay R540 operates effecting the restoration of the timer relay R550 as previously explained. During the timer interval that the timer relay R550 occupies its operated position, as noted above, the upper winding of the tone relay R565 is bridged across the line conductors C511 and C512 of the trunk 510; which trunk 510 is included in the previously traced connection extending back to the cord circuit 766 at the operator switchboard 765 in the main office 40; whereby tone current is returned to the headset 767 at the operator switchboard 765 in order to indicate to the operator thereat that the present call originates at a paystation in the tandem exchange 20. Subsequently, when the timer relay R540 in the trunk circuit 500 operates, it effects restoration of the timer relay R550, as previously noted, thereby terminating the projection of the class tone noted to the called operator switchboard 765 in the main office 40.

This tone signal indicates to the operator at the called switchboard 765 in the main office 40 that the call being answered originated at a paystation in the tandem exchange 20, thus reminding the operator at the switchboard 765 to require the person at the calling paystation T22 in the tandem exchange 20 to deposit the appropriate amount of money thereat after the connection has been completed to the desired destination. Of course, it will be understood that when the coins are subsequently deposited at the calling paystation T22 in the tandem exchange 20 that apparatus thereat operates in order to transmit identifying tones over the connection in a manner identical to that described above to the operator switchboard 765 in the main office 40.

*A call from the operator switchboard in the main office 40 to a subscriber substation or paystation in the tandem exchange 20*

First assume that the operator at the switchboard 765 in the main office 40 has answered a call utilizing the rear plug P758 of the cord circuit 766 thereat that requires completion to a called subscriber substation, such, for example, as the subscriber substation T21 in the tandem exchange 20. The operator inserts the front plug P748 of the cord circuit 766 into a jack terminating an idle one of the trunk circuits in the group including the trunk circuit 700. Assuming that the trunk circuit 700 is idle at this time and that the front plug P748 of the cord circuit 766 is inserted into the terminating jack J730 thereof by the operator at the calling switchboard 765 in the main office 40, the trunk circuit 700 is operated in order to effect seizure of the carrier equipment 794 in the main office 40; whereby the carrier equipment 694 at the way station 30 is seized over the line 70 to effect seizure of the trunk circuit 600; whereby the trunk circuit 500 is seized over the trunk line 665 extending between the way station 30 and the tandem exchange 20; whereby the trunk circuit 500 effects seizure of the incoming selector 434 over the trunk 520; all in the manner previously explained.

Since the present call is to be extended to the called subscriber substation T21 in the tandem exchange 20, the operator at the switchboard 765 in the main office 40 may dial directly the directory number of the called subscriber substation T21 in the tandem exchange 20, which number may be '121. More particularly, the finger wheel of the dial D760 in the cord circuit 766 is operated by the operator at the switchboard 765; whereby the three digits 1, 2 and 1 are transmitted over the connection and repeated by the trunk circuit 500 over the trunk 520; all in the manner previously explained. The incoming selector 434 responds to the first digit 1 transmitted over the trunk 510 and operates to select the first group of local connectors, including the local connector 427. For example, the incoming selector 434 may select the particular trunk 428 extending to the local connector 427; whereby the local connector 427 is rendered responsive to the next two digits transmitted over the trunk 520. The local connector 427 then responds to the digits 2 and 1 to select the subscriber line 421 extending to the called subscriber substation T21 in the tandem exchange 20; whereby the local connector 427 operates to test the idle or busy condition of the called subscriber substation T21 in accordance with conventional practice.

In the event the called subscriber substation T21 in the tandem exchange 20 is busy at this time, the line circuit 423 individual to the subscriber line 421 extending thereto has marked the condition noted to the local connector 427; whereby the local connector 427 operates to cause busy tone current to be returned over the trunk 428 and the incoming selector 434 and thence over the previously traced connection to the headset 767 at the calling operator switchboard 765 in the main office 40; all in the manner previously explained.

Now assuming that the called subscriber substation T21 in the tandem exchange 20 is idle when the local connector 427 operates to select the subscriber line 421 extending thereto, the local connector 427 operates to project ringing current over the subscriber line 421 extending to the called subscriber substation T21 and to effect operation of the line circuit 423 associated with the subscriber line 421 in order to mark the subscriber line 421 as busy to the other local connectors in the associated group. Also, the local connector 427 returns ring-back tone current over the trunk 428, the incoming selector 434 and the previously traced connection to the headset 767 at the calling operator switchboard 765 in the main office 40 in order to indicate to the operator thereat that the subscriber at the called subscriber substation T21 in the tandem exchange 20 is being rung; all in the manner previously explained.

When the subscriber at the called subscriber substation T21 in the tandem exchange 20 answers the call, the local connector 427 operates to reverse the polarity of the trunk 428 and consequently the polarity of the line conductors C521 and C522 of the trunk 520; whereby the right-hand winding of the answer relay R595 in the trunk circuit 500 is poled to operate. Upon operating, the answer relay R595 effects operation of the supervisory relay R580 in the trunk circuit 500 and the consequent operation of the signal-out relay R660 in the trunk circuit 600. The trunk circuit 600 then controls the carrier equipment 694 and consequently the carrier equipment 794; whereby the trunk circuit 700 is controlled in order to render to the operator at the calling switchboard 765 in the main office 40 answer supervision. At this time a connection is established between the calling operator switchboard 765 in the main office 40 and the called subscriber substation T21 in the tandem exchange 20.

At the conclusion of the established connection, when the subscriber at the called subscriber substation T21 in the tandem exchange 20 disconnects, the apparatus operates to render a disconnect signal to the calling operator switchboard 765 in the main office 40 in the manner previously explained. Subsequently, when the operator at the operator switchboard 765 withdraws the front plug P748 of the cord circuit 766 from the jack J730 terminating the trunk circuit 700, the trunk circuit 700, the carrier equipment 794, the carrier equipment 694, the trunk circuit 600, the trunk circuit 500 and the incoming selector 434 are released; all in the manner previously explained. When the incoming selector 434 is thus released, the local connector 427 is released; whereby the line circuit 423 operates to mark the subscriber line 421 extending to the subscriber substation T21 as idle to the local connectors 327, etc., having access thereto.

At this time the established connection between the calling operator switchboard 765 in the main office 40 and the called subscriber substation T21 in the tandem exchange 20 is released, and all of the apparatus involved therein is completely released and available for further use.

In view of the foregoing, it will be understood that a call from the calling operator switchboard 765 in the main office 40 may be extended to a called paystation T22, etc., in the tandem exchange 20 in an identical manner.

*Operation of the alarm system between the way station 30 and the main office 40*

Since the way station 30 is unattended, it is necessary to provide in conjunction with the carrier equipment connecting the way station 30 and the main office 40, an alarm system; the elements thereof associated with the carrier channel, including the carrier equipment 694 disposed at the way station 30 and the carrier equipment 794 disposed at the main office 40 and interconnected by the line 70, comprising the alarm sender 680 disposed at the way station 30 and the alarm receiver 770 disposed at the main office 40 as previously noted. When the trunk circuit 600 is idle, the signal-in relay R670 therein normally occupies its operated position and the signal-out relay R660 therein normally occupies its restored position; whereby there is completed, at the contacts 674 and 664, a holding circuit including the contacts 687 and the set of contacts S684 for maintaining operated the start relay R686 in the alarm sender 680. The operated start relay R686 retains completed at the contacts 688, a connection between the motor 681 and the commercial source of single phase A. C. power; whereby the motor 681, while operating, retains interrupted the set of swtich springs S682 and also operates the gearbox 683.

At any time, during the operation of the motor 681 in the alarm sender 680, should the trunk circuit 600 be taken for use either the signal-in relay R670 restores or the signal-out relay R660 operates as previously explained; interrupting, at the corresponding contacts 674 or 664, the previously traced holding circuit for maintaining operated the start relay R686 in the alarm sender 680; whereby the latter relay restores shortly thereafter, it being of the slow-to-release type. Upon restoring, the start relay R686 interrupts, at the contacts 687, a further point in the holding circuit for energizing the winding thereof; and interrupts, at the contacts 688, the circuit for operating the motor 681; whereby the motor 681 stops again closing the set of switch springs S682 and resetting the gearbox 683 back to its normal position. Subsequently, when the trunk circuit 600 again becomes idle, the signal-in relay R670 reoperates and the signal-out relay R660 restores; whereby the contacts 674 and 664 are again closed completing a circuit, including the set of switch springs S682 and the contacts S684 for operating the start relay R686; whereby the latter relay reoperates, recompleting, at the contacts 687, the previously traced holding circuit therefor; and recompletes, at the contacts 688, the previously mentioned circuit for operating the motor 681. When operation of the motor 681 is thus initiated, the set of switch springs S682 is again opened and operation of the gearbox 683 again proceeds from its normal position.

In view of the foregoing, it will be understood that in the event the trunk circuit 600 remain idle for a predetermined time interval, that the motor 681 in the alarm sender 680 operating throughout this predetermined time interval drives the gearbox 683 away from its normal position to its limit position; whereby the contacts S684 are opened and the contacts S685 are closed. When the contacts S684 are opened, the previously traced holding circuit for maintaining operated the start relay R686 is interrupted; whereby the latter relay restores shortly thereafter, it being of the slow-to-release type, as previously noted. When the contacts S685 are closed, a path is completed, including the contacts 687, 664 and 674, for applying ground potential to the signal-out conductor C603 for the brief time interval while the start relay R686 is restoring. However, when the start relay R686 restores, it interrupts, at the contacts 687, the previously traced path for applying ground potential to the signal-out conductor C603 by way of the above traced path. Hence, ground potential is applied to the signal-out conductor C603, and then removed therefrom shortly thereafter, in order to cause the signal-out relay R697 in the carrier equipment 694 to operate and then restore during a very brief time interval. Also, when the start relay R686 restores, it interrupts, at the contacts 688 the circuit for operating the motor 681; whereby the motor 681 stops, reclosing the set of switch springs S682 in order to effect reoperation of the start relay R686 in the manner previously explained. Also, when the motor 681 stops, the gearbox 683 is returned from its limit position to its normal position, interrupting, at the contacts S685, a further point in the previously traced path for applying ground potential to the signal-out conductor C603 and reclosing the contacts S684 in order to effect reoperation of the start relay R686 as explained above. Accordingly, as long as the trunk circuit 600 remains idle, the alarm sender 680 operates continuously in order to cause intermittent operation and immediate restoration of the signal-out relay R697 in the carrier equipment 694; which intermittent operation of the signal-out relay R697 constitutes a periodic alarm signal. The periodicity of the alarm signal is determined by the character of the gearbox 683 which, for example, may be operative from its normal position to its limit position during a time interval of ten minutes by way of example. Hence, the alarm sender 680 operates to transmit the alarm signal every ten minutes as long as the trunk circuit 600 is idle throughout the time interval mentioned.

Each time the signal-out relay R697 in the carrier equipment 694 operates and then restores under the control of the alarm sender 680, the 24.55 kc. carrier signal is transmitted from the carrier equipment 694 over the line 70 to the carrier equipment 794 in order to cause corresponding restoration and reoperation of the signal-in relay R795 therein; whereby the signal-in relay R795 repeats, at the contacts 796, the alarm signals over the signal-in conductor C704. Specifically, when the signal-in relay R795 restores and then reoperates, it completes and then interrupts, at the contacts 796, the previously mentioned path for applying ground potential to the signal-in conductor C704; whereby the lower winding of the signal-in relay R705 in the trunk circuit 700 is momentarily energized; however, without effect since the latter relay is retained slightly slow-to-operate as a consequence of the normally completed path, including the contacts 715, for short-circuiting the upper winding thereof. Hence, the signal-in relay R705 in the trunk circuit 700 does not follow the alarm signals received by the signal-in relay R795 in the carrier equipment 794 thereby preventing the initiation of a false call upon the trunk circuit 700 terminating in the jack J730 before the operator switchboard 765 in the main office 40.

However, the alarm signals received by the signal-in relay R795 in the carrier equipment 794 and repeated at the contacts 796 thereof over the signal-in conductor C704 are also transmitted by way of the contacts 781 through the upper winding of the start relay R785 in the alarm receiver 770; whereby the latter relay operates shortly thereafter, it being of the slow-to-operate type. Upon operating, the start relay R785 completes, at the contacts 786, a holding circuit, including the contacts 793, for energizing the lower winding thereof. At this point it is noted that the start relay R785 in the alarm receiver 770 being slightly slow-to-operate will not operate in the event the signal-in relay R795 in the carrier equipment 794 operates and then restores immediately as a consequence of receiving a transit surge over the line 70; nor will the signal-in relay R705 in the trunk circuit 700 operate as a consequence of such operation of the signal-in relay R795 in the carrier equipment 794 as a consequence of the surge mentioned. Moreover, the signal-in relay R705 in the trunk circuit 700 requires considerably more time to operate than does the start relay R785 in the alarm receiver 770; whereby the signal-in relay R705 does not respond to the alarm signals, whereas the start relay R785 does respond thereto; all as explained above.

Upon operating, the start relay R785 also completes, at the contacts 787, a path, including the contacts 716, 728 and 782, the set of switch springs S777 and the contacts 703, for operating the hold relay R790. Upon operating, the hold relay R790 completes, at the contacts 791', a holding circuit therefore, including the contacts 702, 782, 728 and 716. Also at this point, it is noted that the hold relay R790 is operated over the above traced circuit and completes the above traced holding circuit only when the trunk circuit 700 is idle; whereby the jack relay R710 and the sleeve relay R720 therein occupy their restored positions closing the corresponding contacts 716 and 728. However, this does not impose a new condition upon the operation of the alarm receiver 770 that is not imposed upon the alarm sender 680 since the trunk circuit 700 must remain idle during the time interval mentioned as the trunk circuit 600 remains idle during the time interval mentioned, as it will be understood that when one of these trunk circuits becomes busy, it renders the other thereof busy since they are paired and directly connected together by the corresponding carrier equipment 694 and 794 interconnected by the line 70.

Continuing now with the operation of the alarm receiver 770, upon operating the hold relay R790 interrupts, at the contacts 793, the previously traced holding circuit for energizing the lower winding of the start relay R785; whereby the latter restores at the conclusion of the alarm signal. Further, the hold relay R790 completes, at the contacts 791, a connection between the motor 773 and the commercial source of single phase A. C. power; whereby the motor 773 operates opening the sets of switch springs S777 and S778. Also, the motor 773 drives the gearbox 774 away from its normal position. When the start relay R785 restores, it completes, at the contacts 788, a point in multiple to the contacts 702 in the holding circuit for the hold relay R790.

When the gearbox 774 has been driven away from its normal position into a first control position as a consequence of continuous operation of the motor 773, the set of contacts S775 is closed momentarily completing an obvious circuit for operating the timer relay R700. Upon operating, the timer relay R700 completes, at the contacts 701, a holding circuit therefore, including the contacts 792. Also the timer relay R700 interrupts, at the contacts 702, one of the multiple points in the previously traced holding circuit for maintaining operated the hold relay R790.

In the event the carrier equipment 694 and 794 is operating satisfactorily, the alarm sender 680 will operate again to transmit the alarm signal over the carrier link approximately 10 minutes after the last transmission thereof assuming that the trunk circuits 600 and 700 remain idle in the interim. When this alarm signal is again transmitted from the alarm sender 680 in the manner previously explained, the carrier equipment 694 effects operation of the carrier equipment 794; whereby the start relay R785 in the alarm receiver 770 again operates and restores as previously noted. When the start relay R785 operates at this time, it interrupts, at the contacts 788, the last multiple point in the holding circuit for the hold relay R790 in order to cause the latter relay to restore; however, the start relay R785 does not immediately recomplete, at the contacts 787, the original operating circuit for the hold relay R790 since the operating motor 773 retains open the contacts S777. Upon restoring, the hold relay R790 interrupts, at the contacts 791', a further point in the holding circuit therefor; and completes, at the contacts 793, the previously traced holding circuit for energizing the lower winding of the start relay R785. Also the hold relay R790 interrupts, at the contacts 792, the previously traced holding circuit for the timer relay R700 in order to cause the latter relay to restore since the contacts S775 are now open as a consequence of the gearbox 774 having been driven past its first control position as a result of continued operation of the motor 773. Finally upon restoring, the hold relay R790 interrupts, at the contacts 791, the circuit for operating the motor 773; whereby the motor 773 stops, reclosing the sets of switch springs S777 and S778. When the set of switch springs S777 is thus closed the previously traced original operating circuit for the hold relay R790 is recompleted since the start relay R785 occupies its operated position. Upon reoperating, the hold relay R790 again completes, at the contacts 791', the holding circuit therefor, including the contacts 702 of the restored timer relay R700; and interrupts, at the contacts 793, the holding circuit for energizing the lower winding of the start relay R795 in order to cause the latter relay to restore. Finally, the hold relay R790 recompletes, at the contacts 791, the circuit for operating the motor 773; whereby the motor 773 again opens the sets of switch springs S777 and S778. When the motor 773 stopped, the gearbox 774 was reset to its normal position; whereby operation of the gearbox 774 from its normal position toward its first control position again takes place as a consequence of the initiation of another cycle of operation of the motor 773.

In view of the foregoing explanation of the mode of operation of the alarm receiver 770 in conjunction with the alarm sender 680, it will be understood that the alarm sender 680 upon transmitting a first alarm signal initiates operation of the alarm receiver 770; and then the alarm sender 680 upon transmitting a second alarm signal arrests operation of the alarm receiver 770 and immediately thereafter again initiates operation thereof; whereby the alarm receiver 770 operates continuously through repeated cycles each ten minutes under the control of the alarm sender 680 as long as the trunk circuits 600 and 700 remain idle and the carrier link, including the carrier equipment 694 and 794 and the line 70 is operating satisfactorily.

Of course, it will be understood that at any time, when one of the trunk circuits 600 or 700 become busy, the other trunk circuit also becomes busy; whereby operation of both the alarm sender 680 and the alarm receiver 770 are arrested; whereby the alarm sender 680 and the alarm receiver 770 are retained in synchronism.

However, should the carrier link, including the carrier equipment 694 and 794 and the line 70, become faulty, the alarm sender 680 will fail to transmit the alarm signal at the elapse of each ten minute time interval while the trunk circuits 600 and 700 are idle; in which peculiar event, the alarm receiver 770 will operate continuously for a time interval in excess of ten minutes. In this event, the motor 773 operates continuously for a time interval greater than ten minutes; whereby the gearbox 774 is driven away from its normal position through its first control position at the expiration of nine and one-half minutes and into its second control position at the expiration of an additional minute. Specifically, the gearbox 774 is driven into its second control position from its normal position at the expiration of ten and one-half minutes of continuous operation of the motor 773. When the gearbox 774 reaches its second control position, the contacts S776 are closed momentarily completing a circuit, including the contacts 792' of the operated hold relay R790, for operating the alarm relay R780. Upon operating, the alarm relay R780 completes, at the contacts 783, a local holding circuit therefore, including the reset key K773. Also, the alarm lamp L771 is illuminated in multiple with the operated alarm relay R780. The illuminated alarm lamp L771 indicates to the attendant in the main office 40 that the carrier link, including the carrier equipment 694 and the carrier equipment 794 and the line 70, is faulty and should be repaired. After the carrier link mentioned has been repaired, the reset key K773 is operated in order to interrupt the local holding circuit for the alarm relay R780; whereby the latter relay restores in order to place the alarm receiver 770 again in service. Also, in passing it is noted that while the alarm relay R780 occupies its operated position, it interrupts, at the contacts 781, the connection between the signal-in conductor C704 and the upper winding of the start relay R785 in order to prevent operation of the latter relay during the time that the alarm receiver 770 is locked out of service. Further, the alarm relay R780 interrupts, at the contacts 782, while it is operated, the holding circuit for the hold relay R790 in order to cause the latter relay to restore; thereby to arrest operation of the motor 773 during the time interval mentioned.

Also, it is noted that in the event the hold relay R790 operates under the control of the start relay R785, in the manner previously explained, but that the motor 773 fails to operate, possibly due to the failure of the commercial source of A. C. power, that the hold relay R790 completes, at the contacts 793', a circuit, also including the set of switch springs S778, for operating the delayed alarm DA772. In passing, it is noted that the delayed alarm DA772 is operated only in the event that the operating circuit therefor is retained completed for a suitable time interval registering the failure of the motor 773 to operate and open the set of switch springs S778 within a reasonable time interval following the operation of the hold relay R790.

When the trunk circuit 600 is busy, the signal-out relay R660 occupies its operated position and the signal-in relay R670 occupies its restored position; whereby the signal-out relay R697 in the carrier equipment 694 occupies its operated position and the signal-in relay R795 in the carrier equipment 794 occupies its restored position; whereas in the trunk circuit 700, the signal-in relay R705, the jack relay R710, and the sleeve relay R720 occupy their operated positions; whereby the signal-out relay R797 in the carrier equipment 794 occupies its operated position and the signal-in relay R695 in the carrier equipment 694 occupies its restored position. The operated signal-out relay R660 and the restored signal-in relay R670 in the trunk circuit 600 prevent operation of the motor 681 in the alarm sender 680; while the operated jack relay R710 and the operated sleeve relay R720 in the trunk circuit 700 prevent operation of the hold relay R790 and the consequent operation of the motor 773 in the alarm receiver 770. However, the restored signal-in relay R795 effects operation of the start relay R785 in the alarm receiver 770. Accordingly, when the trunk circuits 600 and 700 become idle, the signal-out relay R660 restores, the signal-in relay R670 reoperates and the signal-in relay R705, the jack relay R710 and the sleeve relay R720 all restore. When the signal-out relay R660 restores and the signal-in relay R670 reoperates, operation of the motor 681 in the alarm sender 680 is initiated in the manner previously explained. Similarly, when the jack relay R710 and the sleeve relay R720 restore, the hold relay R790 is operated in order to initiate operation of the motor 773 in the alarm receiver 770. Thus operation of the alarm sender 680 and operation of the alarm receiver 770 are started in synchronism as soon as the trunk circuits 600 and 700 become idle; whereby the alarm receiver 770 may check the associated carrier link at the expiration of the first ten minute time interval when the first alarm signal is received from the alarm sender 680.

In view of the foregoing, it will be understood that the alarm sender 680 transmits the alarm signals to the alarm receiver 770 only when the trunk circuits 600 and 700 are idle and when the associated carrier link is operating properly and that each time the trunk circuits 600 and 700 are seized for use, the alarm sender 680 and the alarm receiver 770 are released. However, since the alarm sender 680 transmits the alarm signals to the alarm receiver, when the trunk circuits 600 and 700 are idle, the failure of the alarm receiver to receive periodically the alarm signal indicates that the carrier link is faulty and causes an appropriate signal to be presented in the main office 40 that is staffed by attendants and repairmen.

*Local calls in the main office 40*

First assume that a call initiated at a subscriber substation, such, for example, as the subscriber substation T41 in the main office 40 is to be extended to another subscriber substation therein. When the call is initiated at the calling subscriber substation T41, the line circuit 842 associated with the subscriber line 841 operates to mark the subscriber line 841 as busy to the local switch train 844 and to the toll switch train 805 having access thereto, and to initiate operation of the distributor 843. The distributor 843 assigns an idle portion of the local switch train 844; whereby the finder thereof operates to seize the subscriber line 841. The subscriber at the calling subscriber substation T41 then dials the directory number of the called subscriber substation; whereby the various selectors and then the connector in the local switch train 844 operate, the connector mentioned operating to select the subscriber line extending to the called subscriber substation. At this time the idle or busy condition of the called subscriber substation is tested by the connector mentioned; and the subsequent completion and ultimate release of the established connection between the calling subscriber substation T41 and the called subscriber substation in the main office 40 are in accordance with conventional practice.

*A call from a subscriber substation to the operator switchboard in the main office 40*

First assume that a call initiated at a subscriber substation, such, for example, as the subscriber substation T41 in the main office 40 is to be extended to the operator switchboard 765 therein. Now assuming that the local switch train 844 has operated to seize the subscriber line 841 extending to the calling subscriber substation T41, the subscriber at the calling subscriber substation T41 dials the single digit assigned as the directory number of the operator switchboard 765 in the main office 40; which single digit may be 0. The local switch train 844 responds to the single digit 0 in order to select the group of trunks, including the trunk 845, and then to select an idle trunk in the group mentioned. For example, the local switch train 844 may select the particular trunk 845 extending to the C. L. R. trunk 846; whereby the C. L. R. trunk 846 operates to initiate a call on the outgoing trunk 847 extending therefrom and terminating in the jack J848 at the operator switchboard 765. The operator at the switchboard 765 selects an idle one of the cord circuits, such, for example, as the cord circuit 766 and answers the call by inserting the rear plug P758 thereof into the jack J848 terminating the trunk 847 extending from the C. L. R. trunk 846; whereby there is completed an establsihed connection between the calling subscriber substation T41 and the headset 767 at the operator switchboard 765, assuming that the talk rear key K735 of the cord circuit 766 has been operated at this time. More particularly, the subscriber at the calling subscriber substation T41 in the main office 40 advises the operator at the switchboard 765 therein concerning the extension of the call; whereby the operator extends the call utilizing the front plug P748 of the cord circuit 766 in an obvious manner.

At the conclusion of the established connection, when the subscriber at the calling subscriber substation T41 in the main office 40 disconnects the rear supervisory relay R755 in the cord circuit 766 is reoperated in order again to effect illumination of the rear supervisory lamp L757 in order to render to the operator at the switchboard 765 disconnect supervision. The operator at the switchboard 765 then withdraws the rear plug P758 of the cord circuit 766 from the jack J848 terminating the trunk 847 extending to the C. L. R. trunk 846; whereby the C. L. R. trunk 846 is released effecting the release of the local switch train 844; whereupon the line circuit 842 associated with the subscriber line 841 extending to the subscriber substation T41 is operated to mark the subscriber line 841 as idle to the toll switch train 805 and to the local switch train 844 having access thereto.

*A call from the operator switchboard to a subscriber substation in the main office 40*

First assume that the operator at the switchboard 765 in the main office 40 has answered a call utilizing the front plug P748 of the cord circuit 766 thereat that requires completion to a called subscriber substation, such, for example, as the subscriber substation T41 therein. The operator inserts the rear plug P758 of the cord circuit 766 into a jack terminating an idle trunk extending to the toll switch train 805, such, for example, as the jack J807 terminating the trunk 806 extending to the toll switch train 805. The operator at the switchboard 765 then operates the dial key K737 to its rear position in order to connect the dial D760 incorporated therein to the rear plug P758 thereof. The operator at the switchboard 765 then proceeds to dial the directory number of the called subscriber substation T41; whereby the toll switch train 805 operates in order to select the subscriber line 841 extending to the called subscriber substation T41. The toll switch train 805 operates to test the idle or busy condition of the called subscriber substation T41; and assuming that the called subscriber substation T41 is idle, ringing current is projected from the toll switch train 805 over the subscriber line 841 extending thereto. When the subscriber at the called subscriber substation T41 answers the call, a connection is completed between the headset 767 at the calling operator switchboard 765 and the called subscriber substation T41, assuming that the operator at the switchboard 765 has restored the dial key K737 to its normal position and has operated the talk rear key K735. The operator at the switchboard 765 then advises the subscriber at the called subscriber substation T41 that there is a call for him; whereupon the operator at the switchboard 765 restores the talk key K735 thereby to disconnect the headset 767 thereat from the cord circuit 766 and to complete a connection between the front and rear plugs P748 and P758 of the cord circuit 766 in order to complete a connection between the called subscriber substation T41 in the main office 40 and the original calling connection that had been previously answered at the operator switchboard 765 utilizing the front plug P748 of the cord circuit 766.

At the conclusion of the established connection, when the subscriber at the called subscriber substation T41 in the main office 40 disconnects, the rear supervisory relay R755 in the cord circuit 766 is reoperated in order again to effect illumination of the rear supervisory lamp L757 in order to render to the operator at the switchboard 765 disconnect supervision. The operator at the switchboard 765 then withdraws the rear plug P758 of the cord circuit 766 from the jack J807 in order to effect the release of the tool switch train 805; whereby the line circuit 842 associated with the subscriber line 841 extending to the subscriber substation T41 is operated to mark the subscriber line 841 as idle to the toll switch train 805 and to the local switch train 844 having access thereto.

*A call from the operator switchboard in the main office 40 to a subscriber substation in the distant office 50*

First assume that the operator at the switchboard 765 in the main office 40 has answered a call utilizing the front plug P748 of the cord circuit 766 thereat that requires completion to a called subscriber substation, such, for example, as the subscriber substation T51 in the distant office 50. The operator inserts the rear plug P758 of the cord circuit 766 into a jack terminating an idle one of the trunk circuits in the group, including the trunk circuit 800. Assuming that the trunk circuit 800 is idle at this time, as indicated by the unlighted condition of the busy lamp L817, the operator at the switchboard 765 may insert the rear plug P758 into the jack J815 terminating the trunk circuit 800, having operated the dial key K737 in the cord circuit 766 to its rear position. When the rear plug P758 is thus inserted into the jack J815, the contacts 816 thereof are closed, completing an obvious circuit for operating the jack relay R835 in the trunk circuit 800. Upon operating, the jack relay R835 completes, at the contacts 839, an obvious circuit for illuminating the busy lamp L817 in order to indicate the busy condition of the trunk circuit 800 at this time. Also the jack relay R835 completes, at the contacts 836, a circuit including the contacts 866, for operating the re-ring relay R870. Also when the rear plug P758 is inserted into the jack J815, the respective sleeves thereof are engaged completing a circuit, including the contacts 751, for energizing the winding of the rear supervisory relay R755 in the cord circuit 766 in series with the upper winding of the sleeve relay R820 in the trunk circuit 800 and a multiple circuit, also including the contacts 837 and 861, for energizing the lower winding of the sleeve relay R820 in multiple with the upper winding thereof. Accordingly, the sleeve relay R820 in the trunk circuit 800 operates and the front supervisory relay R755 in the cord circuit 766 operates as it is of the marginal type. Upon operating the rear supervisory relay R755 completes, at the contacts 756, an obvious circuit for illuminating the rear supervisory lamp L757 in order to indicate that the present call has not yet been extended and answered. Also upon operating, the sleeve relay R820 completes, at the contacts 822 and 824, a bridge connection between the impulsing contacts 762 of the dial D760 in the cord circuit 766 and the winding of the re-ring relay R865. The bridge path mentioned includes the contacts 883 and 885, as well as the windings 876' and 877' of the repeating coil RC875, together with the contacts 822 and 824 and the tips and rings of the jack J815 and the rear plug P758. Also upon operating, the sleeve relay R820 interrupts, at the contacts 826, a normally completed termination circuit, including the contacts 892, the condenser 834 and the resistor 833, across the windings 876' and 877' of the repeating coil RC875, since the adjacent terminals of the windings 876' and 877' are connected together via the condenser 874'. Further, the sleeve relay R820 completes, at the contacts 821, a circuit, including the contacts 868 and 836, for operating the signal-out relay R830.

Upon operating, the signal-out relay R830 completes, at the contacts 831, an obvious path for applying ground potential to the signal-out conductor C803, thereby to effect operation of the signal-out relay R897 in the carrier equipment 894 disposed in the main office 40. Upon operating the signal-out relay R897 closes the contacts 898 included in the plate circuit of the associated transmitting amplifier; whereby the 24.55 kc. carried signal is transmitted by the carrier equipment 894 over the line 80 extending between the main office 40 and the distant office 50. The carrier equipment 994 in the distant office 50 responds to the 24.55 kc. carrier signal transmitted thereto over the line 80 in order to bring about the restoration of the signal-in relay R995 therein; whereby the latter relay completes, at the contacts 996, an obvious path for applying ground potential to the signal-in conductor C904 in order to bring about operation of the signal-in relay R920 in the trunk circuit 900.

Upon operating, the signal-in relay R920 completes, at the contacts 923, a circuit, including the contacts 965', for operating the hold relay R930; and completes, at the contacts 921 a bridge, including the contacts 965, the resistor 916, the windings 913 and 914 of the repeating coil RC910 and the contacts 963 and 968, across the line conductors C1031 and C1032 of the trunk 1030 extending to the incoming selector 1036. Upon operating the hold relay R930 completes, at the contacts 934, an obvious path for applying ground potential to the control conductor C1035 of the trunk 1030 extending to the incoming selector 1036, thereby to effect seizure of the incoming selector 1036; whereby it is rendered responsive to the first digit transmitted over the trunk 1030 extending thereto. Also, the hold relay R930 interrupts, at the contacts 936, a normally completed path, including the contacts 951', for applying battery potential by way of the winding of the seize relay R955 to the control conductor C1043 of the trunk 1040 extending to the trunk circuit 900; and completes, at the contacts 935, an obvious path for applying ground potential to the control conductor C1043; thereby to mark the trunk 1040, and consequently the trunk circuit 900, as busy to the selectors of the finder-selector links 1062, etc., disposed at the various toll operator positions at the Strowger dial toll board 1060 having access thereto.

The operator at the switchboard 765 in the main office 40 then proceeds to dial the first digit of the directory number of the called subscriber substation T51 in the distant office 50. When the finger wheel of the dial D760 incorporated in the cord circuit 766 is rotated away from its home position, the set of off-normal springs 761 is closed and remains closed until the finger wheel is returned back to its home position; while the set of impulsing springs 762 is actuated to transmit the impulses of the present digit only during the return of the finger wheel back to its home position. When the finger wheel of the dial D760 is rotated away from its home position, closing the set of off-normal springs 761, a circuit, including the rear contacts of the dial key K737, is completed for operating the dial rear relay R750. Upon operating the dial rear relay R750 interrupts, at the contacts 751, the previously traced circuit for energizing the winding of the rear supervisory relay R755 in series with the multiple connected upper and lower windings of the sleeve relay R820; whereby the relays mentioned restore. Upon restoring, the rear supervisory relay R755 in the cord circuit 766 interrupts, at the contacts 756, the previously mentioned circuit for illuminating the rear supervisory lamp L757; and upon restoring the sleeve relay R820 in the trunk circuit 800 interrupts, at the contacts 822 and 824, the previously traced bridge extending to the re-ring relay R865. Also, the sleeve relay R820 recompletes, at the contacts 826, the previously traced termination circuit, including the condenser 834 and the resistor 833, across the windings 876' and 877' of the repeating coil RC875. Further, the sleeve relay R820 completes, at the contacts 823 and 825, an alternative bridge circuit, including the tips and the rings of the jack J815 and the rear plug P758, as well as the contacts of the restored talk rear key K735, the rear contacts of the operated dial key K737 and the impulsing contacts 762 of the dial D760, for maintaining operated the signal-out relay R830 in the trunk circuit 800; and interrupts, at the contacts 821, the previously traced original circuit for maintaining operated the signal-out relay R830. However, since the above traced bridge circuit for energizing the winding of the signal-out relay R830 in the trunk circuit 800 includes the impulsing contacts 762 of the dial D760 incorporated in the cord circuit 766, the impulses of the present digit transmitted by the impulsing contacts 762 of the dial D760, incident to the return of the finger wheel thereof back into its home position, are transmitted over the bridge circuit, previously traced, to the signal-out relay R830, causing the latter relay to follow; whereby the signal-out relay R830 repeats, at the contacts 831, the impulses of the present digit over the signal-out conductor C803 in order to cause the signal-out relay R897 in the carrier equipment 894 to follow. More particularly, the signal-out relay R897 in the carrier equipment 894 repeats, at the contacts 898, the impulses of the present digit; whereby the 24.55 kc. carrier signal is interrupted in accordance with the impulses of the present digit; whereby the signal-in relay R995 in the carrier equipment 994 follows, repeating, at the contacts 996, corresponding pulses of ground potential over the signal-in conductor C904 causing the signal-in relay R920 in the trunk circuit 900 to follow.

The finger wheel of the dial D760 incorporated in the cord circuit 766 is first operated in accordance with the first digit of the directory number of the called subscriber substation T51 in the distant office 50, as noted above, and when the finger wheel is returned to its home position, the impulsing contacts 762 of the dial D760 have completed the transmission of the impulses of the first digit mentioned and the off-normal springs 761 of the dial D760 are opened, interrupting the previously traced circuit for maintaining operated the dial rear relay R750; whereby the latter relay restores shortly thereafter, it being of the slow-to-release type. Upon restoring, the dial rear relay R750 recompletes, at the contacts 751, the previously traced circuit for operating the rear supervisory relay R755 in the cord circuit 766 and the sleeve relay R820 in the trunk circuit 800. Upon reoperating the rear supervisory relay R755 again illuminates the rear supervisory lamp L757; and upon reoperating, the sleeve relay R820 again completes, at the contacts 821, the previously traced original circuit for maintaining operated the signal-out relay R830 in the trunk circuit 800 in order to maintain operated the signal-out relay R897 in the carrier equipment 894, thereby to retain restored the signal-in relay R995 in the carrier equipment 994 and to retain operated the signal-in relay R920 in the trunk circuit 900 as previously explained. Also upon reoperating, the sleeve relay R820 interrupts, at the contacts 826, the termination circuit, including the condenser 834 and the resistor 833, across the windings 876' and 877' of the repeating coil RC875; interrupts, at the contacts 823 and 825, the above traced bridge circuit, including the impulsing contacts 762 of the dial D760 incorporated in the cord circuit 766, for energizing the winding of the signal-out relay R830; and recompletes, at the contacts 822 and 824, the previously traced bridge connection between the impulsing contacts 762 of the dial D760 incorporated in the cord circuit 766 and the winding of the re-ring relay R865.

As explained above, the signal-in relay R920 in the trunk circuit 900 follows the impulses of the first digit dialed at the operator switchboard 765 in the main office 40. Each time the signal-in relay R920 restores and then reoperates, it interrupts and then recompletes, at the contacts 923, the previously traced circuit for maintaining operated the hold relay R930; whereby the latter relay is retained in its operated position during impulsing since it is of the slow-to-release type. Also, each time the signal-in relay R920 restores and then reoperates, it completes and then interrupts, at the contacts 922, a circuit, including the contacts 932, for operating the dial relay R940; whereby the latter relay operates and remains operated during impulsing since it is of the slow-to-release type. Upon operating, the dial relay R940 interrupts, at the contacts 941, a normally completed connection including the condenser 915 between the adjacent terminals of the windings 913 and 914 of the repeating coil RC910; and completes, at the contacts 942, a path including the resistor 919 for short-circuiting the winding 913 of the repeating coil RC910; thereby to improve impulsing over the line conductors C1031 and C1032 of the trunk 1030 extending to the incoming selector 1036. Finally, each time the signal-in relay R920 restores and then reoperates, it interrupts and then recompletes, at the contacts 921, the previously traced bridge path across the line conductors C1031 and C1032 of the trunk 1030 extending to the incoming selector 1036; whereby the impulses of the present digit are transmitted over the trunk 1030 to the incoming selector 1036. The incoming selector 1036 responds to the first digit received thereby over the trunk 1030 to select the group of trunks, including the trunk 1037, extending to the toll switch train 1038 and then to select an idle trunk in the group mentioned. For example, the incoming selector 1036 may select the particular trunk 1037 extending to the toll switch train 1038.

At the conclusion of the first digit, the signal-in relay R920 in the trunk circuit 900 is retained in its operated position as previously explained; whereby the dial relay R940 restores shortly thereafter as it is of the slow-to-release type. Upon restoring, the dial relay R940 interrupts, at the contacts 942, the previously mentioned path including the resistor 919 for short-circuiting the winding 913 of the repeating coil RC910; and recompletes, at the contacts 941, the previously mentioned original connection including the condenser 915 between the adjacent terminals of the windings 913 and 914 of the repeating coil RC910.

In view of the foregoing, it will be understood that the dial D760 incorporated in the cord circuit 766 is operated successively in accordance with the various digits of the directory number of the called subscriber substation T51 in the distant office 50; whereby the digits mentioned are transmitted from the dial D760 to the signal-out relay R830 in the trunk circuit 800, repeated by the signal-out relay R830 to the signal-out relay R897 in the carrier equipment 894, repeated by the signal-out relay R897 to the signal-in relay R995 in the carrier equipment 994, repeated by the signal-in relay R995 to the signal-in relay R920 in the trunk circuit 900 and repeated by the signal-in relay R920 over the trunk 1030. The first digit transmitted over the trunk 1030 effects operation of the incoming selector 1036; whereby the trunk 1037 extending to the toll switch train 1038 is selected in the manner described above. The subsequent digits transmitted over the trunk 1030 are transmitted via the incoming selector 1036 and the trunk 1037 to the toll switch train 1038; whereby the toll switch train 1038 operates in order to select the subscriber line 1051 extending to the called subscriber substation T51 in the distant office 50; whereby the toll switch train 1038 operates to test the idle or busy condition of the called subscriber substation T51.

First assuming that the called subscriber substation T51 in the distant office 50 is busy at this time, the condition noted being marked by the line circuit 1052 individually associated with the subscriber line 1051 extending thereto, whereby the toll switch train 1038 operates to interrupt 60 times per minute the normal application of ground potential to the E. C. conductor of the trunk 1037 and consequently over the incoming selector 1036 to the corresponding control conductor C1034 of the trunk 1030. At this point it is noted that the upper and lower windings of the answer relay R975 in the trunk circuit 970 are normally energized; whereby the latter relay, being of the differential type, does not operate when both of the windings thereof are thus energized. The circuit for energizing the lower winding of the answer relay R975 includes the contacts 934 of the operated hold relay R930, the contacts 963' and 987; and the circuit for energizing the upper winding of the answer relay R975 includes the contacts 933 of the operated hold relay R930, the contacts 986 and the normally grounded control conductor C1034 of the trunk 1030, the control conductor C1034 being normally grounded in the incoming selector 1036 or in the toll switch train 1038 while the connection is being extended. Accordingly, at this time, ground potential is removed 60 times per minute in the toll switch train 1038 from the control conductor C1034 of the trunk 1030, whereby the upper winding of the answer relay R975 is deenergized 60 times per minute causing the latter relay to operate and restore accordingly; the answer relay R975 operating each time the upper winding thereof is deenergized and restoring each time the upper winding thereof is again energized since it is of the differential type. Accordingly the answer relay R975 operates and restores 60 times per minute repeating corresponding impulses at the contacts 979 to the signal-out conductor C903 in order to cause the signal-out relay R997 in the carrier equipment 994 to follow. Each time the signal-out relay R997 operates and then restores, it completes and then interrupts, at the contacts 998, the plate circuit of the associated transmitting amplifier; whereby the carrier equipment 994 operates to transmit over the line 80, 60 splashes per minute of 15.95 kc. carrier signal causing the signal-in relay R895 in the carrier equipment 894 to follow in order to repeat, at the contacts 896, 60 ground impulses per minute over the signal-in conductor C804; whereby the signal-in relay R860 in the trunk circuit 800 follows. Each time the signal-in relay R860 operates and then restores, it completes and then interrupts, at the contacts 862, an obvious circuit for operating the hold relay R850; whereby the latter relay operates and is retained operated at this time since it is of the slow-to-release type. Upon operating, the hold relay R850 completes, at the contacts 853, an obvious multiple circuit for retaining illuminated the busy lamp L817 in order to indicate the busy condition of the trunk circuit 800 at this time. Also, each time the signal-in relay R860 operates and then restores, it interrupts and then recompletes, at the contacts 861, the previously traced circuit for energizing the lower winding of the sleeve relay R820 in multiple with the upper winding thereof and in series with the winding of the rear supervisory relay R755; whereby the rear supervisory relay R755 restores and then reoperates 60 times per minute repeating, at the contacts 756, corresponding impulses to the rear supervisory lamp L757. The flashing of the rear supervisory lamp L757, 60 times per minute indicates to the operator at the switchboard 765 in the main office 40 that the established connection to the called subscriber substation T51 in the distant office 50 may not be had at this time due to the busy condition thereof. The operator at the switchboard 765 then releases the apparatus by withdrawing the rear plug P758 from the jack J815 terminating the trunk circuit 800 in a manner more fully explained hereinafter.

Now assuming that the called subscriber substation T51 in the distant office 50 is idle when the subscriber line 1051 extending thereto is tested by the toll switch train 1038, the toll switch train 1038 retains the application of ground potential upon the E. C. conductor of the trunk 1037; whereby the upper winding of the answer relay R975 in the trunk circuit 900 is retained energized in order to cause the latter relay to remain in its restored position. Also, the toll switch train 1038 operates to project ringing current over the subscriber line 1051 extending to the called subscriber substation T51 and to return ring-back tone current over the trunk 1037 and consequently by way of the incoming selector 1036 over the line conductors C1031 and C1032 of the trunk 1030 and over the previously traced path including the windings 913 and 914 of the repeating coil RC910. The ring-back tone current traversing the windings 913 and 914 of the repeating coil RC910 induces a corresponding audible ring-back tone current in the windings 911 and 912 thereof which is conducted by way of the line conductors C901 and C902 to the carrier equipment 994. The balanced modulator in the carrier equipment 994 operates to modulate the 15.95 kc. carrier signal in accordance with the audio ring-back tone current and to transmit the modulated 15.95 kc. carrier signal over the line 80 to the carrier equipment 894; whereby the balanced demodulator in the carrier equipment 894 operates to demodulate the modulated 15.95 kc. carrier signal and to transmit the modulating component thereof over the line conductors C801 and C802; whereby the audio ring-back tone current traverses the windings 878' and 879' of the repeating coil RC875 inducing a corresponding ring-back tone current in the windings 876' and 877' thereof; which ring-back tone current is returned over the previously traced path to the headset 767 at the calling operator switchboard 765 in the main office 40, assuming that the rear talk key K735 is operated at this time, in order to indicate to the operator thereat that the called subscriber substation T51 in the distant office 50 is being rung.

When the subscriber at the called subscriber substation T51 in the distant office 50 answers the call, the toll switch train 1038 operates in order to interrupt the application of ground potential upon the E. C. conductor of the trunk 1037; whereby ground potential is removed from the control conductor C1034 of the trunk 1030 deenergizing the upper winding of the answer relay R975 to cause the latter relay to operate as previously explained. Also, the toll switch train 1038 operates to interrupt the return of ring-back tone current over the previously traced circuit to the operator switchboard 765 in the main office 40. Upon operating, the answer relay R975 in the trunk circuit 900 completes at the contacts 979 an obvious path for applying ground potential to the signal-out conductor C903, effecting operation of the signal-out relay R997 in the carrier equipment 994; whereby the 15.95 kc. carrier signal is transmitted over the line 80 effecting restoration of the signal-in relay R895 in the carrier equipment 894 and the consequent operation of the signal-in relay R860 in the trunk circuit 800; all in the manner previously explained. Upon operating, the signal-in relay R860 effects operation of the hold relay R850; and interrupts, at the contacts 861, the previously traced circuit for energizing the lower winding of the sleeve relay R820 in multiple with the upper winding thereof and in series with the winding of the rear supervisory relay R755; whereby the sleeve relay R820 in the trunk circuit 800 is retained in its operated position and the rear supervisory relay R755 in the cord circuit 766 restores. Upon restoring the rear supervisory relay R755 interrupts, at the contacts 756, the previously mentioned circuit for illuminating the rear supervisory lamp L757; thereby to indicate to the operator at the switchboard 765 in the main office 40 that the call has been answered at the called subscriber substation T51 in the distant office 50; whereby the operator at the switchboard 765 advises the subscriber at the called subscriber substation T51 that there is a call for him. The operator at the switchboard 765 then restores the talk rear key K735 interrupting the connection to the associated headset 767 and completing the previously mentioned connection between the front and rear plugs P748 and P758 in order to complete a connection between the incoming circuit to the main office 40 upon which the call has been previously answered and the subscriber at the called subscriber substation T51 in the distant office 50.

At this time, an audio signal originating on the incoming circuit traverses the cord circuit 766, the jack J815 and the windings 876' and 877' of the repeating coil RC875 inducing a corresponding signal in the windings 878' and 879' thereof, which signal is transmitted over the conductors C801 and C802 to the carrier equipment 894; whereby the balanced modulator in the carrier equipment 894 modulates the 24.55 kc. carrier signal in accordance therewith, causing the balanced demodulator in the carrier equipment 994 to demodulate the received modulated 24.55 kc. carrier signal and transmit the audio component thereof over the line conductors C901 and C902 through the windings 911 and 912 of the repeating coil RC910 causing a corresponding signal to be induced in the windings 913 and 914 thereof; which audio signal is transmitted over the previously traced connection, including the trunk 1030, the incoming selector 1036, the trunk 1037, the toll switch train 1038 and the subscriber line 1051 to the called subscriber substation T51 in the distant office 50.

Similarly, an audio signal originating at the called subscriber substaation T51 traverses the previously traced connection including the subscriber line 1051, the toll switch train 1038, the trunk 1037, the incoming selector 1036, the trunk 1030 and the windings 913 and 914 of the repeating coil RC910 inducing a corresponding signal in the windings 911 and 912 thereof that is transmitted by way off the line conductors C901 and C902 to the carrier equipment 994. The balanced modulator in the carrier equipment 994 responds modulating the 15.95 kc. carrier signal and transmitting the modulated 15.95 kc. carrier signal over the line 90 in order to cause the balanced demodulator in the carrier equipment 894 to respond and demodulate the received modulated 15.95 kc. carrier signal transmitting the audio component thereof over the line conductors C801 and C802 and the windings 878' and 879' of the repeating coil RC875; whereby a corresponding audio signal is induced in the windings 876' and 877' of the repeating coil RC875 and traverses the previously traced connection, including the jack J815 and the cord circuit 766 to the incoming circuit to the main office 40.

Reconsidering the operation of the toll switch train 1038, it is noted that it responds to several digits in order to bring about the selection of the subscriber line 1051 extending to the called subscriber substation T51 in the distant office 50; and of course, comprises a corresponding plurality of switching stages. Accordingly, any given switching stage of the toll switch train 1038 may find all of the next succeeding toll switching stages busy; whereby the last operated toll switching stage upon finding all of the next succeeding toll switching stages busy, operates to interrupt 120 times per minute the application of ground potential to the E. C. conductor of the trunk 1037 and consequently to the control conductor C1034 of the trunk 1030; whereby the answer relay R975 follows. When the answer relay R975 in the trunk circuit 900 follows the 120 impulses per minute, it repeats, at the contacts 979, to the carrier equipment 994, which repeats to the carrier equipment 894, which repeats to the signal-in relay R860 in the trunk circuit 800; all in the manner previously explained.

Thus, the signal-in relay R860 operating and restoring 120 times per minute effects corresponding restoration and reoperation of the rear supervisory relay R755 in the cord circuit 766; whereby the rear supervisory lamp L757 is flashed 120 times per minute. This flashing of the rear supervisory lamp L757, 120 times per minute, indicates to the operator at the calling switchboard 765 in the main office 40 that a toll switching stage in the toll switch train 1038 has encountered an all-trunks-busy condition and that the present connection may not be completed at this time in the distant office 50 due to the circumstances noted.

In view of the foregoing, it will be understood that the incoming selector 1036 is responsive to an all-trunk-busy condition of the group of trunks, including the trunk 1037, in an identical manner to interrupt 120 times per minute the application of ground potential therein to the control conductor C1034 of the trunk 1030 in order to bring about corresponding flashing of the rear supervisory lamp L757 at the calling operator switchboard 765 in the main office 40 at the conclusion of the first digit dialed thereat as a consequence of the all-trunks-busy condition noted.

Accordingly, it will be understood that at the conclusion of each digit dialed at the calling operator switchboard 765 in the main office 40, that the rear supervisory lamp L757 is steadily illuminated in the event the last operated toll switching stage in the distant office 50 found an idle outlet; whereas the rear supervisory lamp L757 is flashed 120 times per minute in the event the last operated toll switching stage encounters an all-trunks-busy condition as explained above. Finally, in the event the subscriber line extending to the called subscriber substation T51 is tested by the last toll switching stage in the toll switch train 1038 as busy, the last toll switching stage mentioned operates in an identical manner to effect flashing of the rear supervisory L757 at 60 times per minute as explained above. The flashing of the rear supervisory lamp at 120 times per minute indicates an all-trunks-busy condition, whereas the flashing of the rear supervisory lamp L757 at 60 times per minute indicates a busy condition of the called subscriber substation T51 in the distant office 50.

Further, in conjunction with the operation of each toll switching stage in the distant office 50, it is noted that some predetermined toll switching stage may be of the level-hunting type; whereby a considerable amount of time is consumed following the reception of a digit before the toll switching stage noted can determine whether all of the outlets available are busy. In this case the predetermined toll switching stage operates to interrupt the application of ground potential upon the E. C. conductor of the trunk 1037 during the level-hunting operation thereof; whereby ground potential is removed from the control conductor C1034 of the trunk 1030 effecting operation of the answer relay R975 in the trunk circuit 900. Subsequently, when the predetermined toll switching stage finishes the level-hunting operation thereof and finds an idle outlet, it operates to re-apply ground potential to the E. C. conductor of the trunk 1037 and consequently to the control conductor C1034 of the trunk 1030 in order to effect restoration of the answer relay R975. Accordingly, during the level-hunting operation of the predetermined toll switching stage in the toll switch train 1038, the answer relay R975 in the trunk circuit 900 is operated effecting operation of the signal-out relay R997 in the carrier equipment 994 and corresponding restoration of the signal-in relay R895 in the carrier equipment 894 and corresponding operation of the signal-in relay R860 in the trunk circuit 800; whereby the operated signal-in relay R860 effects restoration of the rear supervisory relay R755 in the cord circuit 766; all in the manner previously explained. Accordingly, the rear supervisory relay R755 in the cord circuit 766 remains restored during the level-hunting operation of the predetermined toll switching stage in the toll switch train 1038 in the distant office 50 causing the rear supervisory lamp L757 to remain unlighted following the dialing of the last digit by the operator at the calling switchboard 765 in the main office 40. The unlighted condition of the rear supervisory lamp L757 following the last digit dialed by the operator at the calling switchboard 765 indicates to the operator thereat that a predetermined toll switching stage in the toll switch train 1038 in the distant office 50 is undergoing a level-hunting operation at this time and warns her not to dial the next digit until this operation is completed by the predetermined toll switching stage mentioned as evidenced by the relighting of the rear supervisory lamp L757. When the rear supervisory lamp L757 is relighted, the operator at the calling switchboard 765 in the main office 40 proceeds to dial the next digit of the directory number of the called subscriber substation T51 in the distant office 50.

In view of the foregoing, it will be appreciated that the operator at the calling switchboard 765 in the main office 40 awaits reillumination of the rear supervisory lamp L757 following the dialing of each digit of the directory number of the called subscriber substation T51 and before dialing the next digit of the directory number mentioned.

Finally it is noted that during the established connection between the incoming circuit to the main office 40 and the called subscriber substation T51 in the distant office 50 that the subscriber at the called subscriber substation T51 has full switchhook supervision and may attract the attention of the operator at the switchboard 765 in the main office 40 by operating intermittently the associated switchhook: whereby the toll switch train 1038 is controlled in a corresponding manner to re-apply ground potential to the E. C. conductor of the trunk 1037 and then to interrupt the application of ground potential to the E. C. conductor mentioned. Accordingly, ground potential is applied to and then removed from the control conductor C1034 of the trunk 1030 causing corresponding restoration and then reoperation of the answer relay R975 in the trunk circuit 900; whereby the signal-out relay R997 is restored and then reoperated accordingly in order to effect reoperation and subsequent restoration accordingly of the signal-in relay R895 in the carrier equipment 894; whereby the signal-in relay R860 in the trunk circuit 800 is restored and then reoperated accordingly effecting operation and subsequent restoration accordingly of the rear supervisory relay R755 in the cord circuit 766; whereby the rear supervisory lamp L757 is flashed accordingly. Thus the switchhook operations at the called subscriber substation T51 in the distant office 50 effect corresponding flashing of the rear supervisory lamp L757 at the calling operator switchboard 765 in the main office 40 in order to indicate the required supervision by the subscriber at the called subscriber substation T51. The operator at the switchboard 765 may re-enter the connection by operating the talk rear key K735; whereby the headset 767 is again connected to the rear plug P758 of the cord circuit 766. At this time, the subscriber at the called subscriber substation T51 in the distant office 50 advises the operator at the calling switchboard 765 in the main office 40 concerning his requirements.

At the conclusion of the established connection when the subscriber at the called subscriber substation T51 in the distant office 50 disconnects, the toll switch train 1038 operates to re-apply ground potential to the E. C. conductor of the trunk 1037; whereby ground potential is re-applied to the control conductor C1034 of the trunk 1030 in order to effect restoration of the answer relay R975 in the trunk circuit 900. Upon restoring, the answer relay R975 effects restoration of the signal-out relay R997 in the carrier equipment 994 and the consequent reoperation of the signal-in relay R895 in the carrier equipment 894; whereby the signal-in relay R860 in the trunk circuit 800 is restored effecting reoperation of the rear supervisory relay R755 in the cord circuit 766 and the consequent illumination of the rear supervisory lamp L757 in order to indicate to the operator at the switchboard 765 in the main office 40 that the subscriber at the called subscriber substation T51 in the distant office 50 has disconnected.

At this time upon receiving disconnect supervision, the operator at the switchboard 765 in the main office 40 releases the connection to the called subscriber substation T51 in the distant office 50 by withdrawing the rear plug P758 from the jack J815 terminating the trunk circuit 800, thereby interrupting the circuits for maintaining operated the sleeve relay R820 and the jack relay R835 in the trunk circuit 800; whereby the latter relay restores shortly thereafter, it being of the slow-to-release type. Upon restoring the sleeve relay R820 interrupts, at the contacts 821, the previously traced circuit for maintaining operated the signal-out relay R830; and recompletes, at the contacts 826, the termination circuit, including the condenser 834 and the resistor 833, across the windings 876' and 877' of the repeating coil RC875. Upon restoring the jack relay R835 interrupts, at the contacts 836, the previously traced circuit for maintaining operated the re-ring relay R870 in order to cause the latter relay to restore shortly thereafter as it is of the slow-to-release type. Upon restoring, the signal-out relay R830 interrupts, at the contacts 831, the previously mentioned path for applying ground potential to the signal-out conductor C803 in order to effect restoration of the signal-out relay R897 in the carrier equipment 894 and the consequent reoperation of the signal-in relay R995 in the carrier equipment 994; whereby the signal-in relay R920 in the trunk circuit 900 restores.

Upon restoring the signal-in relay R920 interrupts, at the contacts 923, the previously traced circuit for maintaining operated the hold relay R930 in order to cause the latter relay to restore shortly thereafter, it being of the slow-to-release type. Upon restoring the hold relay R930 interrupts, at the contacts 935, the previously mentioned path for applying ground potential to the control conductor C1043 of the trunk 1040; and recompletes, at the contacts 936, the previously traced path for applying battery potential by way of the winding of the seize relay R955 to the control conductor C1043; thereby to mark the trunk 1040 as idle to the selectors of the finder-selector links 1062, etc., disposed at the various toll operator positions at the Strowger dial toll board 1060 having access thereto. Further, the hold relay R930 interrupts, at the contacts 933 and 934, points in the previously traced circuits for respectively energizing the upper and lower windings of the answer relay R975; whereby the latter relay remains in its restored position. Finally, the hold relay R930 interrupts, at the contacts 934, the previously mentioned path for applying ground potential to the control conductor C1035 of the trunk 1030, thereby to effect the release of the toll switch train 1038 and the incoming selector 1036; whereby the line circuit 1052 associated with the subscriber line 1051 extending to the subscriber substation T51 operates to mark the subscriber line 1051 as idle to the toll switch train 1038 and to the local switch train 1054 having access thereto.

At this time the established connection between the calling operator switchboard 765 in the main office 40 and the called subscriber substation T51 in the distant office 50 is released, and all of the apparatus involved therein is completely released and available for further use.

*Local calls in the distant office 50*

First assume that a call initiated at a subscriber substation, such, for example, as the subscriber substation T51 in the distant office 50 is to be extended to another subscriber substation therein. When the call is initiated at the calling subscriber substation T51, the line circuit 1052 associated with the subscriber line 1051 operates to mark the subscriber line 1051 as busy to the local switch train 1054 and to the toll switch train 1038 having access thereto and to initiate operation of the distributor 1053. The distributor 1053 assigns an idle portion of the local switch train 1054; whereby the finder thereof operates to seize the subscriber line 1051. The subscriber at the calling subscriber substation T51 then dials the directory number of the called subscriber substation; whereby the various selectors and then the connector in the local switch train 1054 operate; the connector mentioned operating to select the subscriber line extending to the called subscriber substation. At this time the idle or busy condition of the called subscriber substation is tested by the connector mentioned; and the subsequent completion and ultimate release of the established connection between the calling subscriber substation T51 and the called subscriber substation in the distant office 50 are in accordance with conventional practice.

*A call from a subscriber substation to the Strowger dial toll board in the distant office 50*

First assume that a call initiated at a subscriber substation, such, for example, as the subscriber substation T51 in the distant office 50 is to be extended to the Strowger dial toll board 1060 therein. Now assuming that the local switch train 1054 has operated to seize the subscriber line 1051 extending to the calling subscriber substation T51; the subscriber at the calling subscriber substation T51 dials the single digit assigned as the directory number of the Strowger dial toll board 1060 in the distant office 50; which single digit may be 0. The local switch train 1054 responds to the single digit 0 in order to select the group of trunks, including the trunk 1055, and then to select an idle trunk in the group mentioned. For example, the local switch train 1054 may select the particular trunk 1055 extending to the C. L. R. trunk 1056; whereby the C. L. R. trunk 1056 operates to initiate a call on the outgoing trunk 1057 extending therefrom and to initiate operation of the distributing apparatus incorporated in the Strowger dial toll board 1060; whereby the call is allotted to be answered at an idle one of the toll operator positions thereat, such, for example, as the toll operator 1061; and operation of an idle one of the finder-selector links individually associated with the toll operator position 1061, such, for example, as the finder-selector link 1061 is initiated. More particularly, the finder of the finder-selector link 1061 operates to find the outgoing trunk 1057 extending from the C. L. R. trunk 1056; which finder-selector link 1062 is connected to the toll operator position 1061 at this time; whereby there is completed a connection from the calling subscriber substation T51 to the toll operator position 1061 at the called Strowger dial toll board 1060 in the distant office 50. The subscriber at the calling subscriber substation T51 in the distant office 50 advises the operator at the toll position 1061 at the Strowger dial toll board 1060 thereat concerning the extension of the call; whereby the operator at the toll position 1061 extends the call utilizing the selector of the finder-selector link 1062 in use at this time, the control being exercised by the key-set governing the register-sender associated with the toll operator position 1061 at the Strowger dial toll board 1060 in accordance with conventional practice.

At the conclusion of the established connection, when the subscriber at the calling subscriber substation T51 in the distant office 50 disconnects, the C. L. R. trunk 1056 is operated to apply ground potential to the E. C. conductor of the trunk 1057 extending therefrom in order to illuminate the rear supervisory lamp at the toll operator position 1061 associated with the rear or finder of the finder-selector link 1062 in order to indicate to the operator at the toll position 1061 at the Strowger dial toll board 1060 that the subscriber at the calling subscriber substation T51 included in the connections extended by way of the rear or finder of the finder-selector link 1062 has disconnected. The operator at the toll position 1061 at the Strowger dial toll board 1060 then operates the link release key associated with the finder-selector link 1062 in order to effect the release thereof; whereby the trunk 1057 extending from the C. L. R. trunk 1056 is released, bringing about the release of the C. L. R. trunk 1056 and consequently the local switch train 1054. The line circuit 1052 then operates in order to mark the subscriber line 1051 extending to the subsccriber substation T51 as idle to the local switch train 1054 and to the toll switch train 1038.

*A call from the Strowger dial toll board to a subscriber substation in the distant office 50*

First assume that the operator at one of the toll positions, such, for example, as the toll operator position 1061 at the Strowger dial toll board 1060 in the distant office 50 has answered a call utilizing the finder of an idle one of the finder-selector links individually associated therewith, such, for example, as the finder-selector link 1062 that requires completion to a called subscriber substation, such, for example, as the subscriber substation T51 therein. The operator at the toll position 1061 at the Strowger dial toll board 1060 then operates the associated key-set; whereby the register-sender in use operates to transmit a corresponding plurality of digits. The first digit transmitted from the register-sender mentioned effects operation of the selector of the finder-selector link 1062 to select the group of trunks, including the trunk 1037, extending to the toll switch train 1038 and then to select an idle trunk in the group mentioned. For example, the selector of the finder-selector link 1062 may select the particular trunk 1037 extending to the toll switch train 1038. The remainder of the digits transmitted from the register-sender mentioned are transmitted over the selector of the finder-selector link 1062 and the trunk 1037 to the toll switch train 1038 in order to bring about operation thereof to select the subscriber line 1051 extending to the called subscriber substation T51. At this time, the register-sender in use is released and the toll switch train 1038 operates to test the idle or busy condition of the called subscriber substation T51; and, assuming that the called subscriber substation T51 is idle, ringing current is projected from the toll switch train 1038 over the subscriber line 1051 extending thereto. Also, the front supervisory lamp at the toll operator position 1061 associated with the front or selector of the finder-selector link 1062 is illuminated indicating that the call has not yet been answered at the called subscriber substation T51. When the subscriber at the called subscriber substation T51 answers the call, a connection is completed between the headset at the calling toll operator position 1061 at the Strowger dial toll board 1060 and the called subscriber substation T51 and the front supervisory lamp mentioned is extinguished in order to indicate to the operator at the toll position 1061 at the Strowger dial toll board 1060 that the call routed by way of the front or selector of the finder-selector link 1062 to the called subscriber substation T51 has been answered thereat. The operator at the toll position 1061 at the Strowger dial toll board 1060 then advises the subscriber at the called subscriber substation T51 that there is a call for him; whereupon the operator at the toll position 1061 retires from the connection disconnecting from the finder-selector link 1062 therefrom; whereby there is completed a connection between the original calling connection that had been previously answered at the toll operator position 1061 utilizing the finder of the finder-selector link 1062 and the called subscriber substation T51 in the distant office 50.

At the conclusion of the established connection, when the subscriber at the called subscriber substation T51 in the distant office 50 disconnects, the front supervisory lamp at the toll operator position 1061 associated with the front or selector of the finder-selector link 1062 is again illuminated in order to render disconnect supervision to the toll operator position 1061 at the Strowger dial toll board 1060; whereupon the operator at the toll position 1061 operates the link release key associated with the finder-selector link 1062 in order to effect the release thereof and the consequent release of the toll switch train 1038. When the toll switch train 1038 is thus released, the line circuit 1052 again operates to mark the subscriber line 1051 extending to the subscriber substation T51 as idle to the local switch train 1054 and to the toll switch train 1038 having access thereto.

*A call from the Strowger dial toll board in the distant office 50 to a subscriber substation in the main office 40*

First assume that the operator at a toll position, such, for example, as the toll position 1061 at the Strowger dial toll board 1060 in the distant office 50 has answered a call utilizing the finder of a finder-selector link individually associated therewith, such, for example, as the finder-selector link 1062 that requires completion to a called subscriber substation, such, for example, as the subscriber substation T41 in the main office 40. The operator at the toll position 1061 operates the associated key-set; whereby the register-sender in use operates to transmit a corresponding plurality of digits. The first digit transmitted from the register-sender mentioned effects operation of the selector of the finder-selector link 1062; to select the group of trunks, including the trunk 1040, and then an idle trunk in the group mentioned. For example, the selector of the finder-selector link 1062 may select the particular trunk 1040 extending to the trunk circuit 900, the trunk 1040 being marked as idle by the presence of battery potential upon the control conductor C1043 thereof by way of a normally completed path, including the contacts 936 and 951' and the winding of the seize relay R955 in the trunk circuit 900. When the selector of the finder-selector link 1062 seizes the trunk 1040 at this time, ground potential in the finder-selector link is applied to the control conductor C1043 of the trunk 1040, completing a circuit substantially identical to that previously traced for operating the seize relay R955 in the trunk circuit 900. Upon operating, the seize relay R955 completes, at the contacts 956, an obvious circuit for operating the switch relay R960 and a multiple circuit, also including the contacts 971, for operating the re-ring relay R1025. Upon operating, the switch relay R960 interrupts, at the contacts 961, the previously traced original termination circuit, including the condenser 917 and the resistor 918, across the line conductors C901 and C902 extending to the carrier equipment 994; and completes, at the contacts 962, an alternative termination circuit including the contacts 981 and 951, the condenser 917 and the resistor 918, across the line conductors C901 and C902 mentioned. Also the switch relay R960 interrupts, at the contacts 963 and 968, the normal connection between the line conductors C1031 and C1032 of the trunk 1030 extending to the incoming selector 1036 and the windings 913 and 914 of the repeating coil RC910; and completes, at the contacts 964, 966, 967 and 969, a loop circuit extending between the line relay R1010 in the trunk circuit 900 and the sender of the register-sender mentioned connected to the finder-selector link 1062 at this time. The loop circuit mentioned extends from ground by way of the upper winding of the line relay R1010, the contacts 984 and 967, the winding 914 of the repeating coil RC9610 and the contacts 969 to the line conductor C1042; and from battery by way of the lower winding of the line relay R1010, the contacts 982 and 966, the winding 913 of the repeating coil RC910 and the contacts 964 to the line conductor C1041; the line conductors C1041 and C1042 of the trunk 1040 being connected by way of the selector of the finder-selector link 1062 to the sender of the register-sender mentioned at this time. Accordingly, the upper and lower windings of the line relay R1010 are energized at this time over the above traced loop circuit extending to the sender of the register-sender mentioned at this time in order to cause the latter relay to operate. Further, the switch relay R960 completes, at the contacts 961', a circuit, including the contacts 922, 931, 944 and 986 for energizing the upper winding of the answer relay R975; and completes, at the contacts 964' a circuit, including the contacts 987, for energizing the lower winding of the answer relay R975. When both the upper and lower windings of the answer relay R975 are thus energized, the latter relay does not operate as it is of the differential type.

Upon operating, the line relay R1010 completes, at the contacts 1012, a path, including the contacts 984', for applying ground potential to the signal-out conductor C903, thereby to effect operation of the signal-out relay R997 in the carrier equipment 994. Upon operating, the signal-out relay R997 closes the contacts 998 included in the plate circuit of the associated transmitting amplifier; whereby the 15.95 kc. carrier signal is transmitted over the line 80 in the order to bring about the restoration of the signal-in relay R895 in the carrier equipment 894; whereby the latter relay completes, at the contacts 896, the previously mentioned path for applying ground potential to the signal-in conductor C804 in order to effect operation of the signal-in relay R860 in the trunk circuit 800. Upon operating the signal-in relay R860 completes, at the contacts 862, an obvious circuit for operating the hold relay R850; whereby the latter relay completes, at the contacts 853, an obvious circuit for illuminating the busy lamp L817 in order to indicate the busy condition of the trunk circuit 800 to the operator at the switchboard 765 in the main office 40. Also, the hold relay R859 completes, at the contacts 851, an obvious circuit for energizing the right-hand winding of the answer relay R890; and completes, at the contacts 852, a circuit, including the contacts 838, for operating the switch relay R880. Upon operating, the switch relay R880 interrupts, at the contacts 883 and 885, the normal connection between the winding of the re-ring relay R865 and the windings 876' and 877' of the repeating coil RC875; and completes, at the contacts 881, 884, 886 and 887, a loop circuit between the left-hand winding of the answer relay R890 and the line conductors C886 and C887 of the trunk 875 extending to the incoming selector 812. More particularly, the line conductor C876 of the trunk 875 is connected by way of the contacts 881, the winding 876' of the repeating coil RC875, the contacts 884, the left-hand winding of the answer relay R890, the contacts 886, the winding 877' of the repeating coil RC875 and the contacts 883 and 887 to the line conductor C877 of the trunk 875; whereby the left-hand winding of the answer relay R890 is energized over the above traced circuit, but is not poled to operate. Finally, the switch relay R880 completes, at the contacts 888, an obvious path for applying ground potential to the control conductor C878 of the trunk 875 in order to effect seizure of the incoming selector 812; whereby the incoming selector 812 is rendered responsive to the first digit transmitted over the trunk 875.

When the sender of the register-sender in use transmits the next digit over the selector of the finder-selector link 1062 and the trunk 1040, the line relay R1010 in the trunk circuit 900 follows. Each time the line relay R1010 restores and then reoperates, it completes and then interrupts, at the contacts 1011, a circuit, including the contacts 982' and 962' for operating the dial relay R980; whereby the latter relay operates and remains operated during impulsing as it is of the slow-to-release type. Upon operating, the dial relay R940 interrupts, at the contacts 941, the normally completed connection, including the condenser 915 between the adjacent terminals of the windings 913 and 914 of the repeating coil RC910; and completes, at the contacts 942, the previously traced path, including the resistor 919, across the winding 913 of the repeating coil RC910, thereby to reduce the impedance of the loop circuit extending between the line relay R1010 in the trunk circuit 900 and the sender of the register-sender in use at this time. Also the dial relay R940 completes, at the contacts 943, an alternative circuit, including the contacts 961' and 986, for energizing the upper winding of the answer relay R975; and interrupts, at the contacts 944, the previously traced original circuit for energizing the upper winding of the answer relay R975. Also, each time the line relay R1010 restores and then reoperates, it interrupts and then recompletes, at the contacts 1012, the previously traced path for applying ground potential to the signal-out conductor C903; whereby the signal-out relay R997 in the carrier equipment 994 follows the impulses of the present digit repeating at the contacts 998, in order to cause the signal-in relay R895 in the carrier equipment 894 to follow. Each time the signal-in relay R895 operates and then restores, it interrupts and then recompletes, at the contacts 896, the previously mentioned path for applying ground potential to the signal-in conductor C804 in order to cause the signal-in relay R860 in the trunk circuit 800 to follow. Each time the signal-in relay R860 restores and then reoperates, it completes and then interrupts, at the contacts 861, a circuit including the contacts 882, for operating the dial relay R855; whereby the latter relay operates and remains operated during impulsing as it is of the slow-to-release type. Upon operating the dial relay R855 completes, at the contacts 856, a path, including the contacts 884, the resistor 832 and the contacts 881, for short-circuiting the winding 876' of the repeating coil RC875, thereby to improve impulsing over the line conductors C876 and C877 of the trunk 875 extending to the incoming selector 812. Finally, each time the signal-in relay R860 restores and then reoperates, it interrupts and then recompletes, at the contacts 863, the previously traced bridge circuit extending between the left-hand winding of the answer relay R890 and the incoming selector 812 by way of the line conductors C876 and C877 of the trunk 875; whereby the signal-in relay R860 repeats, at the contacts 863, the impulses of the present digit over the trunk 875 to the incoming selector 812. The incoming selector 812 is operated in accordance with the present digit to select the group of trunks, including the trunk 806, and then to select an idle trunk in the group mentioned. For example, the incoming selector 812 may select the particular trunk 806 extending to the toll switch train 805; whereby the toll switch train 805 is conditioned to respond to the remainder of the digits transmitted over the trunk 875.

At the conclusion of the present digit, the line relay R1010 in the trunk circuit 900 is retained in its operated position in order to retain interrupted, at the contacts 1011, the previously traced circuit for maintaining operated the dial relay R940; whereby the latter relay restores shortly thereafter, it being of the slow-to-release type. Upon restoring the line relay R940 interrupts, at the contacts 942, the previously traced path, including the resistor 919, for short-circuiting the winding 913 of the repeating coil RC910; and recompletes, at the contacts 941, the previously mentioned normal connection, including the condenser 915, between the adjacent terminals of the windings 913 and 914 of the repeating coil RC910. Also, the dial relay R940 recompletes, at the contacts 944, the previously traced original circuit for energizing the upper winding of the answer relay R915; and interrupts, at the contacts 943, the previously traced alternative circuit for energizing the upper winding of the answer relay R975. Also, at the conclusion of the present digit the signal-in relay R860 in the trunk circuit 800 remains in its operated position retaining interrupted, at the contacts 861, the previously traced circuit for maintaining operated the dial relay R855, the latter relay restores shortly thereafter, it being of the slow-to-release type. Upon restoring, the dial relay R855 interrupts, at the contacts 856, the previously traced path, including the resistor 832, for short-circuiting the winding 876' of the repeating coil RC875.

In view of the foregoing, it will be understood that the remainder of the digits registered in the register-sender in use are transmitted thereby over the selector of the finder-selector link 1062 and the trunk 1040 to the line relay R1010 in the trunk circuit 900 in an identical manner. The digits mentioned are repeated by the line relay R1010 to the signal-out relay R997 in the carrier equipment 994 and consequently to the signal-in relay R895 in the carrier equipment 894; whereby the digits mentioned are repeated to the signal-in relay R860 in the trunk circuit 800; and the signal-in relay R860 repeats the digits mentioned, at the contacts 863, over the trunk 875, the incoming selector 812 and the trunk 806 to the toll switch train 805; all in a manner identical to that previously explained. Accordingly, the toll switch train 806 responds to the digits mentioned operating to select the subscriber line 841 extending to the called subscriber substation T41 in the main office 40; whereby the toll switch train 806 tests the idle or busy condition of the subscriber substation T41 at this time in accordance with conventional practice.

After the register-sender in use operates to transmit the last digit registered therein over the trunk 1040 to the line relay R1010 in the trunk circuit 900 in the manner described above, the register-sender mentioned operates to apply through the selector of the finder-selector link 1062, battery potential upon the control conductor C1042 of the trunk 1040, thereby to complete a circuit, including the contacts 981' and 978, for energizing the lower winding of the end-of-dial relay R980 in order to cause the latter relay to operate. Upon operating, the end-of-dial relay R980 completes, at the contacts 988, a holding circuit, including the contacts 964', for energizing the upper winding thereof; and interrupts, at the contacts 986 and 987, the previously traced circuits for respectively energizing the upper and lower windings of the answer relay R975, thereby positively to prevent operation of the latter relay which occupies its restored position at this time since it is of the differential type. Also, the end-of-dial relay R980 interrupts, at the contacts 981', the previously traced original path for applying ground potential by way of the lower winding thereof and the contacts 978 and 981' to the control conductor C1042 of the trunk 1940 and consequently the above traced original circuit for energizing the lower winding thereof. Further, the end-of-dial relay R980 completes, at the contacts 989, a direct path, including the contacts 961', 944, 931 and 922, for applying ground potential to the control conductor C1042 of the trunk 1040. Also, at this time, the register-sender in use is automatically released; whereby the application of ground potential upon the control conductor C1042 of the trunk 1040 effects illumination of the front supervisory lamp at the toll operator position 1061 associated with the front or selector of the finder-selector link 1062 in order to indicate to the operator thereat that the present call routed by way of the front or selector of the finder-selector link 1062 to the called subscriber substation T41 in the main office 40 has not been answered at this time.

Also, the end-of-dial relay R980 completes, at the contacts 983' an alternative path, including the contacts 972 and 1026, for applying ground potential to the signal-out conductor C903; and interrupts, at the contacts 984', the previously traced original path for applying ground potential to the signal-out conductor C903; whereby the signal-out relay R997 in the carrier equipment 994 is retained in its operated position. Further, the end-of-dial relay R980 interrupts, at the contacts 981, the previously traced alternative termination circuit, including the condenser 917 and the resistor 918, across the line conductors C901 and C902 extending to the carrier equipment 994. Further, the end-of-dial relay R980 interrupts, at the contacts 982 and 984, the previously traced loop circuit extending to the upper and lower windings of the line relay R1010; and completes, at the contacts 983 and 984, paths for connecting ground potential by way of the windings of the trouble relay R1020 and the re-ring relay R970 respectively to the line conductors C1041 and C1042 of the trunk 1040. More particularly, ground potential is connected by way of the winding of the trouble relay R1020, the contacts 983 and 966, the winding 913 of the repeating coil RC910 and the contacts 964 to the line conductor C1041 of the trunk 1040; while ground potential is connected by way of the winding of the re-ring relay R970, the contacts 1022, 985 and 967, the winding 914 of the repeating coil RC910 and the contacts 969 to the line conductor C1042 of the trunk 1040.

At this time the toll switch train 805 operates to test the idle or busy condition of the subscriber line 841 extending to the called subscriber substation T41 in the main office 40 as previously noted; and assuming that the subscriber line 841 is idle at this time, the toll switch train 805 operates to project ringing current thereover and to return ring-back tone current over the trunk 806 and the incoming selector 812 to the trunk 875; whereby the ring-back tone current traverses the previously traced connection including the windings 876' and 877' of the repeating coil RC875 inducing a corresponding ring-back tone current in the windings 878' and 879' thereof which traverses the line conductors C801 and C802 to the carrier equipment 894. The balanced modulator in the carrier equipment 894 responds modulating the 24.55 kc. carrier signal transmitting the audio component thereof over the line conductors C901 and C902 and the windings 911 and 912 of the repeating coil RC910; whereby a corresponding audio ring-back tone current is induced in the windings 913 and 914 thereof and projected over the previously traced circuit, including the trunk 1040 and the finder-selector link 1062, to the calling toll operator position 1061 at the Strowger dial toll board 1060 in the distant office 50; thereby to indicate to the operator thereat that the called subscriber substation T41 in the main office 40 is being rung. When the subscriber at the called subscriber substation T41 answers the call, the toll switch train 805 operates to interrupt the return of ring-back tone current over the previously traced connection to the calling toll operator position 1061 and also to reverse the polarity of the trunk 806 and over the incoming selector 812 and the trunk 875; whereby the left-hand winding of the answer relay R890 in the trunk circuit 800 is poled to operate. Upon operating, the answer relay R890 completes, at the contacts 891, an obvious path for applying ground potential to the signal-out conductor C803, thereby to effect operation of the signal-out relay R897 in the carrier equipment 894 and the consequent restoration of the signal-in relay R995 in the carrier equipment 994; whereby the latter relay completes, at the contacts 996, an obvious path for applying ground potential to the signal-in conductor C904 in order to bring about operation of the signal-in relay R920 in the trunk circuit 900. Upon operating, the signal-in relay R920 interrupts, at the contacts 922, the previously traced direct path for applying ground potential to the control conductor C1042 of the trunk 1040; thereby to extinguish the front supervisory lamp in the toll operator position 1061 associated with the finder-selector link 1062 in order to indicate to the operator thereat that the call extended by way of the front or selector of the finder-selector link 1062 to the called subscriber substation T41 in the main office 40 has been answered at this time. The operator at the calling toll position 1061 at the Strowger dial toll board 1060 in the distant office 50 converses with the subscriber at the called subscriber substation T41 in the main office 40 advising him that there is a call for him. The transmission over the carrier link of audio signals between the calling toll operator position 1061 and the called subscriber substation T41 is substantially identical to that previously described; the 24.55 kc. carrier signal modulated by the audio signal being transmitted from the carrier equipment 894 to the carrier equipment 994 and the 15.95 kc. carrier signal modulated by the audio signal being transmitted from the carrier equipment 994 to the carrier equipment 894. At this time, the operator at the toll operator position 1061 may disconnect from the finder-selector link 1062 completing a connection between the called subscriber substation T41 in the main office 40 and the original calling connection that had been previously answered at the toll operator position 1061 utilizing the finder of the finder-selector link 1062.

At the conclusion of the established connection, when the subscriber at the called subscriber substation T41 in the main office 40 disconnects, the toll switch train 805 again operates to reverse the polarity of the trunk 806 in order to bring about restoration of the answer relay R890 in the trunk circuit 800 and the consequent restoration of the signal-out relay R897 in the carrier equipment 894; whereby the signal-in relay R995 in the carrier equipment 994 is reoperated effecting the restoration of the signal-in relay R920 in the trunk circuit 900. Upon restoring, the signal-in relay R920 completes, at the contacts 922, the previously traced direct path for applying ground potential to the control conductor C1042 of the trunk 1040, thereby to illuminate the front supervisory lamp at the toll operator position 1061 associated with the front or selector of the finder selector link 1062; thereby indicating to the operator at the toll position 1061 at the Strowger dial toll board 1060 in the distant office 50 that the subscriber at the called subscriber substation T41 in the main office 40 has disconnected.

In view of the above description of the transmission of disconnect supervision from the called subscriber substation T41 in the main office 40 to the toll operator position 1061 at the Strowger dial toll board 1060 in the distant office 50, it will be understood that the subscriber at the called subscriber substation T41 may transmit switchhook supervision to the toll operator position 1060 in a substantially identical manner by appropriately operating the associated switchhook thereat; whereby the toll switch train 805 follows effecting alternate reversals of the polarity of the trunk 806 causing the answer relay R890 in the trunk circuit 800 to follow bringing about following by the signal-in relay R920 in the trunk circuit 900; all in the manner previously explained. Each time the signal-in relay R920 restores and then reoperates, it completes and then interrupts, at the contacts 922, the previously traced path for applying ground potential to the control conductor C1042 of the trunk 1040 in order to bring about corresponding flashing of the front supervisory lamp at the toll operator position 1061 associated with the front or selector of the finder-selector link 1062. This flashing of the front supervisory lamp mentioned at the toll operator positon 1061 indicates to the operator thereat that the subscriber at the called subscriber substation T41 in the main office 40 requires her attention. Accordingly, she again operates the link key associated with the finder-selector link 1062 completing a connection between the finder-selector link 1062 and the toll operator position 1061. At this time the operator at the toll position 1061 at the Strowger dial toll board 1060 in the distant office 50 may again converse with the subscriber at the called subscriber substation T41 in the main office 40.

Upon receiving disconnect supervision, the operator at the toll position 1061 may release the finder-selector link 1062 either when it is connected to or disconnected from the toll operator position 1061 by operating the appropriate link release key; whereby the finder-selector link 1062 is released causing ground potential to be removed from the control conductor C1043 of the trunk 1040 in order to interrupt the previously traced circuit for maintaining operated the seize relay R955 in the trunk circuit 900; whereupon the latter relay restores shortly thereafter, it being of the slow-to-release type. Upon restoring, the seize relay R955 interrupts, at the contacts 956, the previously traced multiple circuits for maintaining operated the switch relay R960 and the re-ring relay R1025; whereby the switch relay R960 restores immediately and the re-ring relay R1025 restores shortly thereafter, it being of the slow-to-release type. Upon restoring, the switch relay R960 interrupts, at the contacts 964', the previously traced holding circuit for energizing the upper winding of the end-of-dial relay R980 in order to cause the latter relay to restore. Upon restoring, the end-of-dial relay R980 interrupts, at the contacts 983' the previously traced alternative path for applying ground potential to the signal-out conductor C903 in order to bring about the restoration of the signal-out relay R997 in the carrier equipment 994 and the consequent reoperation of the signal-in relay in the carrier equipment 894; whereby the signal-in relay R860 in the trunk circuit 800 is restored. At this time battery potential is applied by way of the winding of the seize relay R955 in the trunk circuit 900 to the control conductor C1043 of the trunk 1040, thereby to mark the trunk 1040 and consequently the trunk circuit 900 as idle to the selectors of the finder-selector links 1062, etc., having access thereto.

Upon restoring, the signal-in relay R860 in the trunk circuit 800 interrupts, at the contacts 862, the previously mentioned circuit for maintaining operated the hold relay R850; whereby the latter relay restores shortly thereafter, it being of the slow-to-release type. Also, the signal-in relay R860 interrupts, at the contacts 863, the loop circuit extending between the left-hand winding of the answer relay R890 in the trunk circuit 800 and the toll switch train 805. Upon restoring, the hold relay R850 interrupts, at the contacts 851, the previously mentioned circuit for energizing the right-hand winding of the answer relay R890; and interrupts, at the contacts 852, the previously traced circuit for maintaining operated the switch relay R880. Also the hold relay R850 interrupts, at the contacts 853, the previously mentioned circuit for illuminating the busy lamp L817, thereby to indicate to the operator at the switchboard 765 in the main office 40 that the trunk circuit 800 terminated by the jack J815 is idle at this time. Upon restoring, the switch relay R880 interrupts, at the contacts 888, the previously mentioned path for applying ground potential to the control conductor C878 of the trunk 875, thereby to bring about the release of the toll switch train 805 and the incoming selector 812. When the toll switch train 805 is thus released, the line circuit 842 associated with the subscriber line 841 extending to the subscriber substation T41 in the main office 40 operates to mark the subscriber line 841 as idle to the toll switch train 805 and to the local switch train 844 having access thereto.

At this time the established connection between the calling toll operator position 1061 at the Strowger dial toll board 1060 in the distant office 50 and the called subscriber substation T41 in the main office 40 is released and all of the apparatus involved therein is completely released and available for further use.

In the foregoing description of the extension of a call from the calling toll operator position 1061 at the Strowger dial toll board 1060 in the distant office 50 to the called subscriber substation T41 in the main office 40, it was assumed that when the toll switch train 805 selected the subscriber line 841 extending to the called subscriber substation T41, that the called subscriber substation T41 was tested as being idle. However, it may occur that the called subscriber substation T41 is busy at this time; whereupon the toll switch train 805 upon testing the called subscriber substation T41 as busy, operates both to reverse the polarity of the trunk 806 and to return busy tone current thereover; whereby the answer relay R890 in the trunk circuit 800 operates effecting operation of the signal-out relay R897 in the carrier equipment 894 and the consequent restoration of the signal-in relay R995 in the carrier equipment 994; whereby the signal-in relay R920 in the trunk circuit 900 is restored; all in the manner previously explained. Upon restoring, the signal-in relay R920 completes, at the contacts 922, the previously traced direct path for applying ground potential to the control conductor C1042 of the trunk 1040, thereby to extinguish the front supervisory lamp at the toll operator position 1061 associated with the front or selector of the finder-selector link 1062; whereby the operator at the toll position 1061 receives answer supervision. However, at this time, the busy tone current from the toll switch train 805 in the main office 40 is returned over the previously traced connection to the toll operator position 1061 at the Strowger dial toll board 1060 in the distant office 50 in the manner previously explained, whereby the busy tone current traversing the headset at the toll operator position 1061 indicates to the operator in conjunction with answer supervision, as described above, that in fact the call has not been answered at the called subscriber substation T41 in the main office 40, but rather that the called subscriber substation T41 in the main office 40 is busy at this time and that the desired connection cannot be completed at this time by virtue of the circumstance mentioned. The operator at the toll position 1061 at the Strowger dial toll board 1060 then operates the front release key associated with the selector of the finder-selector link 1062 in order to bring about the release of the trunk circuit 900, the carrier equipment 994, the carrier equipment 894, the trunk circuit 800, the incoming selector 812 and the toll switch train 805; all in the manner previously explained. Subsequently, the operator at the toll position 1061 at the Strowger dial toll board 1060 may again operate her key-set in order again to cause the register-sender in use to effect reoperation of the selector of the finder-selector link 1062 and the consequent extension of the connection again to the called subscriber substation T41 in the main office 40; whereby the idle or busy condition thereof is again tested by the toll switch train 805 at this time.

Reconsidering the operation of the toll switch train 805 in the main office 40 in the extension of the above described connection from the toll operator position 1061 at the Strowger dial toll board 1060 in the distant office 50 to the called subscriber substation T41 in the main office 40, it is noted that it responds to several digits transmitted from the register-sender in use over the previously traced connection including the trunk 806 extending thereto since the toll switch train 805 comprises a corresponding plurality of switching stages. Accordingly, any given switching stage of the toll switch train 805 may find all of the next succeeding toll switching stages busy; whereby the last operated toll switching stage upon finding all of the next succeeding toll switching stages busy, operates to reverse the polarity of the trunk 806 in order to bring about premature operation of the answer relay R890 in the trunk circuit 800 and the consequent premature operation of the signal-in relay R920 in the trunk circuit 900; all in the manner previously explained. Accordingly, under the peculiar circumstance mentioned, the signal-in relay R920 in the trunk circuit 900 operates prior to the transmission of all of the digits registered in the register-sender in use that is associated with the finder-selector link 1062 at this time; which operation of the signal-in relay R920 is brought about prior to the operation of the end-of-dial relay R980 and while the answer relay R975 is restored. Upon operating, the signal-in relay R920 interrupts, at the contacts 922, the previously traced circuit for energizing the upper winding of the answer relay R975 in order to cause the latter relay to operate since it is of the differential type. Upon operating, the answer relay R975 interrupts, at the contacts 978, the previously traced path for applying ground potential by way of the lower winding of the end-of-dial relay R980 to the control conductor C1042 of the trunk 1040; and completes at the contacts 977, a path, including the contacts 981', for applying battery potential by way of the resistor 924 to the control conductor C1042. When resistance ground potential is thus removed from the control conductor C1042 of the trunk 1040 and resistance battery potential is thus applied thereto, further operation of the register-sender in use connected to the finder-selector link 1062 is arrested at this time. More specifically, operation of the register-sender mentioned is checked; whereby timing apparatus incorporated therein times out the register-sender in use completing a circuit for flashing 120 times per minute the busy lamp in the toll operator position 1061; which flashing of the busy lamp mentioned indicates to the operator at the toll position 1061 that the register-sender in use connected to the finder-selector link 1062 is now blocked as a consequence of an all-trunks-busy condition in the toll switch train 805 in the main office 40. The operator at the toll position 1061 then depresses the error key of the key-set to effect the release of the register-sender in use; whereby circuit changes are brought about to flash at 60 times per minute the busy lamp mentioned in order to indicate to the operator at the toll position 1061 that the register-sender has been disconnected at this time from the finder-selector link 1062. The operator at the toll position 1061 then proceeds to release the finder-selector link 1062 and consequently all of the apparatus including the toll switch train 805 in the main office 40; all in the manner previously explained.

In view of the foregoing, it will be understood that the incoming selector 812 in the main office 40 is responsive to all-trunks-busy condition of the group of trunks, including the trunk 806 in an identical manner to bring about the reversal of polarity over the trunk 875 and the consequent premature operation of the answer relay R890 in the trunk circuit 800 and the resulting premature operation of the signal-in relay R920 in the trunk circuit 900; whereby the front supervisory lamp at the calling toll operator position 1061 associated with the finder-selector link 1062 is flashed 120 times per minute giving the operator mentioned all-trunks-busy supervision; all in the manner previously explained.

Further, in conjunction with the operation of each toll switching stage in the toll switch train 805 in the main office 40, it is noted that some predetermined toll switching stage may be of the level-hunting type; whereby a considerable amount of time is consumed following the reception of a digit before the toll switching stage noted can determine whether all of the outlets available are busy. In this case, the predetermined toll switching stage operates to reverse the polarity of the trunk 806 during the level-hunting operation thereof. Subsequently, when the predetermined toll switching stage finishes the level-hunting operation thereof and finds an idle outlet, it operates again to restore the polarity of the trunk 806. Accordingly, during the level-hunting operation of the predetermined toll switching stage in the toll switch train 805, the polarity of the trunk 806 is maintained reversed in order to cause, during this time interval, premature operation of the answer relay R890 in the trunk circuit 800 and the consequent premature operation of the signal-in-relay R920 in the trunk circuit 900. Accordingly, the signal-in relay R920 is retained operated during the time interval mentioned in order to retain operated the answer relay R975; whereupon at the conclusion of the time interval mentioned, the answer relay R890 in the trunk circuit 800, as well as the signal-in relay R920 and the answer relay R975 in the trunk circuit 900 restore. Accordingly, the answer relay R975 in the trunk circuit 900 is retained operated during the time interval mentioned; whereby first resistance ground potential is removed from and resistance battery potential is applied to the control conductor C1042 of the trunk 1040 and then resistance battery potential is removed from and resistance ground potential is reapplied to the control conductor C1042. Hence, during the time interval mentioned, the application of resistance battery potential to the control conductor C1042 of the trunk 1040 arrests operation of the register-sender in use that is connected to the finder-selector link 1062 and initiates a timing operation thereof. However, the present time interval is not sufficiently long to bring about timing out of the register-sender in use, in the manner previously explained; whereby further operation of the register-sender mentioned proceeds when resistance ground potential is returned upon the control conductor C1042 of the trunk 1040.

Accordingly, after each toll switching stage in the toll switch train 805 in the main office 40 operates there is the possibility that the register-sender associated with the finder-selector link 1062 in the distant office 50 will be checked for a brief time interval in order to give the operating toll switching stage in the toll switch train 805 ample time to complete its level-hunting operation or other time-consuming operation. However, after all of the digits registered in the register-sender in use connected to the finder-selector link 1062 have been transmitted, assuming that no blocked toll switching stage is encountered in the toll switch train 805, the register-sender in use operates to cause battery potential therein to be applied to the control conductor C1042 of the trunk 1040 in order to bring about operation of the end-of-dial relay R980 in the trunk circuit 900; all in the manner previously explained.

*A call from the operator switchboard in the main office 40 to the Strowger dial toll board in the distant office 50*

First assume that th operator at the switchboard 765 in the main office 40 has answered a call utilizing the front plug P748 of the cord circuit 766 thereat that requires completion by an operator at the Strowger dial toll board 1060 in the distant office 50. The operator at the switchboard 765 inserts the rear plug P758 of the cord circuit 766 into a jack terminating an idle one of the trunk circuits in the group, including the trunk circuit 800, such, for example, as the jack J815 terminating the trunk circuit 800. When the trunk circuit 800 is thus seized, the carrier equipment 894 is seized effecting seizure over the line 80 of the carrier equipment 994; whereupon the trunk circuit 900 is seized effecting seizure over the trunk 1030 of the incoming selector 1036; all in the manner previously explained.

The operator at the switchboard 765 then operates the dial D760 incorporated in the cord circuit 766, assuming that the dial key K737 has been previously operated to its rear position, in accordance with the single digit assigned as the directory number of the Strowger dial toll board 1060 in the distant office 50; which digit may be 0. When the digit 0 is dialed at the operator switchboard 765, it is repeated by the trunk circuit 800 to the carrier equipment 894 and thence to the carrier equipment 994 and thence to the trunk circuit 900 and finally to the incoming selector 1036; all in the manner previously explained. The incoming selector 1036 responds to the digit 0 in order to select the group of trunks, including the trunk 1065, and then to select an idle trunk in the group mentioned. For example, the incoming selector 1036 may select the particular trunk 1065 extending to the toll trunk inward 1066; whereby the toll trunk inward 1066 operates to initiate a call on the outgoing trunk 1067 extending therefrom and to initiate operation of the distribution apparatus incorporated in the Strowger dial toll board 1060; whereby the call is allotted to be answered at an idle one of the toll operator positions thereat, such, for example, as the toll operator position 1061; and operation of an idle one of the finder-selector links individually associated with the toll operator position 1061, such, for example, as the finder-selector link 1062 is initiated. More particularly, the finder of the finder-selector link 1062 operates to find the outgoing trunk 1067 extending from the toll trunk inward 1066; which finder-selector link 1062 is connected to the toll operator position 1061 at this time; whereby the equipment at the toll operator position 1061 operates to remove the application of ground potential to the E. C. conductor of the trunk 1067 extending from the toll trunk inward 1066 and to apply resistance battery potential thereto in order that ground potential is removed from and resistance battery potential is applied to the control conductor C1034 of the trunk 1030. When ground potential is thus removed from the control conductor C1034 of the trunk 1030 and resistance battery potential is applied thereto, the previously traced circuit, including the contacts 933 and 986 for energizing the upper winding of the answer relay R975 is interrupted and the upper winding thereof is short-circuited, thereby to cause the answer relay R975 to operate since it is of the differential type. Upon operating the answer relay R975 interrupts, at the contacts 976, the previously traced original termination circuit, including the condenser 917 and the resistor 918, across the line conductors C901 and C902 extending to the carrier equipment 994; and completes, at the contacts 979, the previously mentioned path for applying ground potential to the signal-out conductor C903 in order to effect operation of the signal-out relay R997 in the carrier equipment 994 and the consequent reoperation of the signal-in relay R895 in the carrier equipment 894; whereby the signal-in relay R860 in the trunk circuit 800 is operated; all in the manner previously explained. Upon operating, the signal-in relay R860 interrupts, at the contacts 861, the previously traced circuit for energizing the lower winding of the sleeve relay R820 in multiple with the upper winding thereof and in series with the winding of the rear supervisory relay R755; whereby the sleeve relay R820 in the trunk circuit 800 is retained in its operated position and the rear supervisory relay R755 in the cord circuit 766 restores as it is of the marginal type. Upon restoring, the rear supervisory relay R755 interrupts, at the contacts 756, the previously mentioned circuit for illuminating the rear supervisory lamp L757, thereby to render to the operator at the switchboard 765 answer supervision.

At this time, assuming that in the cord circuit 766 the dial key K737 has been restored to its normal position and the talk rear key K735 has been operated, a connection is established between the calling operator switchboard 765 in the main office 40 and the called toll operator position 1061 at the Strowger dial toll board 1060 in the distant office 50, and the operator at the switchboard 765 advises the operator at the toll position 1061 concerning the extension of the connection. The transmission over the carrier link of audio signals between the calling operator switchboard 765 in the main office 40 and the called toll operator position 1061 at the Strowger dial toll board 1060 in the distant office 50 is substantially identical to that previously described; the 24.55 kc. carrier signal modulated by the audio signal being transmitted from the carrier equipment 894 to the carrier equipment 994 and the 15.95 kc. carrier signal modulated by the audio signal being transmitted from the carrier equipment 994 to the carrier equipment 894.

The operator at the toll position 1061 then operates her key-set in order that the register-sender in use may control the selector of the finder-selector link 1062 and the other toll switching stages in the outgoing toll switch train. After the connection has been extended over the outgoing circuit from the distant office 50 by the selector of the finder-selector link 1062, the operator at the toll position 1061 retires from the connection by restoring the talk key of the finder-selector link 1062 disconnecting it from the toll operator position 1061. Also, at this time, the operator at the switch-board 765 may retire from the connection by restoring the talk rear key K735 of the cord circuit 766.

During the progress of the above described call, should it be necessary for the operator at the calling switchboard 765 in the main office 40 again to communicate with the operator at the toll position 1061 at the Strowger dial toll board 1060 in the distant office 50, this may be accomplished by the operator at the switchboard 765 as a result of the operation of the ring key K736 to its rear position; whereby a splash of ringing current is transmitted from the interrupter generator 738 over the rear plug P758 and the jack J815 and over the previously traced circuit, including the winding of the re-ring relay R865 in the trunk circuit 800; whereby the re-ring relay R865 operates shortly after the winding thereof is energized and then restores shortly after the winding thereof is deenergized since it is of the combination slow-to-operate and slow-to-release type. Upon operating, the re-ring relay R865 interrupts, at the contacts 868, the previously traced circuit for maintaining operated the signal-out relay R830; and interrupts, at the contacts 866, the previously traced circuit for maintaining operated the re-ring relay R870; whereby the signal-out relay R830 restores immediately and the re-ring relay R870 restores shortly thereafter as it is of the slow-to-release type. Upon restoring, the re-ring relay R870 completes, at the contacts 871, an alternative circuit, including the contacts 867 and 821, for operating the signal-out relay R830. When the re-ring relay R865 then restores, it recompletes, at the contacts 868, the previously traced original circuit for operating the signal-out relay R830; recompletes, at the contacts 866, the previously traced original circuit for operating the re-ring relay R870; and interrupts, at the contacts 867, the above traced alternative circuit for operating the signal-out relay R830. Accordingly, when the ring key K736 in the cord circuit 766 is operated, the re-ring relay R865 in the trunk circuit 800 effects restoration of the signal-out relay R830 and reoperation thereof shortly thereafter when the re-ring relay R870 restores. Thus, the signal-out relay R830 restores and then reoperates after a short-time interval effecting corresponding restoration and reoperation of the signal-out relay R897 in the carrier equipment 894 and the consequent restoration and reoperation of the signal-in relay R995 in the carrier equipment 994; whereby the signal in relay R920 in the trunk circuit 900 is restored and then reoperated after a short-time interval.

When the signal-in relay R920 restores and then reoperates, it completes and then interrupts, at the contacts 922, the previously traced circuit for operating the dial relay R940; whereby the latter relay operates and restores shortly thereafter, it being of the slow-to-release type. Accordingly, when the ring key K736 in the cord circuit 766 is operated to its rear position, the dial relay R940 in the trunk circuit 900 operates and then restores; which cycle is repeated by the interrupter generator 738. Each time the dial relay R940 operates and then restores, it completes and then interrupts, at the contacts 943, an obvious path for applying ground potential to the control conductor C1034 of the trunk 1030, thereby to brink about a flash of the rear supervisory lamp at the toll operator position 1061 associated with the rear or finder of the finder-selector link 1062. Accordingly, when the ring key K736 in the cord circuit 766 is operated to its rear position, by the operator at the switchboard 765 in the main office 40, the rear supervisory lamp at the toll operator position 1061 associated with the rear or finder of the finder-selector link 1062 is flashed indicating to the operator at the toll position 1061 at the Strowger dial toll board 1060, the recall condition on the established connection, including the finder of the finder-selector link 1062. The operator at the toll position 1061 then operates the talk key of the finder-selector link 1062 in order to reconnect it to the toll operator position 1061; whereby the operator at the toll position 1061 at the Strowger dial toll board 1060 in the distant office 50 may again converse with the operator at the switchboard 765 in the main office 40. Thereafter, the operator at the toll position 1061 restores the talk key of the finder-selector link 1062 in order again to disconnect the finder-selector link 1062 from the toll operator position 1061.

At the conclusion of the established connection, the operator at the calling switchboard 765 in the main office 40 withdraws the rear plug P759 of the cord circuit 766 from the jack J815 terminating the trunk circuit 800; whereby the rear supervisory relay R755 in the cord circuit 766, as well as the sleeve relay R820 and the jack relay R835 in the trunk circuit 800 restore; all in the manner previously explained. Upon restoring, the jack relay R835 effects the restoration shortly thereafter of the re-ring relay R870, as the latter relay is of the slow-to-release type; and upon restoring the sleeve relay R820 effects the restoration of the signal-out relay R830; all in the manner previously explained. Upon restoring, the signal-out relay R830 effects the restoration of the signal-out relay R897 in the carrier equipment 894 and the consequent reoperation of the signal-in relay R995 in the carrier equipment 994; whereby the signal-in relay R920 in the trunk circuit 900 is restored; all in the maner previously explained. Upon restoring, the signal-in relay R920 effects the restoration of the hold relay R930 shortly thereafter since the latter relay is of the slow-to-release type; whereby the latter relay completes, at the contacts 931, a path, including the contacts 922 and 944, for applying ground potential to the control conductor C1034 of the trunk 1030. This application of ground potential to the control conductor C1034 of the trunk 1030 effects steady illumination of the rear supervisory lamp at the toll operator position 1061 associated with the finder of the finder selector link 1062 in order to indicate to the operator thereat that the established connection utilizing the finder-selector link 1062 has been released by the operator at the switchboard 765 in the main office 40. Also upon restoring, the hold relay R930 interrupts, at the contacts 934, the previously traced original circuit for energizing the lower winding of the answer relay R975; however, an alternative holding circuit for energizing the lower winding of the answer relay R975 is completed at this time by virtue of the application of ground potential in the finder-selector link 1062 to the control conductor of the trunk 1067 and consequently to the control conductor C1035 of the trunk 1030. Further, the hold relay R930 interrupts, at the contacts 933, the previously traced path for short-circuiting the upper winding of the answer relay R975. Accordingly, the answer relay R975 being of the differential type, is retained in its operated position at this time. Further, the operated answer relay R975 retains completed, at the contacts 978', an alternative path for applying ground potential to the control conductor C1043 of the trunk 1040; thereby positively to retain the trunk 1040 marked as busy to the selectors of the finder-selector links 1062, etc., having access thereto. Finally the operated answer relay R975 retains completed, at the contacts 979, the previously mentioned path for applying ground potential to the signal-out conductor C903, thereby to retain operated the signal-out relay R997 in the carrier equipment 994.

When the operator at the toll position 1061 at the Strowger dial toll board 1060 receives the disconnect supervision described above, she operates the link release key associated with the finder-selector link 1062 in order to bring about the release of the finder of the finder-selector link 1062; whereby ground potential is removed from the control conductor of the trunk 1067 extending from the toll trunk inward 1066 and consequently from the control conductor C1035 of the trunk 1030, thereby interrupting the previously traced alternative holding circuit for energizing the lower winding of the answer relay R975 in the trunk circuit 900 in order to cause the latter relay to restore. Also, when the finder of the finder-selector link 1062 is thus released, the incoming selector 1036 is released; whereby the toll trunk circuit inward 1066 is again marked as idle to the incoming selectors 1036, etc., having access thereto. Upon restoring, the answer relay R975 in the trunk circuit 900 interrupts, at the contacts 978', the previously mentioned alternative path for applying ground potential to the control conductor C1043 of the trunk 1040; whereby the trunk 1040 is marked as idle to the selectors of the finder-selector link 1062, etc., having access thereto. Finally, the answer relay R975 interrupts, at the contacts 979, the previously mentioned path for applying ground potential to the signal-out conductor C903 in order to bring about the restoration of the signal-out relay R997 in the carrier equipment 994 and the consequent reoperation of the signal-in relay R895 in the carrier equipment 894; whereby the signal-in relay R860 in the trunk circuit 800 is restored; all in the manner previously explained. Upon restoring, the signal-in relay R860 effects the restoration of the hold relay R850; whereby the latter relay effects restoration of the switch relay R880, which was operated incident to the restoration of the jack relay R835, as previously explained. Upon restoring, the switch relay R880 brings about the release of the incoming selector 812 which was seized over the trunk 875 incident to the operation of the switch relay R880; all in the manner previously explained.

At this time, the established connection between the calling operator switchboard 765 in the main office 40 and the toll operator position 1061 at the called Strowger dial toll board 1060 in the distant office 50 is released and all of the apparatus involved therein is completely released and available for further use.

*A call from the Strowger dial toll board in the distant office 50 to the operator switchboard in the main office 40*

First assume that the operator at a toll position, such, for example, as the toll position 1061 at the Strowger dial toll board 1060 in the distant office 50 has answered a call utilizing the finder of a finder-selector link individually associated therewith, such, for example, as the finder-selector link 1062 that requires completion by the operator at the switchboard 765 in the main office 40. The operator at the toll position 1061 operates the associated key-set; whereby the register-sender in use operates to transmit two corresponding digits. The first digit transmitted from the register-sender mentioned effects operation of the selector of the finder-selector link 1062 to select the group of trunks, including the trunk 1040, and then an idle trunk in the group mentioned. For example, the selector of the finder-selector link 1062 may select the particular trunk 1040 extending to the trunk circuit 900; whereby the trunk circuit 900, when it is seized, effects seizure of the carrier equipment 994 and the consequent seizure over the line 80 of the carrier equipment 894; whereupon the trunk circuit 800 is seized effecting seizure over the trunk 875 of the incoming selector 812; all in the manner previously explained.

The register-sender mentioned connected to the finder-selector link 1062 then operates to transmit the second or last digit registered therein over the selector of the finder-selector link 1062 and the trunk 1040 to the line relay R1010 in the trunk circuit 900; whereby the digit mentioned is repeated to the carrier equipment 994 and thence to the carrier equipment 894 and then to the signal-in relay R860 in the trunk circuit 800 and ultimately to the incoming selector 812; whereupon the register-sender mentioned effects operation of the end-of-dial relay R980 in the trunk circuit 900 and is then automatically released; all in the manner previously explained. The incoming selector 812 responds to the digit mentioned to select the group of trunks, including the trunk 808, and then an idle trunk in the group mentioned. For example, the incoming selector 812 may select the particular trunk 808 extending to the toll trunk inward 809; whereby the toll trunk inward 809 initiates a call on the outgoing trunk 810 extending therefrom and terminating in the jack J811 before the operator switchboard 765 in the main office 40. When the end-of-dial relay R980 in the trunk circuit 900 operates, as noted above, it cuts off both the answer relay R975 and the line relay R1010 and effects connection of the trouble relay R1020 and the re-ring relay R970 to the respective line conductors C1041 and C1042 of the trunk 1040; all in the manner previously explained.

The operator at the switchboard 765 in the main office 40 answers the call utilizing an idle one of the cord circuits thereat, such, for example, as the cord circuit 766; whereupon the rear plug P758 thereof is inserted into the jack J811 terminating the outgoing trunk 810 extending from the toll trunk inward 809. When the rear plug P758 of the cord circuit 766 is thus inserted into the jack J811, the rear supervisory relay R755 in the cord circuit 766 is retained in its restored position as it is of the marginal type, rendering unlighted the rear supervisory lamp L757 in order to indicate to the operator at the switchboard 765 in the main office 40 the answering of the present call. Also, the toll trunk inward 809 is operated to reverse the polarity over the trunk 808 and consequently over the incoming selector 812 and the trunk 875; whereby the left-hand winding of the answer relay R890 in the trunk circuit 800 is poled to operate. Upon operating, the answer relay R890 effects operation of the signal-out relay R897 in the carrier equipment 894 and the consequent restoration of the signal-in relay R995 in the carrier equipment 994; whereby the signal-in relay R920 in the trunk circuit 900 is operated. Upon operating, the signal-in relay R920 interrupts, at the contacts 922, the previously traced direct path for applying ground potential to the control conductor C1042 of the trunk 1040, thereby to extinguish the front supervisory lamp in the toll operator position 1061 associated with the selector of the finder-selector link 1062 in order to indicate to the operator thereat that the call extended by way of the front or selector of the finder-selector link 1062 to the called operator switchboard 765 in the main office 40 has been answered at this time. The operator at the calling toll position 1061 at the Strowger dial toll board 1060 in the distant office 50 then advises the operator at the called switchboard 765 in the main office 40 concerning the extension of the connection since an established connection therebetween is completed at this time. The transmission over the carrier link of audio signals between the calling toll operator position 1061 at the Strowger dial toll board 1060 in the distant office 50 and the called operator switchboard 765 in the main office 40 is substantially identical to that previously described; the 24.55 kc. carrier signal modulated by the audio signal being transmitted from the carrier equipment 894 to the carrier equipment 994 and the 15.95 kc. carrier signal modulated by the audio signal being transmitted from the carrier equipment 994 to the carrier equipment 894.

The operator at the switchboard 765 then restores the talk rear key K735 in the cord circuit 766, it having been operated incident to answering the call utilizing the rear plug P758. Next, the operator at the switchboard 765 operates the dial key K737 of the cord circuit 766 to its front position and initiates the extension of the connection by inserting the front plug P748 into a jack terminating an idle trunk extending to the required destination. After the call has thus been extended by the operator at the switchboard 765 in the main office 40, both the dial key K737 and the talk front key K734 are restored to their normal positions completing a connection between the rear and front plugs P758 and P748 of the cord circuit 766 and consequently between the incoming connection to the main office 40 and the outgoing connection therefrom; whereby the operator at the switchboard 765 in the main office 40 has retired from the completed connection as a consequence of the restoration of the talk rear key K735 and the talk front key K734 in the cord circuit 766. At this time the operator at the toll position 1061 retires from the connection by restoring the talk key of the finder-selector link 1062 disconnecting it from the toll operator position 1061 at the Strowger dial toll board 1060 in the distant office 50.

During the progress of the above described call, should it be necessary for the operator at the calling toll position 1061 at the Strowger dial toll board 1060 in the distant office 50 again to communicate with the operator at the called switchboard 765 in the main office 40, this may be accomplished by the operator at the toll position 1061 as a result of the operation of the associated ring key to its front position after the talk key of the finder-selector link 1062 has been operated again connecting the finder-selector link 1062 to the toll operator position 1061; whereby battery potential is applied to and then removed from the positive line conductor C1042 of the trunk 1040 in the finder-selector link 1062 by the associated interrupter generator. The application of battery potential to the line conductor C1042 completes a circuit, including the contacts 969, the winding 914 of the repeating coil RC910, the contacts 967, 985 and 1022 for energizing the winding of the re-ring relay R970; whereby the latter relay operates shortly thereafter, it being of the slow-to-operate type. Accordingly, when the asociated ring key is operated at the toll operator position 1061, the re-ring relay R970 in the trunk circuit 900 operates and then restores. Each time the re-ring relay R970 operates, it interrupts, at the contacts 972, the previously traced path for applying ground potential to the signal-out conductor C903; and interrupts, at the contacts 971, the previously traced circuit for maintaining operated the re-ring relay R1025 in order to cause the latter relay to restore shortly thereafter since it is of the slow-to-release type. Upon restoring, the re-ring relay R1025 completes, at the contacts 1027, an alternative path, includign the contacts 983', for applying ground potential to the signal-out conductor C903. Subsequently, when the re-ring relay R970 restores, it recompletes, at the contacts 971, the previously traced circuit for operating the re-ring relay R1025; whereby upon operating, the re-ring relay R1025 completes, at the contacts 1026, the previously traced original path for applying ground potential to the signal-out condductor C903. Accordingly, each time the re-ring relay R970 is operated and then restored, ground potential is removed from the signal-out conductor C903 and then reapplied thereto after a measured time interval. Accordingly, the operation of the ring key to its front position at the toll operator position 1061 effects cyclic operation and restoration of the re-ring relays R970 and R1025 in the trunk circuit 900 in the manner explained above; whereby ground potential is repeatedly removed from and then replaced upon the signal-out conductor C903 in order to cause the signal-out relay R997 in the carrier equipment 994 to follow repeating to the signal-in relay R895 in the carrier equipment 894; whereby the signal-in relay R860 in the trunk circuit 800 follows repeating, at the contacts 863, corresponding pulses over the trunk 875, the incoming selector 812 and the trunk 808 to the toll trunk inward 809. The toll trunk inward 809 responds controlling over the control conductor of the outgoing trunk 810 extending therefrom, the sleeve, not shown, of the jack J811 and the sleeve of the rear plug P758 of the cord circuit 766; whereby the circuit, including the contacts 751, for energizing the winding of the rear supervisory relay R755 in the cord circuit 766 is controlled. More particularly, the supervisory relay R755 follows the pulses mentioned, repeating, at the contacts 756; whereby the rear supervisory lamp L757 is correspondingly flashed indicating the recall on the trunk circuit 800 by the operator at the toll position 1061 at the Strowger dial toll board 1060 in the distant office 50. The operator at the switchboard 765 then re-enters the connection by operating the talk rear key K735; whereby the previously traced connection between the head set 767 at the called operator switchboard 765 in the main office 40 and the calling toll operator position 1061 at the Strowger dial toll board 1060 in the distant office 50 is recompleted. After the operator at the switchboard 765 learns of the requirements of the operator at the toll position 1061, she again retires from the connection by restoring the talk rear key K735 of the cord circuit 766.

At the conclusion of the established connection, the operator at the calling toll position 1061 at the Strowger dial toll board 1060 operates the link release key associated with the finder-selector link 1062 in order to bring about the release of the selector of the finder-selector link 1062; whereby ground potential is removed from the control conductor C1043 of the trunk 1040 effecting the release of the seize relay R955 in the trunk circuit 900 shortly thereafter since it is of the slow-to-release type, in the manner previously explained. Upon restoring, the seize relay R955 effects the release of the switch relay R960 and the re-ring relay R1025 shortly thereafter, the latter relay being of the slow-to-release type; upon restoring, the switch relay R960 effects the restoration of the end-of-dial relay R980; and upon restoring, the end-of-dial relay R980 interrupts, at the contacts 983', the previously traced path for applying ground potential to the signal-out conductor C903 in order to effect the restoration of the signal-out relay R997 in the carrier equipment 994; all in the manner previously explained. Also upon restoring, the switch relay R960 completes, at the contacts 965', a circuit, including the contacts 923, for operating the hold relay R930; whereby the latter relay completes, at the contacts 933 and 934, the previously traced circuits for respectively energizing the upper and lower windings of the answer relay R975; however, the latter relay does not operate at this time as it is of the differential type. Further, the hold relay R930 completes, at the contacts 934, the previously mentioned path for applying ground potential to the control conductor C1035 of the trunk 1030 in order to effect seizure of the incoming selector 1036; however, without effect at this time. Finally, the hold relay R930 interrupts, at the contacts 936, the previously traced path for applying battery potential by way of the winding of the seize relay R955 to the control conductor C1043 of the trunk 1040; and completes, at the contacts 935, the previously mentioned path for applying ground potential to the control conductor C1043; whereby the trunk circuit 900 maintains the trunk 1040 marked as busy to the selectors of the finder-selector links 1062 having access thereto until the trunk circuit 800 in the main office 40 is released.

Upon restoring, the signal-out relay R997 in the carrier equipment 994 effects reoperation of the signal-in relay R895 in the carrier equipment 894 in order to bring about restoration of the signal-in relay R860 in the trunk circuit 800. Upon restoring the signal-in relay R860 interrupts, at the contacts 862, the previously mentioned circuit for maintaining operated the hold relay R850 in order to cause the latter relay to restore shortly thereafter, it being of the slow-to-release type. Upon restoring, the hold relay R850 interrupts, at the contacts 852, the previously traced circuit for maintaining operated the switch relay R880; whereby the latter relay restores, interrupting, at the contacts 888, the previously mentioned path for applying ground potential to the control conductor C878 of the trunk 875, thereby to bring about the release of the incoming selector 812. Also upon restoring, the signal-in relay R860 interrupts, at the contacts 863, the previously traced loop circuit extending between the left-hand winding of the answer relay R890 and the incoming selector 812 in order to cause the answer relay R890 to restore. Finally, upon restoring, the hold relay R850 interrupts, at the contacts 851, the previously mentioned circuit for energizing the right-hand winding of the answer relay R890; and interrupts, at the contacts 853, the previously mentioned circuit for illuminating the busy lamp L817 in order to indicate the idle condition of the trunk circuit 800 at this time. When the incoming selector 812 is thus released, the trunk circuit inward 809 operates in order to effect operation of the rear supervisory relay R755 in the cord circuit 766; whereby the rear supervisory lamp L757 is illuminated in order to indicate to the operator at the switchboard 765 that the connection has been released. The operator at the switchboard 765 in the main office 40 then withdraws the rear plug P758 of the cord circuit 766 from the jack J811 terminating the trunk 810 extending from the toll trunk inward 809 in order to bring about the restoration of the rear supervisory relay R755 in the cord circuit 766 and the consequent extinguishing of the rear supervisory lamp L757. At this time the toll trunk inward 809 is released and operates in order to mark the trunk 808 extending thereto as idle to the incoming selectors 812, etc., having access thereto.

Upon restoring, the answer relay R890 in the trunk circuit 800 effects the restoration of the signal-out relay R897 in the carrier equipment 894 and the consequent reoperation of the signal-in relay R995 in the carrier equipment 994; whereby the signal-in relay R920 in the trunk circuit 900 is restored. Upon restoring, the signal-in relay R920 effects the restoration of the hold relay R930 shortly thereafter, the latter relay being of the slow-to-release type. Upon restoring, the hold relay R930 interrupts, at the contacts 933 and 934, the previously traced circuits for respectively energizing the upper and lower windings of the answer relay R975, the latter relay being already restored as it is of the differential type. Also the hold relay R930 interrupts, at the contacts 934, the previously mentioned path for applying ground potential to the control conductor C1035 of the trunk 1030 in order to bring about the release of the incoming selector 1035. Finally, the hold relay R930 interrupts, at the contacts 935, the previously mentioned path for applying ground potential to the control conductor C1043 of the trunk 1040; and recompletes, at the contacts 936, the previously traced original path for applying battery potential by way of the winding of the seize relay R955 to the control conductor C1043; whereby the trunk 1040 is again marked as idle to the selectors of the finder-selector links 1062, etc., having access thereto.

At this time the established connection between the calling toll operator position 1061 at the Strowger dial toll board 1060 in the distant office 50 and the called operator switchboard 765 in the main office 40 is released and all of the apparatus involved therein is completely released and available for further use.

*Locking a trunk circuit out of service from the Strowger dial toll board in the distant office 50*

First assume that the operator at one of the toll positions, such, for example, as the toll operator position 1061 at the Strowger dial toll board 1060 in the distant office 50 utilizing one of the finder-selector links, such, for example, as the finder-selector link 1062, attempts the extension of a connection to the called operator switchboard 765 or to a called subscriber substation in the main office 40 in the manner previously explained; that the selector of the finder-selector link 1062 operates to seize the trunk 1040 extending to the trunk circuit 900; and that the trunk circuit 900 fails for some reason to extend the connection. In this event, at the conclusion of the transmission of all of the digits registered in the register-sender in use, connected to the finder-selector link 1062, the register-sender mentioned is automatically released after bringing about operation of the end-of-dial relay R980 in the trunk circuit 900; all in the manner previously explained. The operator at the toll position 1061 upon determining that the trunk circuit 900 is not operating properly, operates an associated trouble or out-of-order key in order to cause battery potential to be applied to both of the line conductors C1041 and C1042 of the trunk 1040. The application of battery potential to the line conductor C1041 completes the previously traced circuit for energizing the winding of the trouble relay R1020; and the application of battery potential to the line conductor C1042 completes the previously traced circuit for energizing the winding of the re-ring relay R970; whereby both of the relays mentioned operate shortly thereafter since they are of the slow-to-operate type. Upon operating, the trouble relay R1020 interrupts, at the contacts 1022, the previously traced circuit for maintaining operated the re-ring relay R970; and completes, at the contacts 1021, a circuit substantially identical to that previously traced for energizing the winding of the trouble relay R950; whereby the trouble relay, being of the combination slow-to-operate and slow-to-release type, operates shortly thereafter. Upon operating, the trouble relay R950 completes, at the contacts 952', a holding circuit including the trouble key K950 for energizing the winding thereof; and completes, at the contacts 953', an obvious circuit for illuminating the trouble lamp L950, thereby to indicate to a repairman that the trunk circuit 900 is defective and should be repaired. Also, the trouble relay R950 interrupts, at the contacts 951', the previously traced circuit for operating the seize relay R955 in order to cause the latter relay to restore shortly thereafter as it is of the slow-to-release type. Further, the trouble relay R950 completes, at the contacts 954, a path, including the contacts 936, for applying ground potential to the control conductor C1043 of the trunk 1040, thereby to mark the trunk 1040 and consequently the trunk circuit 900 as busy to the selectors of the finder-selector links 1062, etc., having access thereto. Further, the trouble relay R950 interrupts, at the contacts 951, the previously traced termination circuit, including the condenser 917 and the resistor 918, across the line conductors C901 and C902 extending to the carrier equipment 994; and completes, at the contacts 952 and 953, a connection, including the condenser 917 and the resistor 918, between the source of trouble tone and the line conductors C901 and C902 mentioned; whereby the 15.95 kc. carrier signal is modulated thereby and projected from the carrier equipment 994 over the line 80 to the carrier equipment 894; whereby the audio component thereof is projected over the line conductors C801 and C802 extending from the carrier equipment 894 and traverses the windings 878' and 879' of the repeating coil RC875 in order to induce a corresponding trouble tone voltage in the windings 876' and 877' of the repeating coil RC875.

The operator at the toll position 1061 at the Strowger dial toll board 1060 in the distant office 50 then effects the release of the finder-selector link 1062; whereby all of the relays in the trunk circuit 900 are restored, with the exception of the operated trouble relay R950. At this time the trunk circuit 900 is marked as busy to the selectors of the finder-selector links 1062, etc., having access thereto; and similarly, the trunk circuit 800 has trouble tone therein which is heard by the operator at the switchboard 765 in the main office 40 should she insert the rear plug of one of the cord circuits thereat in to the jack J815 terminating the trunk circuit 800, thereby to indicate the condition mentioned to the operator at the switchboard 765.

After the repairman has placed the trunk circuit 900 again in working order, the trouble key K950 is momentarily operated in order to interrupt the previously traced holding circuit for maintaining operated the trouble relay R950; whereby the latter relay restores shortly thereafter as it is of the combination slow-to-operate and slow-to-release type. Upon restoring, the trouble relay R950 interrupts, at the contacts 952', a further point in the holding circuit for energizing the winding thereof; and interrupts, at the contacts 953', the previously mentioned circuit for illuminating the trouble lamp L950 in order to indicate that the trunk circuit 900 is again in service. Also, the trouble relay R950 interrupts, at the contacts 952 and 953, the previously traced connection between the source of trouble tone and the line conductors C901 and C902 extending to the carrier equipment 994 in order to bring about the removal of the trouble tone from the jack J815 terminating the trunk circuit 800 before the operator switchboard 765 in the main office 40. Further, the trouble relay R950 recompletes, at the contacts 951, the previously traced original termination circuit, including the condenser 917 and the resistor 918, across the line conductors C901 and C902 mentioned; interrupts, at the contacts 954, the previously traced path for applying ground potential to the control conductor C1043 of the trunk 1040; and recompletes, at the contacts 951', the previously traced original path for applying battery potential by way of the winding of the seize relay R955 to the control conductor C1043. At this time, the trunk 1040 extending to the trunk circuit 900 is marked as idle to the selectors of the finder-selector links 1062, etc., having access thereto.

*Conclusions*

In view of the foregoing, it is apparent that there has been provided a telephone system including facilities for setting up telephone connections between subscriber substations in different automatic exchanges over carrier links; together with facilities for setting up telephone connections between subscriber substations in different automatic exchanges and an operator switchboard of the manual dial type in a main office over carrier links, as well as facilities for setting up telephone connections between an operator switchboard of the manual dial type in a main office and an operator switchboard of the fully automatic dial type in a distant office over carrier links.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a signaling system including first and second trunk circuits interconnected by a trunk, and means responsive to seizure of the one of said trunk circuits for effecting seizure of the other one of said trunk circuits over said trunk, whereby said trunk circuits are rendered idle or busy simultaneously; a sender associated with said first trunk circuit and including a first timer, means responsive to said first trunk circuit being rendered idle for initiating operation of said first timer and responsive to said first trunk circuit being rendered busy for releasing said first timer, a receiver associated with said second trunk circuit and including a second timer, means governed when said second trunk circuit is idle for initiating operation of said second timer and responsive to said second trunk circuit being rendered busy for releasing said second timer, means responsive to operation of said first timer a first time interval for sending a test signal over said trunk and for releasing said first timer and then for initiating reoperation thereof, means responsive to said test signal received over said trunk for releasing said second timer and then for initiating reoperation thereof, an alarm, and means responsive to operation of said second timer a second time interval greater than said first time interval for operating said alarm.

2. In a signaling system including first and second trunk circuits interconnected by a trunk, and means responsive to seizure of the one of said trunk circuits for effecting seizure of the other one of said trunk circuits over said trunk so that said trunk circuits are rendered idle or busy simultaneously; a sender associated with said first trunk circuit and including a first timer, means responsive to said first trunk circuit being rendered idle for initiating operation of said first timer and responsive to said first trunk circuit being rendered busy for releasing said first timer, a receiver associated with said second trunk circuit and including a second timer, means governed when said second trunk circuit is idle for transmitting a start control to said second timer so that operation thereof is normally initiated and responsive to said second trunk circuit being rendered busy for releasing said second timer, an alarm, means responsive to failure of operation of said second timer after said start control is transmitted thereto for operating said alarm, means responsive to operation of said first timer a first time interval for sending a test signal over said trunk and for releasing said first timer and then for initiating reoperation thereof, and means responsive to said test signal received over said trunk for releasing said second timer and then for initiating reoperation thereof.

3. In a signaling system including first and second trunk circuits interconnected by a trunk, and means responsive to seizure of the one of said trunk circuits for effecting seizure of the other one of said trunk circuits over said trunk so that said trunk circuits are rendered idle or busy simultaneously; a sender associated with said first trunk circuit and including a first timer, means responsive to said first trunk circuit being rendered idle for initiating operation of said first timer and responsive to said first trunk circuit being rendered busy for releasing said first timer, a receiver associated with said second trunk circuit and including a second timer, means controlled when said second trunk circuit is idle for transmitting a start control to said second timer so that operation thereof is normally initiated and responsive to said second trunk circuit being rendered busy for releasing said second timer, a first alarm, means responsive to failure of operation of said second timer after said start control is transmitted thereto for operating said first alarm, means responsive to operation of said first timer a first time interval for sending a test signal over said trunk and for releasing said first timer and then for initiating reoperation thereof, means responsive to said test signal received over said trunk for releasing said second timer and then for initiating reoperation thereof, a second alarm, and means responsive to operation of said second timer a second time interval greater than said first time interval for operating said second alarm.

4. In a signaling system including first and second trunk circuits interconnected by a trunk, means responsive to seizure of said first trunk circuit for transmitting a seizure signal over said trunk, and means responsive to said seizure signal received over said trunk for effecting seizure of said second trunk circuit so that said trunk circuits are rendered idle or busy substantially simultaneously; a sender associated with said first trunk circuit and including a first timer, means responsive to said first trunk circuit being rendered idle for initiating operation of said first timer and responsive to said first trunk circuit being rendered busy for releasing said first timer, a receiver associated with said second trunk circuit and including a second timer, means governed when said second trunk circuit is idle for initiating operation of said second timer and responsive to said second trunk circuit being rendered busy for releasing said second timer, means responsive to operation of said first timer a first time interval for sending a test signal over said trunk and for releasing said first timer and then for initiating reoperation thereof, means responsive to said test signal received over said trunk for releasing said second timer and then for initiating reoperation thereof, said test signal being of such character that said seizure means is unresponsive thereto so that said second trunk circuit is not seized as a consequence of said test signal being sent over said trunk, an alarm, and means responsive to operation of said second timer a second time interval greater than said first time interval for operating said alarm.

5. In a signaling system including first and second trunk circuits interconnected by a trunk, means responsive to seizure of said first trunk circuit for transmitting a long seizure signal over said trunk, and slow-acting means responsive to said long seizure signal received over said trunk for effecting seizure of said second trunk so that said trunk circuits are rendered idle or busy substantially simultaneously; a sender associated with said first trunk circuit and including a first timer, means responsive to said first trunk circuit being rendered idle for initiating operation of said first timer and responsive to said first trunk circuit being rendered busy for releasing said first timer, a receiver associated with said second trunk circuit and including a second timer, means governed when said second trunk circuit is idle for initiating operation of said second timer and responsive to said second trunk circuit being rendered busy for releasing said second timer, means responsive to operation of said first timer a first time interval for sending a short test signal over said trunk and for releasing said first timer and then for initiating reoperation thereof, means responsive to said short test signal received over said trunk for releasing said second timer and then for initiating reoperation thereof, said slow-acting means being unresponsive to said short test signal so that said second trunk circuit is not seized as a consequence of said short test signal being sent over said trunk, an alarm, and means responsive to operation of said second timer a second time interval greater than said first time interval for operating said alarm.

6. In a signaling system including first and second trunk circuits interconnected by a trunk, means responsive to seizure of said first trunk circuit for transmitting a long seizure signal over said trunk, and first slow-acting means responsive to said long seizure signal received over said trunk for effecting seizure of said second trunk circuit so that said trunk circuits are rendered idle or busy substantially simultaneously; a sender associated with said first trunk circuit and including a first timer, means responsive to said first trunk circuit being rendered idle for initiating operation of said first timer and responsive to said first trunk circuit being rendered busy for releasing said first timer, a receiver associated with said second trunk circuit and including a second timer, means governed when said second trunk circuit is idle for initiating operation of said second timer and responsive to said second trunk circuit being rendered busy for releasing said second timer, means responsive to operation of said first timer a first time interval for sending a short test signal over said trunk and for releasing said first timer and then for initiating reoperation thereof, second slow-acting means responsive to said short test signal received over said trunk for releasing said second timer and then for initiating reoperation thereof, said first slow-acting means being unresponsive to said short test signal so that said second trunk circuit is not seized as a consequence of said short test signal being sent over said trunk, said first and second slow-acting means both being unresponsive to brief transient signals appearing upon said trunk so that said second trunk circuit is not seized and said second timer is not released as a consequence of said brief transient signals appearing upon said trunk, an alarm, and means responsive to operation of said second timer a second time interval greater than said first time interval for operating said alarm.

7. In a signaling system, first and second trunk circuits, first and second carrier equipment respectively connected to said first and second trunk circuits, a trunk interconnecting said first and second carrier equipment, means responsive to seizure of said first trunk circuit for causing said first carrier equipment to transmit a seizure signal over said trunk, means responsive to said seizure signal received over said trunk for causing said second carrier equipment to seize said second trunk circuit so that said trunk circuits are rendered idle or busy substantially simultaneously; a sender connected to said first carrier equipment and including a first timer, a receiver connected to said second carrier equipment and including a second timer, means responsive to operation of said first timer a first time interval for releasing said first timer and then for initiating reoperation thereof and for causing said first carrier equipment to send a test signal over said trunk, means responsive to said test signal received over said trunk for causing said second carrier equipment to release said second timer and then to initiate reoperation thereof, an alarm, and means responsive to operation of said second timer a second time interval greater than said first time interval for operating said alarm.

8. In combination, a carrier communication system including one or more carrier communication stations and a carrier terminal connected over a common transmission medium and a central switching office connected to said carrier terminal, means at one of said stations for periodically conditioning the station to transmit a wave of the normal station transmitting carrier frequency over said medium to said carrier terminal during a short test time interval, means at the carrier terminal operative to transmit a test signal to said central office while said carrier wave is being received at that terminal, timing means at said central office adapted to be reset to a zero timing condition in response to the signals received from said carrier terminal within given time intervals, and means controlled by said timing means for giving an alarm if the test signals are not received at said office within said given time intervals.

9. The combination of claim 8, in which said central office includes reset mechanism for returning said timing means to the zero timing position in response to each test signal received by said central office, and relay means adapted to be operatively energized under control of said timing means only if said timing means is not reset by the test signals arriving at said central office within normal time intervals, and an alarm device responsive to each operation of said relay means.

10. The combination of claim 8, in which the means at said one station for periodically conditioning the station to transmit a wave of the normal station carrier frequency includes timing means operating at predetermined regular time intervals and slow-releasing relay means responsive to each operation of said last-mentioned timing means.

11. The combination of claim 10, in which said timing means at said one station and said timing means at said central office are relatively adjusted to make the regular intervals between the operations of said timing means at said one subscriber station shorter than the operating time intervals of said timing means at said central office so that said last-mentioned timing means will be reset by the test signals arriving at said central office within normal time intervals before it causes operation of said alarm means.

12. The combination of claim 10, in which said resetting mechanism is made sufficiently slow in operation to prevent said timing means at said central office from being reset momentarily in response to intermittent noise on said transmission medium, and in which the release time of said slow-releasing relay means is made long enough to compensate for the delay in operation of said resetting means.

IMRE MOLNAR.

References Cited in the file of this patent

UNITED STATES PATENTS

| Number | Name | Date |
| --- | --- | --- |
| 1,802,179 | Lomax | Apr. 21, 1931 |
| 2,233,282 | Buchanan | Feb. 25, 1941 |
| 2,486,722 | Stehlik | Nov. 1, 1949 |
| 2,526,595 | Watts | Oct. 17, 1950 |